US010886969B2

(12) United States Patent
Bogdan et al.

(10) Patent No.: US 10,886,969 B2
(45) Date of Patent: *Jan. 5, 2021

(54) METHOD AND APPARATUS FOR BROADCAST COMMUNICATION VIA GUIDED WAVES

(71) Applicant: AT&T Intellectual Property I, L.P., Atlanta, GA (US)

(72) Inventors: Pamela A. M. Bogdan, Neptune, NJ (US); George Blandino, Bridgewater, NJ (US); Ken Liu, Edison, NJ (US); Leon Lubranski, Scotch Plains, NJ (US); Eric Myburgh, Bonita Springs, FL (US); Tracy Van Brakle, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,170

(22) Filed: Jun. 5, 2018

(65) Prior Publication Data

US 2018/0287663 A1 Oct. 4, 2018

Related U.S. Application Data

(63) Continuation of application No. 15/370,603, filed on Dec. 6, 2016, now Pat. No. 10,020,844.

(51) Int. Cl.
*H04B 3/54* (2006.01)
*H04B 3/52* (2006.01)
(Continued)

(52) U.S. Cl.
CPC ............... *H04B 3/54* (2013.01); *H04B 3/52* (2013.01); *H04L 12/1895* (2013.01);
(Continued)

(58) Field of Classification Search
CPC .. H04B 3/54; H04B 3/52; H04L 12/18; H04L 12/2825; H04L 67/26
(Continued)

(56) References Cited

U.S. PATENT DOCUMENTS

| 2,542,980 A | 2/1951 | Barrow |
| 2,685,068 A | 7/1954 | Goubau |

(Continued)

FOREIGN PATENT DOCUMENTS

| CA | 2515560 A1 | 2/2007 |
| EP | 2568528 B1 | 12/2017 |

(Continued)

OTHER PUBLICATIONS

Akalin, Tahsin et al., "Single-Wire Transmission Lines at Terahertz Frequencies", IEEE Transactions on Microwave Theory and Techniques, vol. 54, No. 6, 2006, 2762-2767.

(Continued)

*Primary Examiner* — Yong Hang Jiang
(74) *Attorney, Agent, or Firm* — Guntin & Gust, PLC; Jay Anderson

(57) ABSTRACT

Aspects of the subject disclosure may include, for example, a broadcast communication system that is operable to detect a first power outage. A first plurality of electromagnetic waves is generated for transmission to a plurality of user devices of the broadcast communication system via a guided wave transceiver, where the first plurality of electromagnetic waves includes an outage status signal generated in response to detecting the first power outage, and where the first plurality of electromagnetic waves is guided by at least one transmission medium and propagates without utilizing an electrical return path. Other embodiments are disclosed.

20 Claims, 48 Drawing Sheets

(51) Int. Cl.
*H04L 12/18* (2006.01)
*H04L 29/08* (2006.01)
*H04L 12/28* (2006.01)
*H04L 12/46* (2006.01)
*H04L 12/413* (2006.01)

(52) U.S. Cl.
CPC ........ *H04L 12/2825* (2013.01); *H04L 12/413* (2013.01); *H04L 12/4625* (2013.01); *H04L 12/4633* (2013.01); *H04L 67/26* (2013.01)

(58) Field of Classification Search
USPC ...................................................... 340/3.43
See application file for complete search history.

(56) References Cited

U.S. PATENT DOCUMENTS

| | | |
|---|---|---|
| 2,737,632 A | 3/1956 | Grieg et al. |
| 2,852,753 A | 9/1958 | Walter et al. |
| 2,867,776 A | 1/1959 | Wilkinson, Jr. |
| 2,912,695 A | 11/1959 | Cutler |
| 2,921,277 A | 1/1960 | Goubau |
| 3,201,724 A | 8/1965 | Hafner |
| 3,389,394 A | 6/1968 | Lewis |
| 3,566,317 A | 2/1971 | Hafner |
| 3,588,754 A | 6/1971 | Hafner |
| 4,730,172 A | 3/1988 | Bengeult |
| 4,783,665 A | 11/1988 | Lier et al. |
| 4,825,221 A | 4/1989 | Suzuki et al. |
| 5,572,438 A | 11/1996 | Ehlers et al. |
| 5,642,121 A | 6/1997 | Martek et al. |
| 5,889,449 A | 3/1999 | Fiedziuszko |
| 5,937,335 A | 8/1999 | Park et al. |
| 6,239,377 B1 | 5/2001 | Nishikawa et al. |
| 6,388,564 B1 | 5/2002 | Piercy et al. |
| 6,441,723 B1 | 8/2002 | Mansfield, Jr. et al. |
| 7,009,471 B2 | 3/2006 | Elmore |
| 7,043,271 B1 | 5/2006 | Seto et al. |
| 7,058,524 B2 | 6/2006 | Hayes et al. |
| 7,280,033 B2 | 10/2007 | Berkman et al. |
| 7,301,424 B2 | 11/2007 | Suarez-gartner et al. |
| 7,345,623 B2 | 3/2008 | McEwan et al. |
| 7,376,191 B2 | 5/2008 | Melick et al. |
| 7,567,154 B2 | 7/2009 | Elmore |
| 7,589,630 B2 | 9/2009 | Drake et al. |
| 7,590,404 B1 | 9/2009 | Johnson et al. |
| 7,915,980 B2 | 3/2011 | Hardacker et al. |
| 7,925,235 B2 | 4/2011 | Konya et al. |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,253,516 B2 | 8/2012 | Miller, II et al. |
| 8,269,583 B2 | 9/2012 | Miller, II et al. |
| 8,344,829 B2 | 1/2013 | Miller, II et al. |
| 8,680,706 B2 | 3/2014 | Zyren et al. |
| 8,729,857 B2 | 5/2014 | Stählin et al. |
| 8,736,502 B1 | 5/2014 | Mehr et al. |
| 8,880,765 B2 | 11/2014 | Seal et al. |
| 8,897,697 B1 | 11/2014 | Bennett et al. |
| 9,113,347 B2 | 8/2015 | Henry |
| 9,209,902 B2 | 12/2015 | Willis, III et al. |
| 9,312,919 B1 | 4/2016 | Barzegar et al. |
| 9,413,519 B2 | 8/2016 | Khoshnood et al. |
| 9,461,706 B1 | 10/2016 | Bennett et al. |
| 9,490,869 B1 | 11/2016 | Henry |
| 9,497,572 B2 | 11/2016 | Britt et al. |
| 9,509,415 B1 | 11/2016 | Henry et al. |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,608,692 B2 | 3/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,628,116 B2 | 4/2017 | Willis, III et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,561 B2 | 7/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,749,053 B2 | 8/2017 | Henry et al. |
| 9,722,318 B2 | 9/2017 | Adriazola et al. |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,847,566 B2 | 12/2017 | Henry et al. |
| 9,853,342 B2 | 12/2017 | Henry et al. |
| 9,860,075 B1 | 1/2018 | Gerszberg et al. |
| 9,865,911 B2 | 1/2018 | Henry et al. |
| 9,866,309 B2 | 1/2018 | Bennett et al. |
| 9,871,282 B2 | 1/2018 | Henry et al. |
| 9,871,283 B2 | 1/2018 | Henry et al. |
| 9,876,264 B2 | 1/2018 | Barnickel et al. |
| 9,876,570 B2 | 1/2018 | Henry et al. |
| 9,876,605 B1 | 1/2018 | Henry et al. |
| 9,882,257 B2 | 1/2018 | Henry et al. |
| 9,893,795 B1 | 2/2018 | Willis et al. |
| 9,912,381 B2 | 3/2018 | Bennett et al. |
| 9,917,341 B2 | 3/2018 | Henry et al. |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B1 | 6/2018 | Willis, III et al. |
| 10,009,063 B2 | 6/2018 | Gerszberg et al. |
| 10,009,065 B2 | 6/2018 | Henry et al. |
| 10,009,067 B2 | 6/2018 | Birk et al. |
| 10,009,901 B2 | 6/2018 | Gerszberg |
| 10,027,397 B2 | 7/2018 | Kim |
| 10,027,427 B2 | 7/2018 | Vannucci et al. |
| 10,033,107 B2 | 7/2018 | Henry et al. |
| 10,033,108 B2 | 7/2018 | Henry et al. |
| 10,044,409 B2 | 8/2018 | Barzegar et al. |
| 10,051,483 B2 | 8/2018 | Barzegar et al. |
| 10,051,488 B1 | 8/2018 | Vannucci et al. |
| 10,062,970 B1 | 8/2018 | Vannucci et al. |
| 10,069,535 B2 | 9/2018 | Vannucci et al. |
| 10,079,661 B2 | 9/2018 | Gerszberg et al. |
| 10,090,606 B2 | 10/2018 | Henry et al. |
| 10,096,883 B2 | 10/2018 | Henry et al. |
| 10,103,777 B1 | 10/2018 | Henry et al. |
| 10,103,801 B2 | 10/2018 | Bennett et al. |
| 10,123,217 B1 | 11/2018 | Barzegar et al. |
| 10,129,057 B2 | 11/2018 | Willis, III et al. |
| 10,135,145 B2 | 11/2018 | Henry et al. |
| 10,136,434 B2 | 11/2018 | Gerszberg et al. |
| 10,142,086 B2 | 11/2018 | Bennett et al. |
| 10,148,016 B2 | 12/2018 | Johnson et al. |
| 10,154,493 B2 | 12/2018 | Bennett et al. |
| 10,170,840 B2 | 1/2019 | Henry et al. |
| 10,171,158 B1 | 1/2019 | Barzegar et al. |
| 10,200,106 B1 | 2/2019 | Barzegar et al. |
| 10,205,212 B2 | 2/2019 | Henry et al. |
| 10,205,231 B1 | 2/2019 | Henry et al. |
| 10,205,655 B2 | 2/2019 | Barzegar et al. |
| 10,224,981 B2 | 3/2019 | Henry et al. |
| 10,230,426 B1 | 3/2019 | Henry et al. |
| 10,230,428 B1 | 3/2019 | Barzegar et al. |
| 10,243,270 B2 | 3/2019 | Henry et al. |
| 10,244,408 B1 | 3/2019 | Vannucci et al. |
| 10,264,586 B2 | 4/2019 | Beattie, Jr. et al. |
| 10,276,907 B2 | 4/2019 | Bennett et al. |
| 10,284,261 B1 | 5/2019 | Barzegar et al. |
| 10,291,286 B2 | 5/2019 | Henry et al. |
| 10,305,190 B2 | 5/2019 | Britz et al. |
| 10,305,192 B1 | 5/2019 | Rappaport |

(56) References Cited

U.S. PATENT DOCUMENTS

| | | | |
|---|---|---|---|
| 10,305,197 B2 | 5/2019 | Henry et al. | |
| 10,312,567 B2 | 6/2019 | Bennett et al. | |
| 10,320,586 B2 | 6/2019 | Henry et al. | |
| 10,326,495 B1 | 6/2019 | Barzegar et al. | |
| 10,340,573 B2 | 7/2019 | Johnson et al. | |
| 10,340,600 B2 | 7/2019 | Henry et al. | |
| 10,340,979 B1 | 7/2019 | Barzegar et al. | |
| 10,348,391 B2 | 7/2019 | Bennett et al. | |
| 10,355,745 B2 | 7/2019 | Henry et al. | |
| 10,361,489 B2 | 7/2019 | Britz et al. | |
| 10,371,889 B1 | 8/2019 | Barzegar et al. | |
| 10,374,277 B2 | 8/2019 | Henry et al. | |
| 10,374,278 B2 | 8/2019 | Henry et al. | |
| 10,374,281 B2 | 8/2019 | Henry et al. | |
| 10,374,316 B2 | 8/2019 | Bennett et al. | |
| 10,389,029 B2 | 8/2019 | Henry et al. | |
| 10,389,037 B2 | 8/2019 | Johnson et al. | |
| 10,389,403 B2 | 8/2019 | Henry et al. | |
| 10,389,419 B2 | 8/2019 | Johnson et al. | |
| 10,405,199 B1 | 9/2019 | Henry et al. | |
| 10,411,356 B2 | 9/2019 | Johnson et al. | |
| 10,411,920 B2 | 9/2019 | Henry et al. | |
| 10,424,845 B2 | 9/2019 | Johnson et al. | |
| 10,439,290 B2 | 10/2019 | Adriazola et al. | |
| 10,446,899 B2 | 10/2019 | Henry et al. | |
| 10,446,936 B2 | 10/2019 | Henry et al. | |
| 10,454,151 B2 | 10/2019 | Henry et al. | |
| 10,469,156 B1 | 11/2019 | Barzegar et al. | |
| 10,469,192 B2 | 11/2019 | Wolniansky et al. | |
| 10,469,228 B2 | 11/2019 | Barzegar et al. | |
| 10,498,589 B2 | 12/2019 | Barzegar et al. | |
| 10,505,248 B2 | 12/2019 | Henry et al. | |
| 10,505,249 B2 | 12/2019 | Henry et al. | |
| 10,505,250 B2 | 12/2019 | Henry et al. | |
| 10,505,252 B2 | 12/2019 | Stuckman et al. | |
| 10,505,584 B1 | 12/2019 | Henry et al. | |
| 10,511,346 B2 | 12/2019 | Henry et al. | |
| 10,516,555 B2 | 12/2019 | Henry et al. | |
| 10,523,269 B1 | 12/2019 | Henry et al. | |
| 10,523,388 B2 | 12/2019 | Gerszberg et al. | |
| 10,530,505 B2 | 1/2020 | Henry et al. | |
| 10,547,545 B2 | 1/2020 | Barzegar et al. | |
| 10,553,959 B2 | 2/2020 | Vannucci et al. | |
| 10,553,960 B2 | 2/2020 | Vannucci et al. | |
| 10,554,454 B2 | 2/2020 | Henry et al. | |
| 10,555,249 B2 | 2/2020 | Barzegar et al. | |
| 10,555,318 B2 | 2/2020 | Willis, III et al. | |
| 10,581,275 B2 | 3/2020 | Vannucci et al. | |
| 10,587,310 B1 | 3/2020 | Bennett et al. | |
| 10,601,494 B2 | 3/2020 | Vannucci | |
| 10,608,312 B2 | 3/2020 | Henry et al. | |
| 10,623,033 B1 | 4/2020 | Henry et al. | |
| 10,623,056 B1 | 4/2020 | Bennett et al. | |
| 10,623,057 B1 | 4/2020 | Bennett et al. | |
| 10,629,995 B2 | 4/2020 | Rappaport | |
| 10,637,149 B2 | 4/2020 | Britz | |
| 10,637,535 B1 | 4/2020 | Vannucci et al. | |
| 2002/0050932 A1* | 5/2002 | Rhoades | G08B 13/1965 340/870.16 |
| 2003/0151548 A1 | 8/2003 | Kingsley et al. | |
| 2004/0061616 A1 | 4/2004 | Fischer et al. | |
| 2004/0110469 A1 | 6/2004 | Judd et al. | |
| 2004/0113756 A1 | 6/2004 | Mollenkopf et al. | |
| 2004/0169572 A1 | 9/2004 | Elmore et al. | |
| 2004/0218688 A1 | 11/2004 | Santhoff et al. | |
| 2005/0017825 A1 | 1/2005 | Hansen | |
| 2005/0042989 A1 | 2/2005 | Ho et al. | |
| 2005/0111533 A1 | 5/2005 | Berkman et al. | |
| 2005/0258920 A1 | 11/2005 | Elmore et al. | |
| 2006/0083269 A1 | 4/2006 | Kang et al. | |
| 2008/0064331 A1 | 3/2008 | Washiro et al. | |
| 2008/0125036 A1 | 5/2008 | Konya et al. | |
| 2008/0211727 A1 | 9/2008 | Elmore et al. | |
| 2008/0252541 A1 | 10/2008 | Diaz et al. | |
| 2009/0079660 A1 | 3/2009 | Elmore et al. | |
| 2009/0184835 A1 | 7/2009 | Deaver, Sr. et al. | |
| 2009/0258652 A1 | 10/2009 | Lambert et al. | |
| 2010/0152910 A1* | 6/2010 | Taft | G01D 4/002 700/286 |
| 2010/0225426 A1 | 9/2010 | Unger et al. | |
| 2010/0277003 A1 | 11/2010 | Von Novak et al. | |
| 2011/0110404 A1 | 5/2011 | Washiro | |
| 2011/0132658 A1 | 6/2011 | Miller, II et al. | |
| 2011/0136432 A1 | 6/2011 | Miller, II et al. | |
| 2011/0140911 A1 | 6/2011 | Pant et al. | |
| 2011/0187578 A1 | 8/2011 | Farneth et al. | |
| 2011/0215887 A1 | 9/2011 | Kunes | |
| 2011/0243255 A1 | 10/2011 | Paoletti | |
| 2011/0282508 A1* | 11/2011 | Goutard | H04L 63/20 700/293 |
| 2012/0109545 A1* | 5/2012 | Meynardi | G01R 31/085 702/58 |
| 2012/0133373 A1 | 5/2012 | Ali et al. | |
| 2012/0271686 A1* | 10/2012 | Silverman | G06Q 10/06 705/14.1 |
| 2012/0306587 A1 | 12/2012 | Strid et al. | |
| 2012/0310423 A1* | 12/2012 | Taft | G06Q 50/06 700/286 |
| 2013/0064311 A1 | 3/2013 | Turner et al. | |
| 2013/0169499 A1 | 7/2013 | Lin et al. | |
| 2014/0155054 A1 | 6/2014 | Henry et al. | |
| 2014/0163759 A1* | 6/2014 | Anderson | G06Q 50/06 700/291 |
| 2014/0167882 A1 | 6/2014 | Shinoda et al. | |
| 2014/0177692 A1 | 6/2014 | Yu et al. | |
| 2014/0285277 A1 | 9/2014 | Herbsommer et al. | |
| 2015/0126107 A1 | 5/2015 | Bennett et al. | |
| 2015/0188584 A1 | 7/2015 | Laurent-Michel | |
| 2015/0235539 A1* | 8/2015 | Orvis | G01N 33/004 340/632 |
| 2016/0080839 A1 | 3/2016 | Fuchs et al. | |
| 2016/0094879 A1 | 3/2016 | Gerszberg et al. | |
| 2016/0112093 A1 | 4/2016 | Barzegar | |
| 2016/0149614 A1 | 5/2016 | Barzegar | |
| 2016/0164571 A1 | 6/2016 | Bennett et al. | |
| 2016/0182096 A1 | 6/2016 | Panioukov et al. | |
| 2016/0197642 A1 | 7/2016 | Henry et al. | |
| 2016/0315660 A1 | 10/2016 | Henry | |
| 2016/0315662 A1 | 10/2016 | Henry | |
| 2016/0359530 A1 | 12/2016 | Bennett | |
| 2016/0359541 A1 | 12/2016 | Bennett | |
| 2016/0359546 A1 | 12/2016 | Bennett | |
| 2016/0359547 A1 | 12/2016 | Bennett et al. | |
| 2016/0360533 A1 | 12/2016 | Bennett et al. | |
| 2016/0365966 A1 | 12/2016 | Bennett et al. | |
| 2017/0012667 A1 | 1/2017 | Bennett | |
| 2017/0018332 A1 | 1/2017 | Barzegar et al. | |
| 2017/0018851 A1 | 1/2017 | Hnery et al. | |
| 2017/0018856 A1 | 1/2017 | Henry et al. | |
| 2017/0019130 A1 | 1/2017 | Henry et al. | |
| 2017/0033465 A1 | 2/2017 | Henry et al. | |
| 2017/0033466 A1 | 2/2017 | Henry et al. | |
| 2017/0033953 A1 | 2/2017 | Henry et al. | |
| 2017/0033954 A1 | 2/2017 | Henry et al. | |
| 2017/0078064 A1 | 3/2017 | Gerszberg et al. | |
| 2017/0079024 A1 | 3/2017 | Gerszberg | |
| 2017/0079037 A1 | 3/2017 | Gerszberg et al. | |
| 2017/0079038 A1 | 3/2017 | Gerszberg et al. | |
| 2017/0079039 A1 | 3/2017 | Gerszberg et al. | |
| 2017/0083072 A1* | 3/2017 | Dauneria | H04W 24/00 |
| 2017/0085003 A1 | 3/2017 | Johnson et al. | |
| 2017/0093693 A1 | 3/2017 | Barzegar et al. | |
| 2017/0110795 A1 | 4/2017 | Henry | |
| 2017/0110804 A1 | 4/2017 | Henry et al. | |
| 2017/0111805 A1 | 4/2017 | Barzegar et al. | |
| 2017/0229782 A1 | 8/2017 | Adriazola et al. | |
| 2018/0048497 A1 | 2/2018 | Henry et al. | |
| 2018/0054232 A1 | 2/2018 | Henry et al. | |
| 2018/0054233 A1 | 2/2018 | Henry et al. | |
| 2018/0054234 A1 | 2/2018 | Stuckman et al. | |
| 2018/0062886 A1 | 3/2018 | Paul et al. | |
| 2018/0069594 A1 | 3/2018 | Henry et al. | |
| 2018/0069731 A1 | 3/2018 | Henry et al. | |
| 2018/0074568 A1 | 3/2018 | Priyadarshi et al. | |

(56) References Cited

U.S. PATENT DOCUMENTS

| | | |
|---|---|---|
| 2018/0076515 A1 | 3/2018 | Perlman et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0159593 A1 | 6/2018 | Bogdan et al. |
| 2018/0159615 A1 | 6/2018 | Kim |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167148 A1 | 6/2018 | Vannucci et al. |
| 2018/0167927 A1 | 6/2018 | Beattie, Jr. et al. |
| 2018/0302162 A1 | 10/2018 | Gerszberg et al. |
| 2019/0013577 A1 | 1/2019 | Henry et al. |
| 2019/0013837 A1 | 1/2019 | Henry et al. |
| 2019/0074563 A1 | 3/2019 | Henry et al. |
| 2019/0074580 A1 | 3/2019 | Henry et al. |
| 2019/0074864 A1 | 3/2019 | Henry et al. |
| 2019/0074865 A1 | 3/2019 | Henry et al. |
| 2019/0081747 A1 | 3/2019 | Barzegar et al. |
| 2019/0104419 A1 | 4/2019 | Barzegar et al. |
| 2019/0104420 A1 | 4/2019 | Barzegar et al. |
| 2019/0123442 A1 | 4/2019 | Vannucci et al. |
| 2019/0123783 A1 | 4/2019 | Henry et al. |
| 2019/0140679 A1 | 5/2019 | Vannucci et al. |
| 2019/0174506 A1 | 6/2019 | Willis, III et al. |
| 2019/0181532 A1 | 6/2019 | Vannucci et al. |
| 2019/0181683 A1 | 6/2019 | Vannucci et al. |
| 2019/0296430 A1 | 9/2019 | Bennett et al. |
| 2019/0305413 A1 | 10/2019 | Henry et al. |
| 2019/0305820 A1 | 10/2019 | Barzegar et al. |
| 2020/0014423 A1 | 1/2020 | Britz |
| 2020/0076088 A1 | 3/2020 | Bennett et al. |
| 2020/0083744 A1 | 3/2020 | Vannucci et al. |
| 2020/0083927 A1 | 3/2020 | Henry et al. |
| 2020/0106477 A1 | 4/2020 | Nanni et al. |
| 2020/0119934 A1 | 4/2020 | Barzegar et al. |
| 2020/0153095 A1 | 5/2020 | Henry et al. |
| 2020/0161757 A1 | 5/2020 | Henry |

FOREIGN PATENT DOCUMENTS

| | | | |
|---|---|---|---|
| WO | 8605327 A1 | 9/1986 | |
| WO | WO-2008001973 A1 * | 1/2008 | ............ H04L 43/50 |
| WO | 2013008292 A1 | 1/2013 | |
| WO | 2014147002 A1 | 9/2014 | |
| WO | 2016053573 A1 | 4/2016 | |
| WO | 2016171914 A1 | 10/2016 | |
| WO | 2018106455 A1 | 6/2018 | |
| WO | 2018106684 A1 | 6/2018 | |
| WO | 2018106915 A1 | 6/2018 | |
| WO | 2019050752 A1 | 3/2019 | |

OTHER PUBLICATIONS

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Elmore, Glenn et al., "A Surface Wave Transmission Line", QEX, May/Jun. 2012, pp. 3-9.

Elmore, Glenn, "Introduction to the Propagating Wave on a Single Conductor", www.corridor.biz, Jul. 27, 2009, 30 pages.

Friedman, M et al., "Low-Loss RF Transport Over Long Distances", IEEE Transactions on Microwave Theory and Techniques, vol. 49, No. 2, Feb. 2001, 8 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg, "Open Wire Lines", IRE Transactions on Microwave Theory and Techniques, 1956, 197-200.

Goubau, Georg, "Single-Conductor Surface-Wave Transmission Lines", Proceedings of the I.R.E., 1951, 619-624.

Goubau, Georg, "Surface Waves and Their Application to Transmission Lines", Radio Communication Branch, Coles Signal Laboratory, Mar. 10, 1950, 1119-1128.

Goubau, Georg, "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A., "On the propagation of electrodynamic waves along a wire", Annals of Physics And Chemistry New Edition, vol. 67, No. 2, 1899, 72 pages.

Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.

Wang, Kanglin, "Dispersion of Surface Plasmon Polaritons on Metal Wires in the Terahertz Frequency Range", Physical Review Letters, PRL 96, 157401, 2006, 4 pages.

"International Search Report and Written Opinion", PCT/US2018/015634, dated Jun. 25, 2018, 8 pages.

Villaran, Michael et al., "Condition Monitoring Of Cables Task 3 Report: Condition Monitoring Techniques For Electric Cables", Brookhaven National Laboratory, Technical Report, Nov. 30, 2009, 89 pages.

* cited by examiner

300

400

600

1100

1200

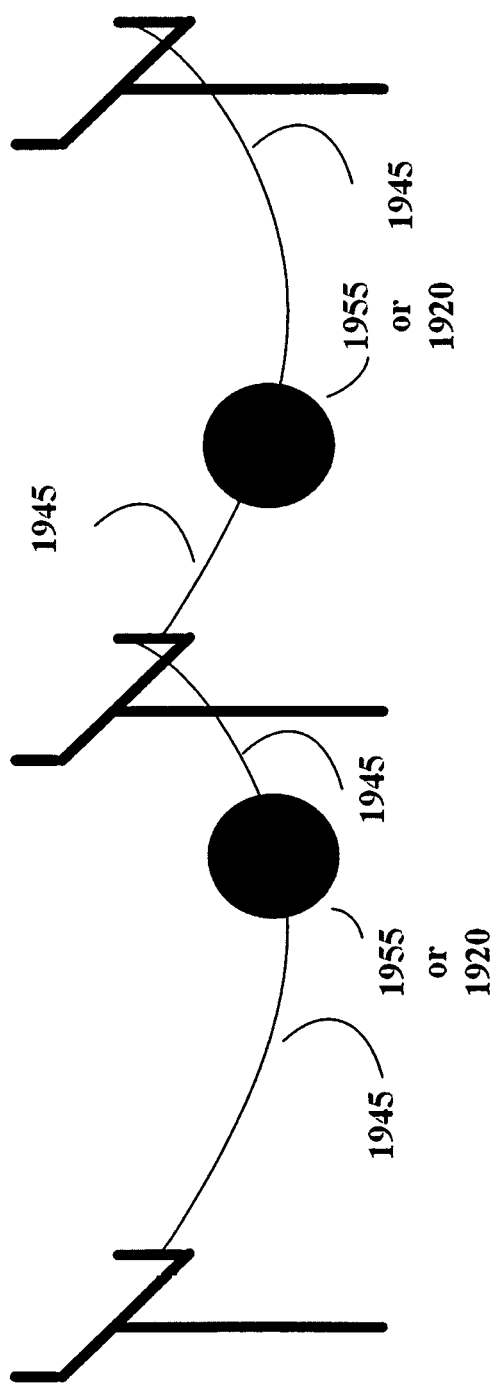

Broadcast Communications

Outage Communications (n-1 phase outage)

METHOD AND APPARATUS FOR BROADCAST COMMUNICATION VIA GUIDED WAVES

CROSS REFERENCE TO RELATED APPLICATIONS

This application is a continuation of U.S. patent application Ser. No. 15/370,603 filed on Dec. 6, 2016. The contents of each of the foregoing is hereby incorporated by reference into this application as if set forth herein in full.

FIELD OF THE DISCLOSURE

The subject disclosure relates to a method and apparatus for broadcast communication via guided waves.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

In addition, most homes and businesses have grown to rely on broadband data access for services such as voice, video and Internet browsing, etc. Broadband access networks include satellite, 4G or 5G wireless, power line communication, fiber, cable, and telephone networks.

BRIEF DESCRIPTION OF THE DRAWINGS

Reference will now be made to the accompanying drawings, which are not necessarily drawn to scale, and wherein:

FIGS. 19C, 19D, 19E, 19F, 19G, 19H, and 19I are illustrations of example non-limiting embodiments of guided wave repeater systems in accordance with various aspects described herein.

DETAILED DESCRIPTION

Figure 1:
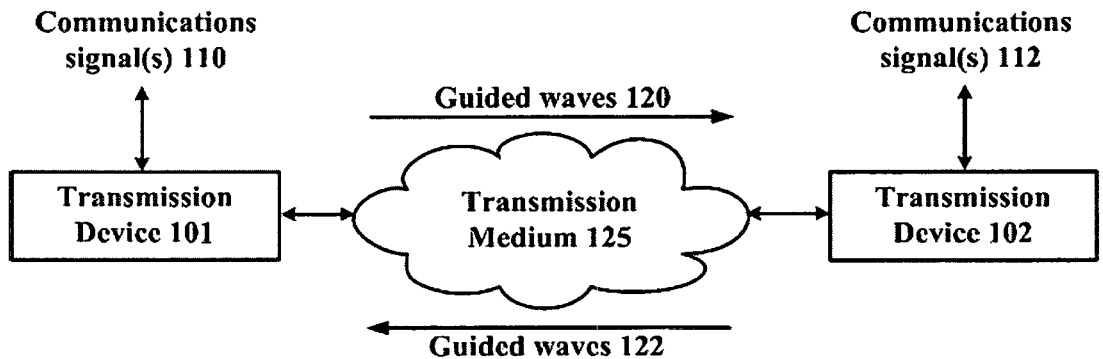
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In an embodiment, a guided wave communication system is presented for sending and receiving communication signals such as data or other signaling via guided electromagnetic waves. The guided electromagnetic waves include, for example, surface waves or other electromagnetic waves that are bound to or guided by a transmission medium. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided wave transmission media.

The inducement of guided electromagnetic waves on a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the guided waves along the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that is not part of a circuit. Also, in some embodiments, a wire is not necessary, and the electromagnetic waves can propagate along a single line transmission medium that is not a wire.

More generally, "guided electromagnetic waves" or "guided waves" as described by the subject disclosure are affected by the presence of a physical object that is at least a part of the transmission medium (e.g., a bare wire or other conductor, a dielectric, an insulated wire, a conduit or other hollow element, a bundle of insulated wires that is coated, covered or surrounded by a dielectric or insulator or other wire bundle, or another form of solid or otherwise non-liquid or non-gaseous transmission medium) so as to be at least partially bound to or guided by the physical object and so as to propagate along a transmission path of the physical object. Such a physical object can operate as at least a part of a transmission medium that guides, by way of an interface of the transmission medium (e.g., an outer surface, inner surface, an interior portion between the outer and the inner surfaces or other boundary between elements of the transmission medium), the propagation of guided electromagnetic waves, which in turn can carry energy, data and/or other signals along the transmission path from a sending device to a receiving device.

Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves.

An electrical circuit allows electrical signals to propagate from a sending device to a receiving device via a forward electrical path and a return electrical path, respectively. These electrical forward and return paths can be implemented via two conductors, such as two wires or a single wire and a common ground that serves as the second conductor. In particular, electrical current from the sending device (direct and/or alternating) flows through the electrical forward path and returns to the transmission source via the electrical return path as an opposing current. More particularly, electron flow in one conductor that flows away from the sending device, returns to the receiving device in the opposite direction via a second conductor or ground. Unlike electrical signals, guided electromagnetic waves can propagate along a transmission medium (e.g., a bare conductor, an insulated conductor, a conduit, a non-conducting material such as a dielectric strip, or any other type of object suitable for the propagation of surface waves) from a sending device to a receiving device or vice-versa without requiring the transmission medium to be part of an electrical circuit (i.e., without requiring an electrical return path) between the sending device and the receiving device. Although electromagnetic waves can propagate in an open circuit, i.e., a circuit without an electrical return path or with a break or gap that prevents the flow of electrical current through the circuit, it is noted that electromagnetic waves can also propagate along a surface of a transmission medium that is in fact part of an electrical circuit. That is electromagnetic waves can travel along a first surface of a transmission medium having a forward electrical path and/or along a second surface of a transmission medium having an electrical return path. As a consequence, guided electromagnetic waves can propagate along a surface of a transmission medium from a sending device to a receiving device or vice-versa with or without an electrical circuit.

This permits, for example, transmission of guided electromagnetic waves along a transmission medium having no conductive components (e.g., a dielectric strip). This also permits, for example, transmission of guided electromagnetic waves that propagate along a transmission medium having no more than a single conductor (e.g., an electromagnetic wave that propagates along the surface of a single bare conductor or along the surface of a single insulated conductor or an electromagnetic wave that propagates all or partly within the insulation of an insulated conductor). Even if a transmission medium includes one or more conductive components and the guided electromagnetic waves propagating along the transmission medium generate currents that, at times, flow in the one or more conductive components in a direction of the guided electromagnetic waves, such guided electromagnetic waves can propagate along the transmission medium from a sending device to a receiving device without a flow of an opposing current on an electrical return path back to the sending device from the receiving device. As a consequence, the propagation of such guided electromagnetic waves can be referred to as propagating via a single transmission line or propagating via a surface wave transmission line.

In a non-limiting illustration, consider a coaxial cable having a center conductor and a ground shield that are separated by an insulator. Typically, in an electrical system a first terminal of a sending (and receiving) device can be connected to the center conductor, and a second terminal of the sending (and receiving) device can be connected to the ground shield. If the sending device injects an electrical signal in the center conductor via the first terminal, the electrical signal will propagate along the center conductor causing, at times, forward currents and a corresponding flow of electrons in the center conductor, and return currents and an opposing flow of electrons in the ground shield. The same conditions apply for a two terminal receiving device.

In contrast, consider a guided wave communication system such as described in the subject disclosure, which can utilize different embodiments of a transmission medium (including among others a coaxial cable) for transmitting and receiving guided electromagnetic waves without an electrical circuit (i.e., without an electrical forward path or electrical return path depending on your perspective). In one embodiment, for example, the guided wave communication system of the subject disclosure can be configured to induce guided electromagnetic waves that propagate along an outer surface of a coaxial cable (e.g., the outer jacket or insulation layer of the coaxial cable). Although the guided electromagnetic waves will cause forward currents on the ground shield, the guided electromagnetic waves do not require return currents in the center conductor to enable the guided electromagnetic waves to propagate along the outer surface of the coaxial cable. Said another way, while the guided electromagnetic waves will cause forward currents on the ground shield, the guided electromagnetic waves will not generate opposing return currents in the center conductor (or other electrical return path). The same can be said of other transmission media used by a guided wave communication system for the transmission and reception of guided electromagnetic waves.

For example, guided electromagnetic waves induced by the guided wave communication system on an outer surface of a bare conductor, or an insulated conductor can propagate along the outer surface of the bare conductor or the other surface of the insulated conductor without generating opposing return currents in an electrical return path. As another point of differentiation, where the majority of the signal energy in an electrical circuit is induced by the flow of electrons in the conductors themselves, guided electromagnetic waves propagating in a guided wave communication system on an outer surface of a bare conductor, cause only minimal forward currents in the bare conductor, with the majority of the signal energy of the electromagnetic wave concentrated above the outer surface of the bare conductor and not inside the bare conductor. Furthermore, guided electromagnetic waves that are bound to the outer surface of an insulated conductor cause only minimal forward currents in the center conductor or conductors of the insulated conductor, with the majority of the signal energy of the electromagnetic wave concentrated in regions inside the insulation and/or above the outside surface of the insulated conductor—in other words, the majority of the signal energy of the electromagnetic wave is concentrated outside the center conductor(s) of the insulated conductor.

Consequently, electrical systems that require two or more conductors for carrying forward and reverse currents on separate conductors to enable the propagation of electrical signals injected by a sending device are distinct from guided wave systems that induce guided electromagnetic waves on an interface of a transmission medium without the need of an electrical circuit to enable the propagation of the guided electromagnetic waves along the interface of the transmission medium.

It is further noted that guided electromagnetic waves as described in the subject disclosure can have an electromagnetic field structure that lies primarily or substantially outside of a transmission medium so as to be bound to or guided by the transmission medium and so as to propagate non-trivial distances on or along an outer surface of the transmission medium. In other embodiments, guided electromagnetic waves can have an electromagnetic field structure that lies primarily or substantially inside a transmission medium so as to be bound to or guided by the transmission medium and so as to propagate non-trivial distances within the transmission medium. In other embodiments, guided electromagnetic waves can have an electromagnetic field structure that lies partially inside and partially outside a transmission medium so as to be bound to or guided by the transmission medium and so as to propagate non-trivial distances along the transmission medium. The desired electronic field structure in an embodiment may vary based upon a variety of factors, including the desired transmission distance, the characteristics of the transmission medium itself, and environmental conditions/characteristics outside of the transmission medium (e.g., presence of rain, fog, atmospheric conditions, etc.).

Various embodiments described herein relate to coupling devices, that can be referred to as "waveguide coupling devices", "waveguide couplers" or more simply as "couplers", "coupling devices" or "launchers" for launching and/or extracting guided electromagnetic waves to and from a transmission medium at millimeter-wave frequencies (e.g., 30 to 300 GHz), wherein the wavelength can be small compared to one or more dimensions of the coupling device and/or the transmission medium such as the circumference of a wire or other cross sectional dimension, or lower microwave frequencies such as 300 MHz to 30 GHz. Transmissions can be generated to propagate as waves guided by a coupling device, such as: a strip, arc or other length of dielectric material; a horn, monopole, rod, slot or other antenna; an array of antennas; a magnetic resonant cavity, or other resonant coupler; a coil, a strip line, a waveguide or other coupling device. In operation, the coupling device receives an electromagnetic wave from a transmitter or transmission medium. The electromagnetic field structure of the electromagnetic wave can be carried inside the coupling device, outside the coupling device or some combination thereof. When the coupling device is in close proximity to a transmission medium, at least a portion of an electromagnetic wave couples to or is bound to the transmission medium, and continues to propagate as guided electromagnetic waves. In a reciprocal fashion, a coupling device can extract guided waves from a transmission medium and transfer these electromagnetic waves to a receiver.

According to an example embodiment, a surface wave is a type of guided wave that is guided by a surface of a transmission medium, such as an exterior or outer surface of the wire, or another surface of the wire that is adjacent to or exposed to another type of medium having different properties (e.g., dielectric properties). Indeed, in an example embodiment, a surface of the wire that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulator surface of the wire that is exposed to air or free space, or can otherwise be any material region between the insulator surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided wave.

According to an example embodiment, the term "about" a wire or other transmission medium used in conjunction with a guided wave can include fundamental guided wave propagation modes such as a guided waves having a circular or substantially circular field distribution, a symmetrical electromagnetic field distribution (e.g., electric field, magnetic field, electromagnetic field, etc.) or other fundamental mode pattern at least partially around a wire or other transmission medium. In addition, when a guided wave propagates "about" a wire or other transmission medium, it can do so according to a guided wave propagation mode that includes not only the fundamental wave propagation modes (e.g., zero order modes), but additionally or alternatively non-fundamental wave propagation modes such as higher-order guided wave modes (e.g., $1^{st}$ order modes, $2^{nd}$ order modes, etc.), asymmetrical modes and/or other guided (e.g., surface) waves that have non-circular field distributions around a wire or other transmission medium. As used herein, the term "guided wave mode" refers to a guided wave propagation mode of a transmission medium, coupling device or other system component of a guided wave communication system.

For example, such non-circular field distributions can be unilateral or multi-lateral with one or more axial lobes characterized by relatively higher field strength and/or one or more nulls or null regions characterized by relatively low-field strength, zero-field strength or substantially zero-field strength. Further, the field distribution can otherwise vary as a function of azimuthal orientation around the wire such that one or more angular regions around the wire have an electric or magnetic field strength (or combination thereof) that is higher than one or more other angular regions of azimuthal orientation, according to an example embodiment. It will be appreciated that the relative orientations or positions of the guided wave higher order modes or asymmetrical modes can vary as the guided wave travels along the wire.

As used herein, the term "millimeter-wave" can refer to electromagnetic waves/signals that fall within the "millimeter-wave frequency band" of 30 GHz to 300 GHz. The term "microwave" can refer to electromagnetic waves/signals that fall within a "microwave frequency band" of 300 MHz to 300 GHz. The term "radio frequency" or "RF" can refer to electromagnetic waves/signals that fall within the "radio frequency band" of 10 kHz to 1 THz. It is appreciated that wireless signals, electrical signals, and guided electromagnetic waves as described in the subject disclosure can be configured to operate at any desirable frequency range, such as, for example, at frequencies within, above or below millimeter-wave and/or microwave frequency bands. In particular, when a coupling device or transmission medium includes a conductive element, the frequency of the guided electromagnetic waves that are carried by the coupling device and/or propagate along the transmission medium can be below the mean collision frequency of the electrons in the conductive element. Further, the frequency of the guided electromagnetic waves that are carried by the coupling device and/or propagate along the transmission medium can be a non-optical frequency, e.g. a radio frequency below the range of optical frequencies that begins at 1 THz.

As used herein, the term "antenna" can refer to a device that is part of a transmitting or receiving system to transmit/radiate or receive wireless signals.

In accordance with one or more embodiments, a guided wave repeater system includes a processing system that includes a processor; a guided wave transceiver that transmits and receives communications by electromagnetic waves at a physical interface of a transmission medium, where the electromagnetic waves are guided by the transmission medium and propagate without utilizing an electrical return; and a memory that stores executable instructions that, when executed by the processing system, facilitate performance of operations. The operations include receiving via the guided wave transceiver a first plurality of electromagnetic waves that include a first communication signal. A second plurality of electromagnetic waves that include a second communication signal are transmitted via the guided wave transceiver. The first plurality of electromagnetic waves and the second plurality of electromagnetic waves are guided by a power line of a utility pole. A third communication signal is received from a smart grid device. A fourth communication signal is transmitted to the smart grid device.

In accordance with one or more embodiments, a guided wave repeater system includes means for receiving a first plurality of electromagnetic waves that include a first communication signal. The guided wave repeater system further includes means for transmitting a second plurality of electromagnetic waves that include a second communication signal. The first plurality of electromagnetic waves and the second plurality of electromagnetic waves are guided by a power line of a utility pole and propagate without utilizing an electrical return. The guided wave repeater system further includes means for receiving a third communication signal from a smart grid device. Finally, the guided wave repeater system further includes means for transmitting a fourth communication signal to the smart grid device.

In accordance with one or more embodiments, a utilities management system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; and a memory that stores executable instructions that, when executed by the processing system, facilitate performance of operations. The operations include receiving via the guided wave transceiver a plurality of utility status signals from a plurality of utility sensors located at a plurality of supervised sites. Utility control data is generated based on the plurality of utility status signals. At least one control signal is generated for transmission via the guided wave transceiver to at least one of the plurality of supervised sites, and the at least one control signal includes at least one utility deployment instruction based on the utility control data.

In accordance with one or more embodiments, a utilities management system includes means for receiving a first plurality of electromagnetic waves at a physical interface of a transmission medium, where the first plurality of electromagnetic waves include a plurality of utility status signals from a plurality of utility of sensors located at a plurality of supervised sites. The utilities management system further includes means for generating utility control data based on the plurality of utility status signals, and finally means for generating a second plurality of electromagnetic waves that include at least one control signal for transmission to at least one of the plurality of supervised sites, where the at least one control signal includes at least one utility deployment instruction based on the utility control data. The first plurality of electromagnetic waves and the second plurality of electromagnetic waves are guided by the transmission medium and propagate without utilizing an electrical return path.

In accordance with one or more embodiments, a broadcast communication system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; and a memory that stores executable instructions that, when executed by the processing system, facilitate performance of operations. The operations include detecting a first power outage and further include generating a first plurality of electromagnetic waves for transmission to a plurality of user devices of the broadcast communication system via the guided wave transceiver, where the first plurality of electromagnetic waves include an outage status signal generated in response to detecting the first power outage.

In accordance with one or more embodiments, a broadcast communication system includes means for detecting a first power outage, and further includes means for generating a first plurality of electromagnetic waves for transmission to a plurality of user devices of the broadcast communication system. The first plurality of electromagnetic waves include an outage status signal generated in response to detecting the first power outage, and the first plurality of electromagnetic waves are guided by at least one transmission medium and propagate without utilizing an electrical return path.

In accordance with one or more embodiments, a surveillance system includes a processing system that includes a processor; a guided wave transceiver that transmits and receives communications by electromagnetic waves at a physical interface of a transmission medium, where the electromagnetic waves are guided by the transmission medium and propagate without utilizing an electrical return path; at least one sensor device; and a memory that stores executable instructions that, when executed by the processing system, facilitate performance of operations. The operations include generating surveillance data based on sensor input to the at least one sensor device. A plurality of electromagnetic waves are generated for transmission to an administrator of the surveillance system via the guided wave transceiver, where the plurality of electromagnetic waves include a surveillance data signal generated based on the surveillance data.

In accordance with one or more embodiments, a surveillance system includes means for generating surveillance data based on sensor input to at least one sensor device coupled to the surveillance system. The surveillance system further includes means for generating a plurality of electromagnetic waves for transmission to an administrator of the surveillance system. The plurality of electromagnetic waves are guided by at least one transmission medium and propagate without utilizing an electrical return path and where the plurality of electromagnetic waves include a surveillance data signal generated based on the surveillance data.

In accordance with one or more embodiments, a method for use by a guided wave repeater system that includes a processor and a guided wave transceiver includes receiving via the guided wave transceiver a first plurality of electromagnetic waves that include a first communication signal, where the first plurality of electromagnetic waves are guided by a power line of a utility pole and propagate without utilizing an electrical return. A second plurality of electromagnetic waves that include a second communication signal transmitting via the guided wave transceiver, where the second plurality of electromagnetic waves are guided by a power line of a utility pole and propagate without utilizing an electrical return. A third communication signal are received from a smart grid device. A fourth communication signal is transmitted to the smart grid device.

In accordance with one or more embodiments, a method for use by a utilities management system that includes a processor and a guided wave transceiver includes receiving a first plurality of electromagnetic waves, guided by at least one transmission medium and propagating without utilizing an electrical return path, where the first plurality of electromagnetic waves include a plurality of utility status signals sent from a plurality of utility sensors located at a plurality of supervised sites. Utility control data is generated based on the plurality of utility status signals. A second plurality of electromagnetic waves are generated for transmission via the guided wave transceiver. The second plurality of electromagnetic waves are guided by the at least one transmission medium and propagate without utilizing an electrical return path, and the second plurality of electromagnetic waves include least one control signal that includes at least one utility deployment instruction for at least one of the plurality of supervised sites based on the utility control data.

In accordance with one or more embodiments, a method for use by a broadcast communication system that includes a processor and a guided wave transceiver includes detecting a first power outage. A first plurality of electromagnetic waves are generated for transmission to a plurality of user devices of the broadcast communication system via the guided wave transceiver, where the first plurality of electromagnetic waves include an outage status signal generated in response to detecting the first power outage, and where the first plurality of electromagnetic waves are guided by at least one transmission medium and propagate without utilizing an electrical return path.

In accordance with one or more embodiments, a method for use by a surveillance system that includes a processor and a guided wave transceiver includes generating surveillance data based on sensor input to at least one sensor device coupled to the surveillance system. A plurality of electromagnetic waves are generated for transmission to an administrator of the surveillance system via the guided wave transceiver, where the plurality of electromagnetic waves are guided by at least one transmission medium and propagate without utilizing an electrical return path, and where the plurality of electromagnetic waves include a surveillance data signal generated based on the surveillance data.

Referring now to FIG. 1, a block diagram 100 illustrating an example, non-limiting embodiment of a guided wave communications system is shown. In operation, a transmission device 101 receives one or more communication signals 110 from a communication network or other communications device that includes data and generates guided waves 120 to convey the data via the transmission medium 125 to the transmission device 102. The transmission device 102 receives the guided waves 120 and converts them to communication signals 112 that include the data for transmission to a communications network or other communications device. The guided waves 120 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The communication network or networks can include a wireless communication network such as a mobile data network, a cellular voice and data network, a wireless local area network (e.g., WiFi or an 802.xx network), a satellite communications network, a personal area network or other wireless network. The communication network or networks can also include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway or automobile, laptop computer, tablet, smartphone, cellular telephone, or other communication device.

In an example embodiment, the guided wave communication system 100 can operate in a bi-directional fashion where transmission device 102 receives one or more communication signals 112 from a communication network or device that includes other data and generates guided waves 122 to convey the other data via the transmission medium 125 to the transmission device 101. In this mode of operation, the transmission device 101 receives the guided waves 122 and converts them to communication signals 110 that include the other data for transmission to a communications network or device. The guided waves 122 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The transmission medium 125 can include a cable having at least one inner portion surrounded by a dielectric material such as an insulator or other dielectric cover, coating or other dielectric material, the dielectric material having an outer surface and a corresponding circumference. In an example embodiment, the transmission medium 125 operates as a single-wire transmission line to guide the transmission of an electromagnetic wave. When the transmission medium 125 is implemented as a single wire transmission system, it can include a wire. The wire can be insulated or uninsulated, and single-stranded or multi-stranded (e.g., braided). In other embodiments, the transmission medium 125 can contain conductors of other shapes or configurations including wire bundles, cables, rods, rails, pipes. In addition, the transmission medium 125 can include non-conductors such as dielectric pipes, rods, rails, or other dielectric members; combinations of conductors and dielectric materials, conductors without dielectric materials or other guided wave transmission media. It should be noted that the transmission medium 125 can otherwise include any of the transmission media previously discussed.

Further, as previously discussed, the guided waves 120 and 122 can be contrasted with radio transmissions over free space/air or conventional propagation of electrical power or signals through the conductor of a wire via an electrical circuit. In addition to the propagation of guided waves 120 and 122, the transmission medium 125 may optionally contain one or more wires that propagate electrical power or other communication signals in a conventional manner as a part of one or more electrical circuits.

Figure 2:
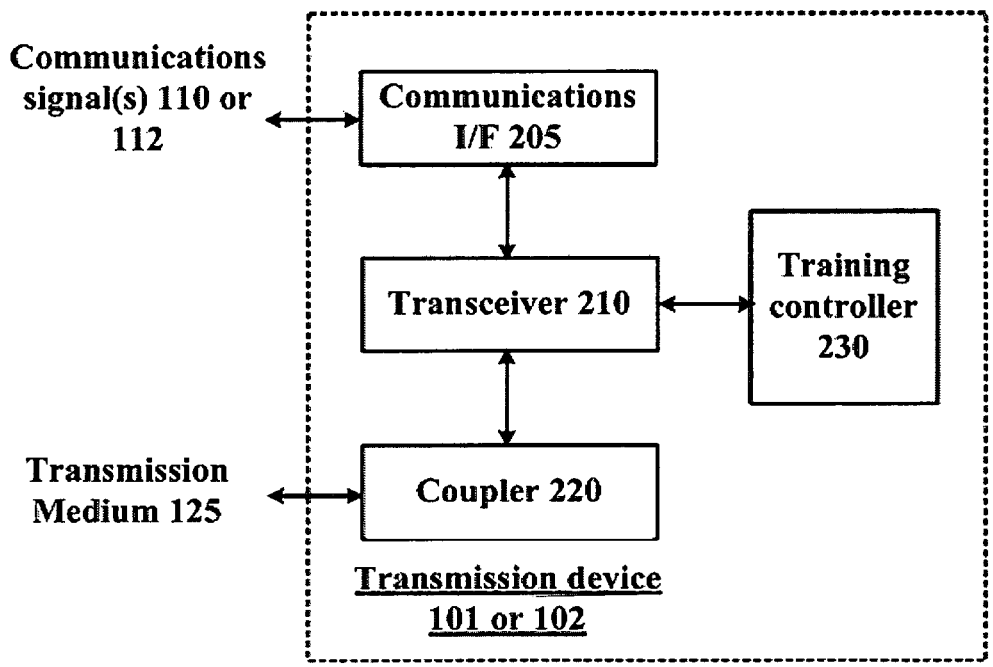
FIG. 2 is a block diagram illustrating an example, non-limiting embodiment of a transmission device in accordance with various aspects described herein.

Referring now to FIG. 2, a block diagram 200 illustrating an example, non-limiting embodiment of a transmission device is shown. The transmission device 101 or 102 includes a communications interface (I/F) 205, a transceiver 210 and a coupler 220.

In an example of operation, the communications interface 205 receives a communication signal 110 or 112 that includes data. In various embodiments, the communications interface 205 can include a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth protocol, ZigBee protocol, a direct broadcast satellite (DBS) or other satellite communication protocol or other wireless protocol. In addition or in the alternative, the communications interface 205 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 205 can operate in conjunction with other wired or wireless protocol. In addition, the communications interface 205 can optionally operate in conjunction with a protocol stack that includes multiple protocol layers including a MAC protocol, transport protocol, application protocol, etc.

In an example of operation, the transceiver 210 generates an electromagnetic wave based on the communication signal 110 or 112 to convey the data. The electromagnetic wave has at least one carrier frequency and at least one corresponding wavelength. The carrier frequency can be within a millimeter-wave frequency band of 30 GHz-300 GHz, such as 60 GHz or a carrier frequency in the range of 30-40 GHz or a lower frequency band of 300 MHz-30 GHz in the microwave frequency range such as 26-30 GHz, 11 GHz, 6 GHz or 3 GHz, but it will be appreciated that other carrier frequencies are possible in other embodiments. In one mode of operation, the transceiver 210 merely upconverts the communications signal or signals 110 or 112 for transmission of the electromagnetic signal in the microwave or millimeter-wave band as a guided electromagnetic wave that is guided by or bound to the transmission medium 125. In another mode of operation, the communications interface 205 either converts the communication signal 110 or 112 to a baseband or near baseband signal or extracts the data from the communication signal 110 or 112 and the transceiver 210 modulates a high-frequency carrier with the data, the baseband or near baseband signal for transmission. It should be appreciated that the transceiver 210 can modulate the data received via the communication signal 110 or 112 to preserve one or more data communication protocols of the communication signal 110 or 112 either by encapsulation in the payload of a different protocol or by simple frequency shifting. In the alternative, the transceiver 210 can otherwise translate the data received via the communication signal 110 or 112 to a protocol that is different from the data communication protocol or protocols of the communication signal 110 or 112.

In an example of operation, the coupler 220 couples the electromagnetic wave to the transmission medium 125 as a guided electromagnetic wave to convey the communications signal or signals 110 or 112. While the prior description has focused on the operation of the transceiver 210 as a transmitter, the transceiver 210 can also operate to receive electromagnetic waves that convey other data from the single wire transmission medium via the coupler 220 and to generate communications signals 110 or 112, via communications interface 205 that includes the other data. Consider embodiments where an additional guided electromagnetic wave conveys other data that also propagates along the transmission medium 125. The coupler 220 can also couple this additional electromagnetic wave from the transmission medium 125 to the transceiver 210 for reception.

The transmission device 101 or 102 includes an optional training controller 230. In an example embodiment, the training controller 230 is implemented by a standalone processor or a processor that is shared with one or more other components of the transmission device 101 or 102. The training controller 230 selects the carrier frequencies, modulation schemes and/or guided wave modes for the guided electromagnetic waves based on feedback data received by the transceiver 210 from at least one remote transmission device coupled to receive the guided electromagnetic wave.

In an example embodiment, a guided electromagnetic wave transmitted by a remote transmission device 101 or 102 conveys data that also propagates along the transmission medium 125. The data from the remote transmission device 101 or 102 can be generated to include the feedback data. In operation, the coupler 220 also couples the guided electromagnetic wave from the transmission medium 125 and the transceiver receives the electromagnetic wave and processes the electromagnetic wave to extract the feedback data.

In an example embodiment, the training controller 230 operates based on the feedback data to evaluate a plurality of candidate frequencies, modulation schemes and/or transmission modes to select a carrier frequency, modulation scheme and/or transmission mode to enhance performance, such as throughput, signal strength, reduce propagation loss, etc.

Consider the following example: a transmission device 101 begins operation under control of the training controller 230 by sending a plurality of guided waves as test signals such as pilot waves or other test signals at a corresponding plurality of candidate frequencies and/or candidate modes directed to a remote transmission device 102 coupled to the transmission medium 125. The guided waves can include, in addition or in the alternative, test data. The test data can indicate the particular candidate frequency and/or guidewave mode of the signal. In an embodiment, the training controller 230 at the remote transmission device 102 receives the test signals and/or test data from any of the guided waves that were properly received and determines the best candidate frequency and/or guided wave mode, a set of acceptable candidate frequencies and/or guided wave modes, or a rank ordering of candidate frequencies and/or guided wave modes. This selection of candidate frequenc(ies) or/and guided-mode(s) are generated by the training controller 230 based on one or more optimizing criteria such as received signal strength, bit error rate, packet error rate, signal to noise ratio, propagation loss, etc. The training controller 230 generates feedback data that indicates the selection of candidate frequenc(ies) or/and guided wave mode(s) and sends the feedback data to the transceiver 210 for transmission to the transmission device 101. The transmission device 101 and 102 can then communicate data with one another based on the selection of candidate frequenc(ies) or/and guided wave mode(s).

In other embodiments, the guided electromagnetic waves that contain the test signals and/or test data are reflected back, repeated back or otherwise looped back by the remote transmission device 102 to the transmission device 101 for reception and analysis by the training controller 230 of the transmission device 101 that initiated these waves. For example, the transmission device 101 can send a signal to the remote transmission device 102 to initiate a test mode where a physical reflector is switched on the line, a termination impedance is changed to cause reflections, a loop back mode is switched on to couple electromagnetic waves back to the source transmission device 102, and/or a repeater mode is enabled to amplify and retransmit the electromagnetic waves back to the source transmission device 102. The training controller 230 at the source transmission device 102 receives the test signals and/or test data from any of the guided waves that were properly received and determines selection of candidate frequenc(ies) or/and guided wave mode(s).

While the procedure above has been described in a start-up or initialization mode of operation, each transmission device 101 or 102 can send test signals, evaluate candidate frequencies or guided wave modes via non-test such as normal transmissions or otherwise evaluate candidate frequencies or guided wave modes at other times or continuously as well. In an example embodiment, the communication protocol between the transmission devices 101 and 102 can include an on-request or periodic test mode where either full testing or more limited testing of a subset of candidate frequencies and guided wave modes are tested and evaluated. In other modes of operation, the re-entry into such a test mode can be triggered by a degradation of performance due to a disturbance, weather conditions, etc. In an example embodiment, the receiver bandwidth of the transceiver 210 is either sufficiently wide or swept to receive all candidate frequencies or can be selectively adjusted by the training controller 230 to a training mode where the receiver bandwidth of the transceiver 210 is sufficiently wide or swept to receive all candidate frequencies.

Figure 3:
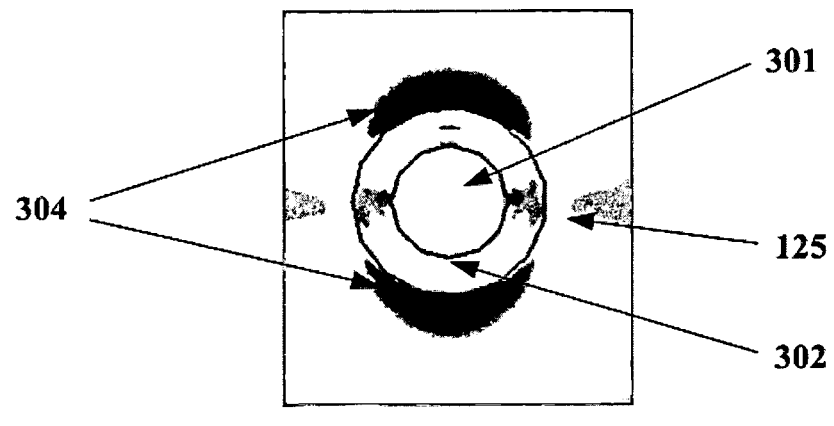
FIG. 3 is a graphical diagram illustrating an example, non-limiting embodiment of an electromagnetic field distribution in accordance with various aspects described herein.

Referring now to FIG. 3, a graphical diagram 300 illustrating an example, non-limiting embodiment of an electromagnetic field distribution is shown. In this embodiment, a transmission medium 125 in air includes an inner conductor 301 and an insulating jacket 302 of dielectric material, as shown in cross section. The diagram 300 includes different gray-scales that represent differing electromagnetic field strengths generated by the propagation of the guided wave having an asymmetrical and non-fundamental guided wave mode.

In particular, the electromagnetic field distribution corresponds to a modal "sweet spot" that enhances guided electromagnetic wave propagation along an insulated transmission medium and reduces end-to-end transmission loss. In this particular mode, electromagnetic waves are guided by the transmission medium 125 to propagate along an outer surface of the transmission medium—in this case, the outer surface of the insulating jacket 302. Electromagnetic waves are partially embedded in the insulator and partially radiating on the outer surface of the insulator. In this fashion, electromagnetic waves are "lightly" coupled to the insulator so as to enable electromagnetic wave propagation at long distances with low propagation loss.

As shown, the guided wave has a field structure that lies primarily or substantially outside of the transmission medium 125 that serves to guide the electromagnetic waves. The regions inside the conductor 301 have little or no field. Likewise, regions inside the insulating jacket 302 have low field strength. The majority of the electromagnetic field strength is distributed in the lobes 304 at the outer surface of the insulating jacket 302 and in close proximity thereof. The presence of an asymmetric guided wave mode is shown by the high electromagnetic field strengths at the top and bottom of the outer surface of the insulating jacket 302 (in the orientation of the diagram)—as opposed to very small field strengths on the other sides of the insulating jacket 302.

The example shown corresponds to a 38 GHz electromagnetic wave guided by a wire with a diameter of 1.1 cm and a dielectric insulation of thickness of 0.36 cm. Because the electromagnetic wave is guided by the transmission medium 125 and the majority of the field strength is concentrated in the air outside of the insulating jacket 302 within a limited distance of the outer surface, the guided wave can propagate longitudinally down the transmission medium 125 with very low loss. In the example shown, this "limited distance" corresponds to a distance from the outer surface that is less than half the largest cross sectional dimension of the transmission medium 125. In this case, the largest cross sectional dimension of the wire corresponds to the overall diameter of 1.82 cm, however, this value can vary with the size and shape of the transmission medium 125. For example, should the transmission medium 125 be of a rectangular shape with a height of 0.3 cm and a width of 0.4 cm, the largest cross sectional dimension would be the diagonal of 0.5 cm and the corresponding limited distance would be 0.25 cm. The dimensions of the area containing the majority of the field strength also vary with the frequency, and in general, increase as carrier frequencies decrease.

It should also be noted that the components of a guided wave communication system, such as couplers and transmission media can have their own cut-off frequencies for each guided wave mode. The cut-off frequency generally sets forth the lowest frequency that a particular guided wave mode is designed to be supported by that particular component. In an example embodiment, the particular asymmetric mode of propagation shown is induced on the transmission medium 125 by an electromagnetic wave having a frequency that falls within a limited range (such as Fc to 2Fc) of the lower cut-off frequency Fc for this particular asymmetric mode. The lower cut-off frequency Fc is particular to the characteristics of transmission medium 125. For embodiments as shown that include an inner conductor 301 surrounded by an insulating jacket 302, this cutoff frequency can vary based on the dimensions and properties of the insulating jacket 302 and potentially the dimensions and properties of the inner conductor 301 and can be determined experimentally to have a desired mode pattern. It should be noted however, that similar effects can be found for a hollow dielectric or insulator without an inner conductor. In this case, the cutoff frequency can vary based on the dimensions and properties of the hollow dielectric or insulator.

At frequencies lower than the lower cut-off frequency, the asymmetric mode is difficult to induce in the transmission medium 125 and fails to propagate for all but trivial distances. As the frequency increases above the limited range of frequencies about the cut-off frequency, the asymmetric mode shifts more and more inward of the insulating jacket 302. At frequencies much larger than the cut-off frequency, the field strength is no longer concentrated outside of the insulating jacket, but primarily inside of the insulating jacket 302. While the transmission medium 125 provides strong guidance to the electromagnetic wave and propagation is still possible, ranges are more limited by increased losses due to propagation within the insulating jacket 302—as opposed to the surrounding air.

Figure 4:
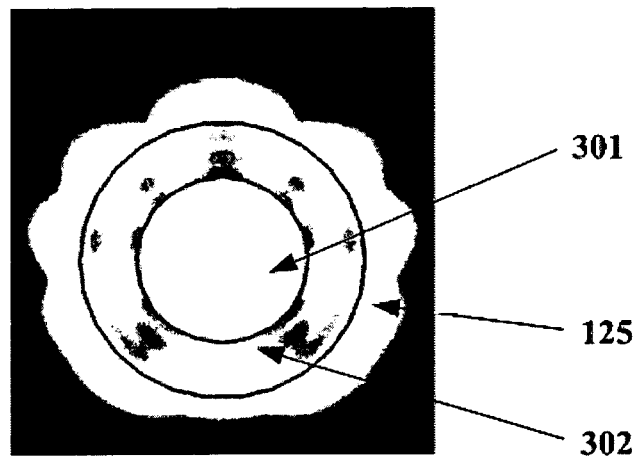
FIG. 4 is a graphical diagram illustrating an example, non-limiting embodiment of an electromagnetic field distribution in accordance with various aspects described herein.

Referring now to FIG. 4, a graphical diagram 400 illustrating an example, non-limiting embodiment of an electromagnetic field distribution is shown. In particular, a cross section diagram 400, similar to FIG. 3 is shown with common reference numerals used to refer to similar elements. The example shown corresponds to a 60 GHz wave guided by a wire with a diameter of 1.1 cm and a dielectric insulation of thickness of 0.36 cm. Because the frequency of the guided wave is above the limited range of the cut-off frequency of this particular asymmetric mode, much of the field strength has shifted inward of the insulating jacket 302. In particular, the field strength is concentrated primarily inside of the insulating jacket 302. While the transmission medium 125 provides strong guidance to the electromagnetic wave and propagation is still possible, ranges are more limited when compared with the embodiment of FIG. 3, by increased losses due to propagation within the insulating jacket 302.

Figure 5A:
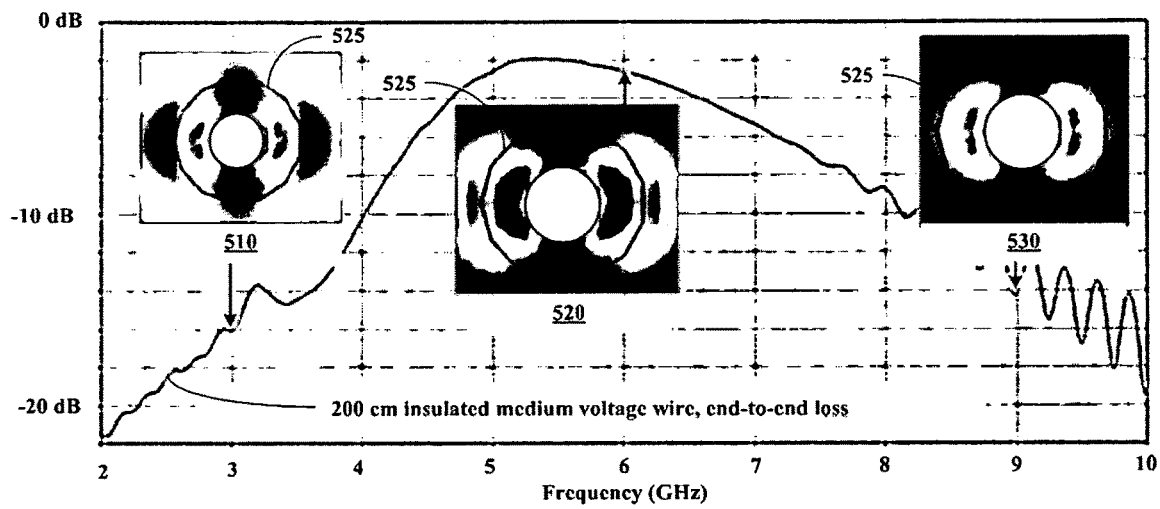
FIG. 5A is a graphical diagram illustrating an example, non-limiting embodiment of a frequency response in accordance with various aspects described herein.

Referring now to FIG. 5A, a graphical diagram illustrating an example, non-limiting embodiment of a frequency response is shown. In particular, diagram 500 presents a graph of end-to-end loss (in dB) as a function of frequency, overlaid with electromagnetic field distributions 510, 520 and 530 at three points for a 200 cm insulated medium voltage wire. The boundary between the insulator and the surrounding air is represented by reference numeral 525 in each electromagnetic field distribution.

As discussed in conjunction with FIG. 3, an example of a desired asymmetric mode of propagation shown is induced on the transmission medium 125 by an electromagnetic wave having a frequency that falls within a limited range (such as Fc to 2Fc) of the lower cut-off frequency Fc of the transmission medium for this particular asymmetric mode. In particular, the electromagnetic field distribution 520 at 6 GHz falls within this modal "sweet spot" that enhances electromagnetic wave propagation along an insulated transmission medium and reduces end-to-end transmission loss. In this particular mode, guided waves are partially embedded in the insulator and partially radiating on the outer surface of the insulator. In this fashion, the electromagnetic waves are "lightly" coupled to the insulator so as to enable guided electromagnetic wave propagation at long distances with low propagation loss.

At lower frequencies represented by the electromagnetic field distribution 510 at 3 GHz, the asymmetric mode radiates more heavily generating higher propagation losses. At higher frequencies represented by the electromagnetic field distribution 530 at 9 GHz, the asymmetric mode shifts more and more inward of the insulating jacket providing too much absorption, again generating higher propagation losses.

Figure 5B:
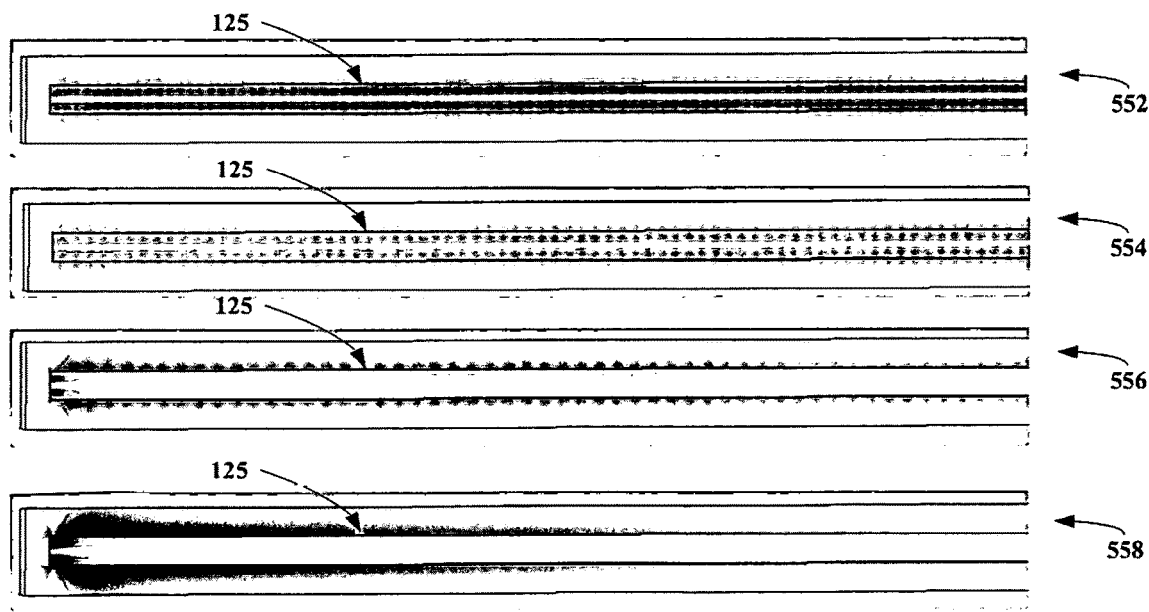
FIG. 5B is a graphical diagram illustrating example, non-limiting embodiments of a longitudinal cross-section of an insulated wire depicting fields of guided electromagnetic waves at various operating frequencies in accordance with various aspects described herein.

Referring now to FIG. 5B, a graphical diagram 550 illustrating example, non-limiting embodiments of a longitudinal cross-section of a transmission medium 125, such as an insulated wire, depicting fields of guided electromagnetic waves at various operating frequencies is shown. As shown in diagram 556, when the guided electromagnetic waves are at approximately the cutoff frequency ($f_c$) corresponding to the modal "sweet spot", the guided electromagnetic waves are loosely coupled to the insulated wire so that absorption is reduced, and the fields of the guided electromagnetic waves are bound sufficiently to reduce the amount radiated into the environment (e.g., air). Because absorption and radiation of the fields of the guided electromagnetic waves is low, propagation losses are consequently low, enabling the guided electromagnetic waves to propagate for longer distances.

As shown in diagram 554, propagation losses increase when an operating frequency of the guide electromagnetic waves increases above about two-times the cutoff frequency ($f_c$)—or as referred to, above the range of the "sweet spot". More of the field strength of the electromagnetic wave is driven inside the insulating layer, increasing propagation losses. At frequencies much higher than the cutoff frequency ($f_c$) the guided electromagnetic waves are strongly bound to the insulated wire as a result of the fields emitted by the guided electromagnetic waves being concentrated in the insulation layer of the wire, as shown in diagram 552. This in turn raises propagation losses further due to absorption of the guided electromagnetic waves by the insulation layer. Similarly, propagation losses increase when the operating frequency of the guided electromagnetic waves is substantially below the cutoff frequency ($f_c$), as shown in diagram 558. At frequencies much lower than the cutoff frequency ($f_c$) the guided electromagnetic waves are weakly (or nominally) bound to the insulated wire and thereby tend to radiate into the environment (e.g., air), which in turn, raises propagation losses due to radiation of the guided electromagnetic waves.

Figure 6:
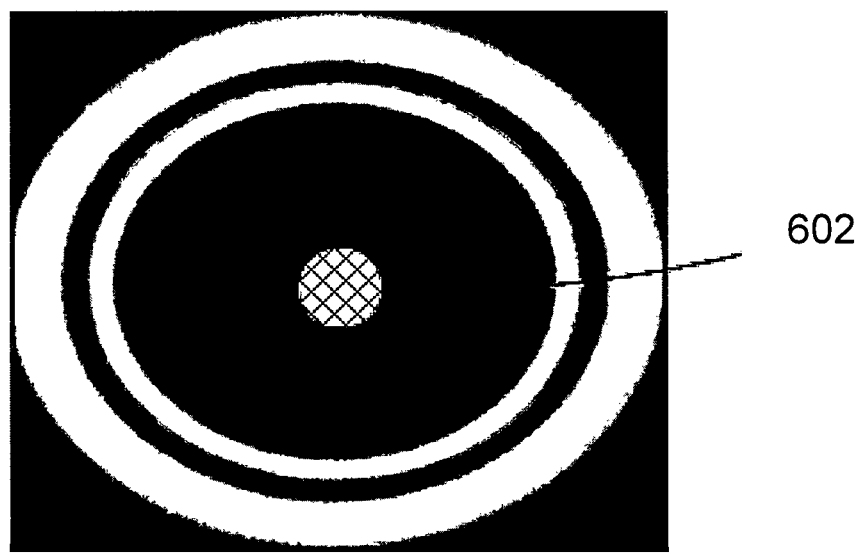
FIG. 6 is a graphical diagram illustrating an example, non-limiting embodiment of an electromagnetic field distribution in accordance with various aspects described herein.

Referring now to FIG. 6, a graphical diagram 600 illustrating an example, non-limiting embodiment of an electromagnetic field distribution is shown. In this embodiment, a transmission medium 602 is a bare wire, as shown in cross section. The diagram 300 includes different gray-scales that represent differing electromagnetic field strengths generated by the propagation of a guided wave having a symmetrical and fundamental guided wave mode at a single carrier frequency.

In this particular mode, electromagnetic waves are guided by the transmission medium 602 to propagate along an outer surface of the transmission medium—in this case, the outer surface of the bare wire. Electromagnetic waves are "lightly" coupled to the wire so as to enable electromagnetic wave propagation at long distances with low propagation loss. As shown, the guided wave has a field structure that lies substantially outside of the transmission medium 602 that serves to guide the electromagnetic waves. The regions inside the conductor have little or no field.

Figure 7:
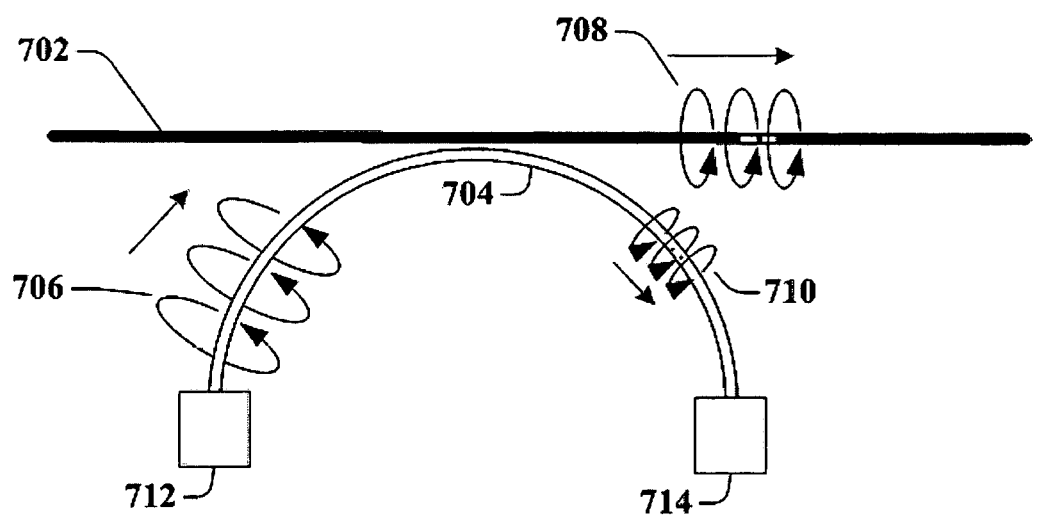
FIG. 7 is a block diagram illustrating an example, non-limiting embodiment of an arc coupler in accordance with various aspects described herein.

Referring now to FIG. 7, a block diagram 700 illustrating an example, non-limiting embodiment of an arc coupler is shown. In particular, a coupling device is presented for use in a transmission device, such as transmission device 101 or 102 presented in conjunction with FIG. 1. The coupling device includes an arc coupler 704 coupled to a transmitter circuit 712 and termination or damper 714. The arc coupler 704 can be made of a dielectric material, or other low-loss insulator (e.g., Teflon, polyethylene, etc.), or made of a conducting (e.g., metallic, non-metallic, etc.) material, or any combination of the foregoing materials. As shown, the arc coupler 704 operates as a waveguide and has a wave 706 propagating as a guided wave about a waveguide surface of the arc coupler 704. In the embodiment shown, at least a portion of the arc coupler 704 can be placed near a wire 702 or other transmission medium, (such as transmission medium 125), in order to facilitate coupling between the arc coupler 704 and the wire 702 or other transmission medium, as described herein to launch the guided wave 708 on the wire. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 706 travelling along the arc coupler 704 couples, at least in part, to the wire 702, and propagates as guided wave 708 around or about the wire surface of the wire 702 and longitudinally along the wire 702. The guided wave 708 can be characterized as a surface wave or other electromagnetic wave that is guided by or bound to the wire 702 or other transmission medium.

A portion of the wave 706 that does not couple to the wire 702 propagates as a wave 710 along the arc coupler 704. It will be appreciated that the arc coupler 704 can be configured and arranged in a variety of positions in relation to the wire 702 to achieve a desired level of coupling or non-coupling of the wave 706 to the wire 702. For example, the curvature and/or length of the arc coupler 704 that is parallel or substantially parallel, as well as its separation distance (which can include zero separation distance in an embodiment), to the wire 702 can be varied without departing from example embodiments. Likewise, the arrangement of arc coupler 704 in relation to the wire 702 may be varied based upon considerations of the respective intrinsic characteristics (e.g., thickness, composition, electromagnetic properties, etc.) of the wire 702 and the arc coupler 704, as well as the characteristics (e.g., frequency, energy level, etc.) of the waves 706 and 708.

The guided wave 708 stays parallel or substantially parallel to the wire 702, even as the wire 702 bends and flexes. Bends in the wire 702 can increase transmission losses, which are also dependent on wire diameters, frequency, and materials. If the dimensions of the arc coupler 704 are chosen for efficient power transfer, most of the power in the wave 706 is transferred to the wire 702, with little power remaining in wave 710. It will be appreciated that the guided wave 708 can still be multi-modal in nature (discussed herein), including having modes that are non-fundamental or asymmetric, while traveling along a path that is parallel or substantially parallel to the wire 702, with or without a fundamental transmission mode. In an embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an embodiment, substantially parallel can include approximations that are within 30 degrees of true parallel in all dimensions.

In an embodiment, the wave 706 can exhibit one or more wave propagation modes. The arc coupler modes can be dependent on the shape and/or design of the coupler 704. The one or more arc coupler modes of wave 706 can generate, influence, or impact one or more wave propagation modes of the guided wave 708 propagating along wire 702. It should be particularly noted however that the guided wave modes present in the guided wave 706 may be the same or different from the guided wave modes of the guided wave 708. In this fashion, one or more guided wave modes of the guided wave 706 may not be transferred to the guided wave 708, and further one or more guided wave modes of guided wave 708 may not have been present in guided wave 706. It should also be noted that the cut-off frequency of the arc coupler 704 for a particular guided wave mode may be different than the cutoff frequency of the wire 702 or other transmission medium for that same mode. For example, while the wire 702 or other transmission medium may be operated slightly above its cutoff frequency for a particular guided wave mode, the arc coupler 704 may be operated well above its cut-off frequency for that same mode for low loss, slightly below its cut-off frequency for that same mode to, for example, induce greater coupling and power transfer, or some other point in relation to the arc coupler's cutoff frequency for that mode.

In an embodiment, the wave propagation modes on the wire 702 can be similar to the arc coupler modes since both waves 706 and 708 propagate about the outside of the arc coupler 704 and wire 702 respectively. In some embodiments, as the wave 706 couples to the wire 702, the modes can change form, or new modes can be created or generated, due to the coupling between the arc coupler 704 and the wire 702. For example, differences in size, material, and/or impedances of the arc coupler 704 and wire 702 may create additional modes not present in the arc coupler modes and/or suppress some of the arc coupler modes. The wave propagation modes can comprise the fundamental transverse electromagnetic mode (Quasi-TEM$_{00}$), where only small electric and/or magnetic fields extend in the direction of propagation, and the electric and magnetic fields extend radially outwards while the guided wave propagates along the wire. This guided wave mode can be donut shaped, where few of the electromagnetic fields exist within the arc coupler 704 or wire 702.

Waves 706 and 708 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the arc coupler 704, the dimensions and composition of the wire 702, as well as its surface characteristics, its insulation if present, the electromagnetic properties of the surrounding environment, etc. It should be noted that, depending on the frequency, the electrical and physical characteristics of the wire 702 and the particular wave propagation modes that are generated, guided wave 708 can travel along the conductive surface of an oxidized uninsulated wire, an unoxidized uninsulated wire, an insulated wire and/or along the insulating surface of an insulated wire.

In an embodiment, a diameter of the arc coupler 704 is smaller than the diameter of the wire 702. For the millimeter-band wavelength being used, the arc coupler 704 supports a single waveguide mode that makes up wave 706. This single waveguide mode can change as it couples to the wire 702 as guided wave 708. If the arc coupler 704 were larger, more than one waveguide mode can be supported, but these additional waveguide modes may not couple to the wire 702 as efficiently, and higher coupling losses can result. However, in some alternative embodiments, the diameter of the arc coupler 704 can be equal to or larger than the diameter of the wire 702, for example, where higher coupling losses are desirable or when used in conjunction with other techniques to otherwise reduce coupling losses (e.g., impedance matching with tapering, etc.).

In an embodiment, the wavelength of the waves 706 and 708 are comparable in size, or smaller than a circumference of the arc coupler 704 and the wire 702. In an example, if the wire 702 has a diameter of 0.5 cm, and a corresponding circumference of around 1.5 cm, the wavelength of the transmission is around 1.5 cm or less, corresponding to a frequency of 70 GHz or greater. In another embodiment, a suitable frequency of the transmission and the carrier-wave signal is in the range of 30-100 GHz, perhaps around 30-60 GHz, and around 38 GHz in one example. In an embodiment, when the circumference of the arc coupler 704 and wire 702 is comparable in size to, or greater, than a wavelength of the transmission, the waves 706 and 708 can exhibit multiple wave propagation modes including fundamental and/or non-fundamental (symmetric and/or asymmetric) modes that propagate over sufficient distances to support various communication systems described herein. The waves 706 and 708 can therefore comprise more than one type of electric and magnetic field configuration. In an embodiment, as the guided wave 708 propagates down the wire 702, the electrical and magnetic field configurations will remain the same from end to end of the wire 702. In other embodiments, as the guided wave 708 encounters interference (distortion or obstructions) or loses energy due to transmission losses or scattering, the electric and magnetic field configurations can change as the guided wave 708 propagates down wire 702.

In an embodiment, the arc coupler 704 can be composed of nylon, Teflon, polyethylene, a polyamide, or other plastics. In other embodiments, other dielectric materials are possible. The wire surface of wire 702 can be metallic with either a bare metallic surface, or can be insulated using plastic, dielectric, insulator or other coating, jacket or sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 702 (e.g., resulting from exposure of the bare metallic surface to oxygen/air) can also provide insulating or dielectric properties similar to those provided by some insulators or sheathings.

It is noted that the graphical representations of waves 706, 708 and 710 are presented merely to illustrate the principles that wave 706 induces or otherwise launches a guided wave 708 on a wire 702 that operates, for example, as a single wire transmission line. Wave 710 represents the portion of wave 706 that remains on the arc coupler 704 after the generation of guided wave 708. The actual electric and magnetic fields generated as a result of such wave propagation may vary depending on the frequencies employed, the particular wave propagation mode or modes, the design of the arc coupler 704, the dimensions and composition of the wire 702, as well as its surface characteristics, its optional insulation, the electromagnetic properties of the surrounding environment, etc.

It is noted that arc coupler 704 can include a termination circuit or damper 714 at the end of the arc coupler 704 that can absorb leftover radiation or energy from wave 710. The termination circuit or damper 714 can prevent and/or minimize the leftover radiation or energy from wave 710 reflecting back toward transmitter circuit 712. In an embodiment, the termination circuit or damper 714 can include termination resistors, and/or other components that perform impedance matching to attenuate reflection. In some embodiments, if the coupling efficiencies are high enough, and/or wave 710 is sufficiently small, it may not be necessary to use a termination circuit or damper 714. For the sake of simplicity, these transmitter 712 and termination circuits or dampers 714 may not be depicted in the other figures, but in those embodiments, transmitter and termination circuits or dampers may possibly be used.

Further, while a single arc coupler 704 is presented that generates a single guided wave 708, multiple arc couplers 704 placed at different points along the wire 702 and/or at different azimuthal orientations about the wire can be employed to generate and receive multiple guided waves 708 at the same or different frequencies, at the same or different phases, at the same or different wave propagation modes.

Figure 8:
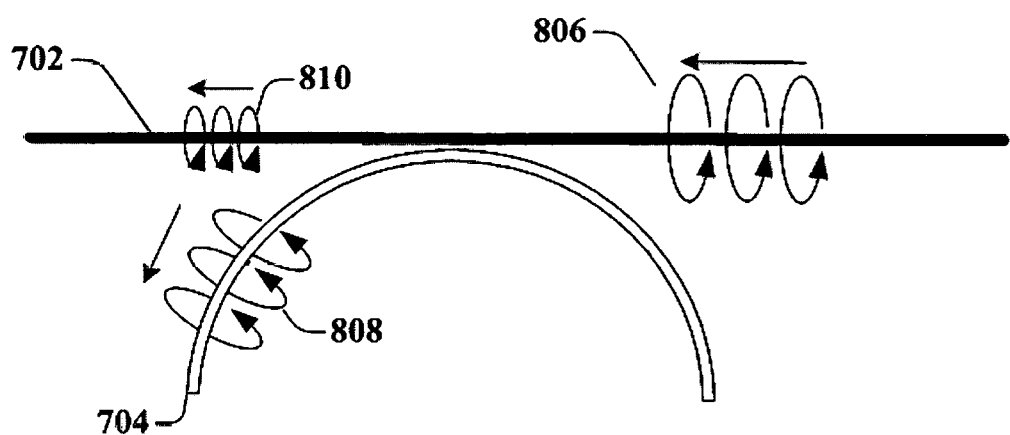
FIG. 8 is a block diagram illustrating an example, non-limiting embodiment of an arc coupler in accordance with various aspects described herein.

FIG. 8, a block diagram 800 illustrating an example, non-limiting embodiment of an arc coupler is shown. In the embodiment shown, at least a portion of the coupler 704 can be placed near a wire 702 or other transmission medium, (such as transmission medium 125), in order to facilitate coupling between the arc coupler 704 and the wire 702 or other transmission medium, to extract a portion of the guided wave 806 as a guided wave 808 as described herein. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 806 travelling along the wire 702 couples, at least in part, to the arc coupler 704, and propagates as guided wave 808 along the arc coupler 704 to a receiving device (not expressly shown). A portion of the wave 806 that does not couple to the arc coupler propagates as wave 810 along the wire 702 or other transmission medium.

In an embodiment, the wave 806 can exhibit one or more wave propagation modes. The arc coupler modes can be dependent on the shape and/or design of the coupler 704. The one or more modes of guided wave 806 can generate, influence, or impact one or more guide-wave modes of the guided wave 808 propagating along the arc coupler 704. It should be particularly noted however that the guided wave modes present in the guided wave 806 may be the same or different from the guided wave modes of the guided wave 808. In this fashion, one or more guided wave modes of the guided wave 806 may not be transferred to the guided wave 808, and further one or more guided wave modes of guided wave 808 may not have been present in guided wave 806.

Figure 9A:
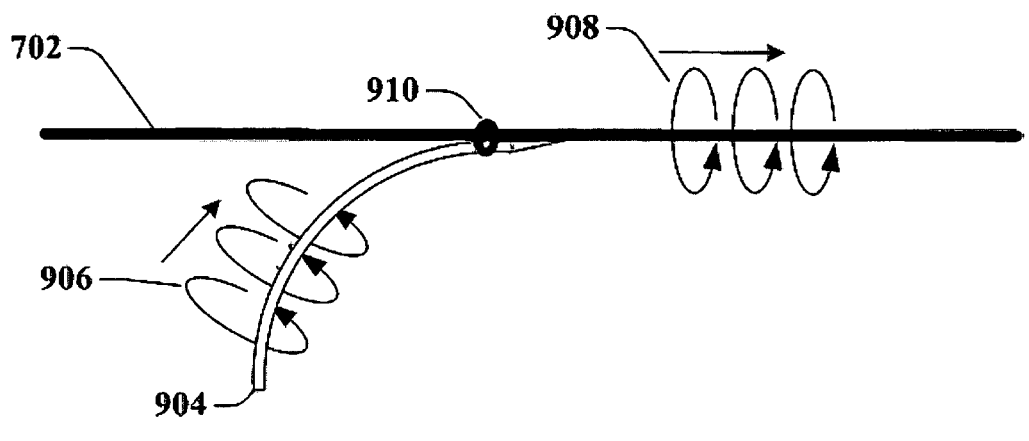
FIG. 9A is a block diagram illustrating an example, non-limiting embodiment of a stub coupler in accordance with various aspects described herein.

Referring now to FIG. 9A, a block diagram 900 illustrating an example, non-limiting embodiment of a stub coupler is shown. In particular, a coupling device that includes stub coupler 904 is presented for use in a transmission device, such as transmission device 101 or 102 presented in conjunction with FIG. 1. The stub coupler 904 can be made of a dielectric material, or other low-loss insulator (e.g., Teflon, polyethylene and etc.), or made of a conducting (e.g., metallic, non-metallic, etc.) material, or any combination of the foregoing materials. As shown, the stub coupler 904 operates as a waveguide and has a wave 906 propagating as a guided wave about a waveguide surface of the stub coupler 904. In the embodiment shown, at least a portion of the stub coupler 904 can be placed near a wire 702 or other transmission medium, (such as transmission medium 125), in order to facilitate coupling between the stub coupler 904 and the wire 702 or other transmission medium, as described herein to launch the guided wave 908 on the wire.

In an embodiment, the stub coupler 904 is curved, and an end of the stub coupler 904 can be tied, fastened, or otherwise mechanically coupled to a wire 702. When the end of the stub coupler 904 is fastened to the wire 702, the end of the stub coupler 904 is parallel or substantially parallel to the wire 702. Alternatively, another portion of the dielectric waveguide beyond an end can be fastened or coupled to wire 702 such that the fastened or coupled portion is parallel or substantially parallel to the wire 702. The fastener 910 can be a nylon cable tie or other type of non-conducting/dielectric material that is either separate from the stub coupler 904 or constructed as an integrated component of the stub coupler 904. The stub coupler 904 can be adjacent to the wire 702 without surrounding the wire 702.

Like the arc coupler 704 described in conjunction with FIG. 7, when the stub coupler 904 is placed with the end parallel to the wire 702, the guided wave 906 travelling along the stub coupler 904 couples to the wire 702, and propagates as guided wave 908 about the wire surface of the wire 702. In an example embodiment, the guided wave 908 can be characterized as a surface wave or other electromagnetic wave.

It is noted that the graphical representations of waves 906 and 908 are presented merely to illustrate the principles that wave 906 induces or otherwise launches a guided wave 908 on a wire 702 that operates, for example, as a single wire transmission line. The actual electric and magnetic fields generated as a result of such wave propagation may vary depending on one or more of the shape and/or design of the coupler, the relative position of the dielectric waveguide to the wire, the frequencies employed, the design of the stub coupler 904, the dimensions and composition of the wire 702, as well as its surface characteristics, its optional insulation, the electromagnetic properties of the surrounding environment, etc.

In an embodiment, an end of stub coupler 904 can taper towards the wire 702 in order to increase coupling efficiencies. Indeed, the tapering of the end of the stub coupler 904 can provide impedance matching to the wire 702 and reduce reflections, according to an example embodiment of the subject disclosure. For example, an end of the stub coupler 904 can be gradually tapered in order to obtain a desired level of coupling between waves 906 and 908 as illustrated in FIG. 9A.

In an embodiment, the fastener 910 can be placed such that there is a short length of the stub coupler 904 between the fastener 910 and an end of the stub coupler 904. Maximum coupling efficiencies are realized in this embodiment when the length of the end of the stub coupler 904 that is beyond the fastener 910 is at least several wavelengths long for whatever frequency is being transmitted.

Figure 9B:
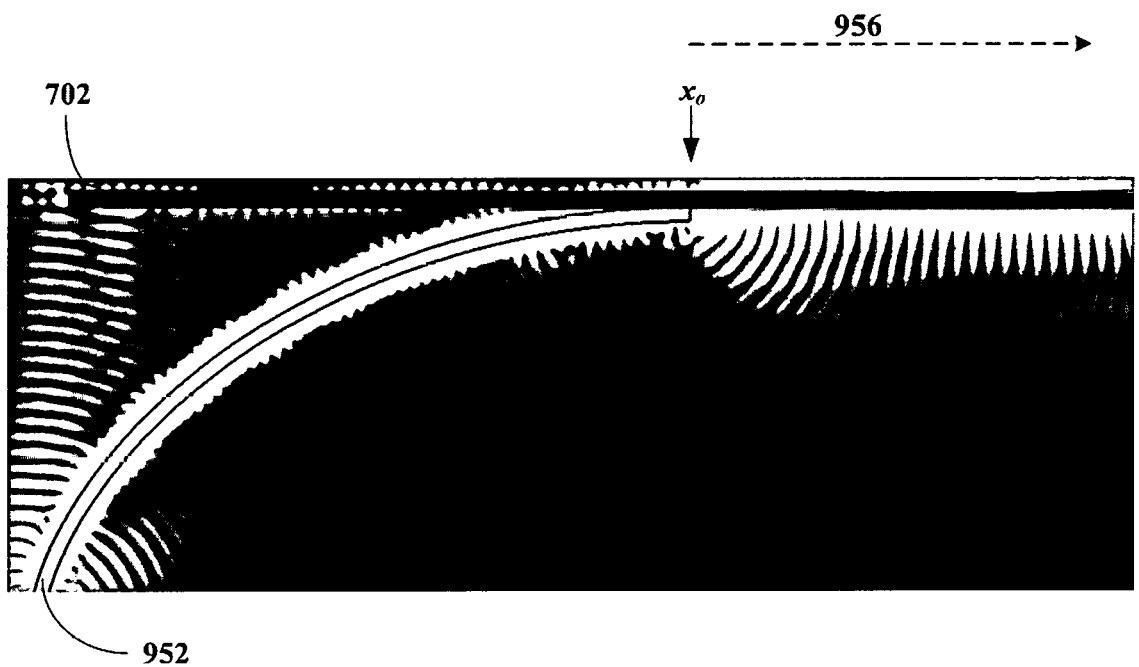
FIG. 9B is a diagram illustrating an example, non-limiting embodiment of an electromagnetic distribution in accordance with various aspects described herein.

Turning now to FIG. 9B, a diagram 950 illustrating an example, non-limiting embodiment of an electromagnetic distribution in accordance with various aspects described herein is shown. In particular, an electromagnetic distribution is presented in two dimensions for a transmission device that includes coupler 952, shown in an example stub coupler constructed of a dielectric material. The coupler 952 couples an electromagnetic wave for propagation as a guided wave along an outer surface of a wire 702 or other transmission medium.

The coupler 952 guides the electromagnetic wave to a junction at $x_0$ via a symmetrical guided wave mode. While some of the energy of the electromagnetic wave that propagates along the coupler 952 is outside of the coupler 952, the majority of the energy of this electromagnetic wave is contained within the coupler 952. The junction at $x_0$ couples the electromagnetic wave to the wire 702 or other transmission medium at an azimuthal angle corresponding to the bottom of the transmission medium. This coupling induces an electromagnetic wave that is guided to propagate along the outer surface of the wire 702 or other transmission medium via at least one guided wave mode in direction 956. The majority of the energy of the guided electromagnetic wave is outside or, but in close proximity to the outer surface of the wire 702 or other transmission medium. In the example shown, the junction at $x_0$ forms an electromagnetic wave that propagates via both a symmetrical mode and at least one asymmetrical surface mode, such as the first order mode presented in conjunction with FIG. 3, that skims the surface of the wire 702 or other transmission medium.

It is noted that the graphical representations of guided waves are presented merely to illustrate an example of guided wave coupling and propagation. The actual electric and magnetic fields generated as a result of such wave propagation may vary depending on the frequencies employed, the design and/or configuration of the coupler 952, the dimensions and composition of the wire 702 or other transmission medium, as well as its surface characteristics, its insulation if present, the electromagnetic properties of the surrounding environment, etc.

Figure 10A:
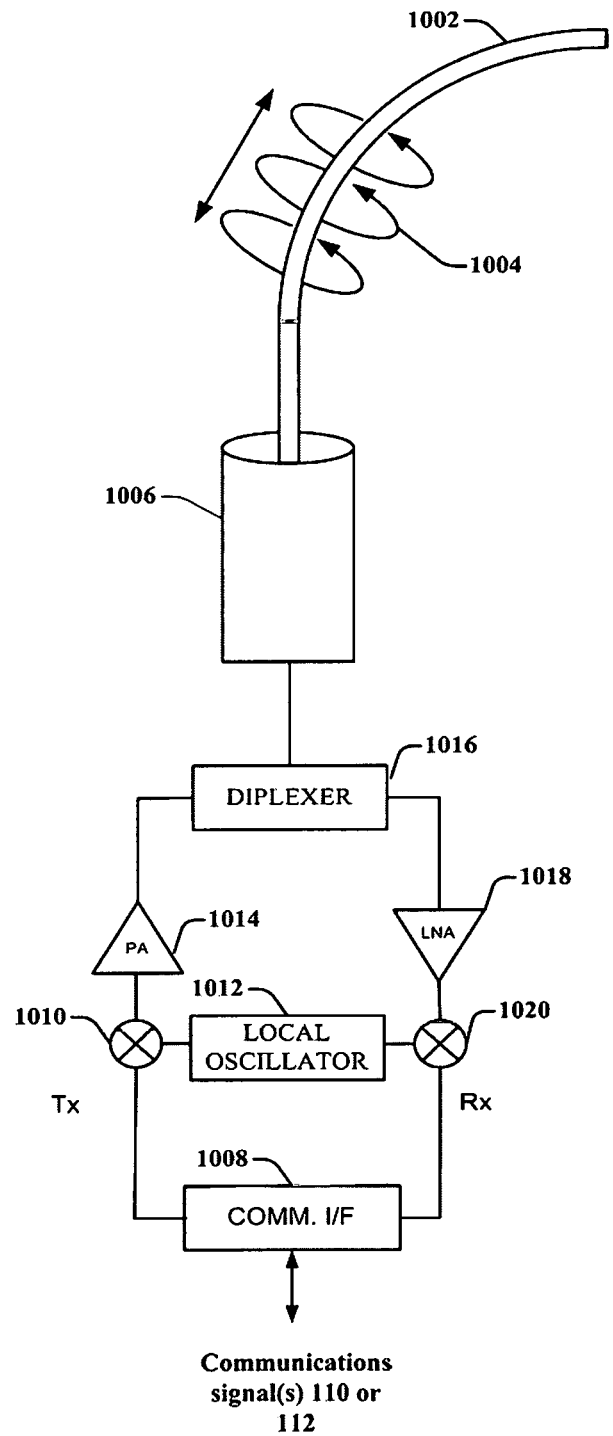
FIGS. 10A and 10B are block diagrams illustrating example, non-limiting embodiments of couplers and transceivers in accordance with various aspects described herein.

Turning now to FIG. 10A, illustrated is a block diagram 1000 of an example, non-limiting embodiment of a coupler and transceiver system in accordance with various aspects described herein. The system is an example of transmission device 101 or 102. In particular, the communication interface 1008 is an example of communications interface 205, the stub coupler 1002 is an example of coupler 220, and the transmitter/receiver device 1006, diplexer 1016, power amplifier 1014, low noise amplifier 1018, frequency mixers 1010 and 1020 and local oscillator 1012 collectively form an example of transceiver 210.

In operation, the transmitter/receiver device 1006 launches and receives waves (e.g., guided wave 1004 onto stub coupler 1002). The guided waves 1004 can be used to transport signals received from and sent to a host device, base station, mobile devices, a building or other device by way of a communications interface 1008. The communications interface 1008 can be an integral part of system 1000. Alternatively, the communications interface 1008 can be tethered to system 1000. The communications interface 1008 can comprise a wireless interface for interfacing to the host device, base station, mobile devices, a building or other device utilizing any of various wireless signaling protocols (e.g., LTE, WiFi, WiMAX, IEEE 802.xx, etc.) including an infrared protocol such as an infrared data association (IrDA) protocol or other line of sight optical protocol. The communications interface 1008 can also comprise a wired interface such as a fiber optic line, coaxial cable, twisted pair, category 5 (CAT-5) cable or other suitable wired or optical mediums for communicating with the host device, base station, mobile devices, a building or other device via a protocol such as an Ethernet protocol, universal serial bus (USB) protocol, a data over cable service interface specification (DOCSIS) protocol, a digital subscriber line (DSL) protocol, a Firewire (IEEE 1394) protocol, or other wired or optical protocol. For embodiments where system 1000 functions as a repeater, the communications interface 1008 may not be necessary.

The output signals (e.g., Tx) of the communications interface 1008 can be combined with a carrier wave (e.g., millimeter-wave carrier wave) generated by a local oscillator 1012 at frequency mixer 1010. Frequency mixer 1010 can use heterodyning techniques or other frequency shifting techniques to frequency shift the output signals from communications interface 1008. For example, signals sent to and from the communications interface 1008 can be modulated signals such as orthogonal frequency division multiplexed (OFDM) signals formatted in accordance with a Long-Term Evolution (LTE) wireless protocol or other wireless 3G, 4G, 5G or higher voice and data protocol, a ZigBee, WIMAX, UltraWideband or IEEE 802.11 wireless protocol; a wired protocol such as an Ethernet protocol, universal serial bus (USB) protocol, a data over cable service interface specification (DOCSIS) protocol, a digital subscriber line (DSL) protocol, a Firewire (IEEE 1394) protocol or other wired or wireless protocol. In an example embodiment, this frequency conversion can be done in the analog domain, and as a result, the frequency shifting can be done without regard to the type of communications protocol used by a base station, mobile devices, or in-building devices. As new communications technologies are developed, the communications interface 1008 can be upgraded (e.g., updated with software, firmware, and/or hardware) or replaced and the frequency shifting and transmission apparatus can remain, simplifying upgrades. The carrier wave can then be sent to a power amplifier ("PA") 1014 and can be transmitted via the transmitter receiver device 1006 via the diplexer 1016.

Signals received from the transmitter/receiver device 1006 that are directed towards the communications interface 1008 can be separated from other signals via diplexer 1016. The received signal can then be sent to low noise amplifier ("LNA") 1018 for amplification. A frequency mixer 1020, with help from local oscillator 1012 can downshift the received signal (which is in the millimeter-wave band or around 38 GHz in some embodiments) to the native frequency. The communications interface 1008 can then receive the transmission at an input port (Rx).

In an embodiment, transmitter/receiver device 1006 can include a cylindrical or non-cylindrical metal (which, for example, can be hollow in an embodiment, but not necessarily drawn to scale) or other conducting or non-conducting waveguide and an end of the stub coupler 1002 can be placed in or in proximity to the waveguide or the transmitter/receiver device 1006 such that when the transmitter/receiver device 1006 generates a transmission, the guided wave couples to stub coupler 1002 and propagates as a guided wave 1004 about the waveguide surface of the stub coupler 1002. In some embodiments, the guided wave 1004 can propagate in part on the outer surface of the stub coupler 1002 and in part inside the stub coupler 1002. In other embodiments, the guided wave 1004 can propagate substantially or completely on the outer surface of the stub coupler 1002. In yet other embodiments, the guided wave 1004 can propagate substantially or completely inside the stub coupler 1002. In this latter embodiment, the guided wave 1004 can radiate at an end of the stub coupler 1002 (such as the tapered end shown in FIG. 4) for coupling to a transmission medium such as a wire 702 of FIG. 7. Similarly, if guided wave 1004 is incoming (coupled to the stub coupler 1002 from a wire 702), guided wave 1004 then enters the transmitter/receiver device 1006 and couples to the cylindrical waveguide or conducting waveguide. While transmitter/receiver device 1006 is shown to include a separate waveguide—an antenna, cavity resonator, klystron, magnetron, travelling wave tube, or other radiating element can be employed to induce a guided wave on the coupler 1002, with or without the separate waveguide.

In an embodiment, stub coupler 1002 can be wholly constructed of a dielectric material (or another suitable insulating material), without any metallic or otherwise conducting materials therein. Stub coupler 1002 can be composed of nylon, Teflon, polyethylene, a polyamide, other plastics, or other materials that are non-conducting and suitable for facilitating transmission of electromagnetic waves at least in part on an outer surface of such materials. In another embodiment, stub coupler 1002 can include a core that is conducting/metallic, and have an exterior dielectric surface. Similarly, a transmission medium that couples to the stub coupler 1002 for propagating electromagnetic waves induced by the stub coupler 1002 or for supplying electromagnetic waves to the stub coupler 1002 can, in addition to being a bare or insulated wire, be wholly constructed of a dielectric material (or another suitable insulating material), without any metallic or otherwise conducting materials therein.

It is noted that although FIG. 10A shows that the opening of transmitter receiver device 1006 is much wider than the stub coupler 1002, this is not to scale, and that in other embodiments the width of the stub coupler 1002 is comparable or slightly smaller than the opening of the hollow waveguide. It is also not shown, but in an embodiment, an end of the coupler 1002 that is inserted into the transmitter/receiver device 1006 tapers down in order to reduce reflection and increase coupling efficiencies.

Before coupling to the stub coupler 1002, the one or more waveguide modes of the guided wave generated by the transmitter/receiver device 1006 can couple to the stub coupler 1002 to induce one or more wave propagation modes of the guided wave 1004. The wave propagation modes of the guided wave 1004 can be different than the hollow metal waveguide modes due to the different characteristics of the hollow metal waveguide and the dielectric waveguide. For instance, wave propagation modes of the guided wave 1004 can comprise the fundamental transverse electromagnetic mode (Quasi-TEM$_{00}$), where only small electrical and/or magnetic fields extend in the direction of propagation, and the electric and magnetic fields extend radially outwards from the stub coupler 1002 while the guided waves propagate along the stub coupler 1002. The fundamental transverse electromagnetic mode wave propagation mode may or may not exist inside a waveguide that is hollow. Therefore, the hollow metal waveguide modes that are used by transmitter/receiver device 1006 are waveguide modes that can couple effectively and efficiently to wave propagation modes of stub coupler 1002.

Figure 10B:
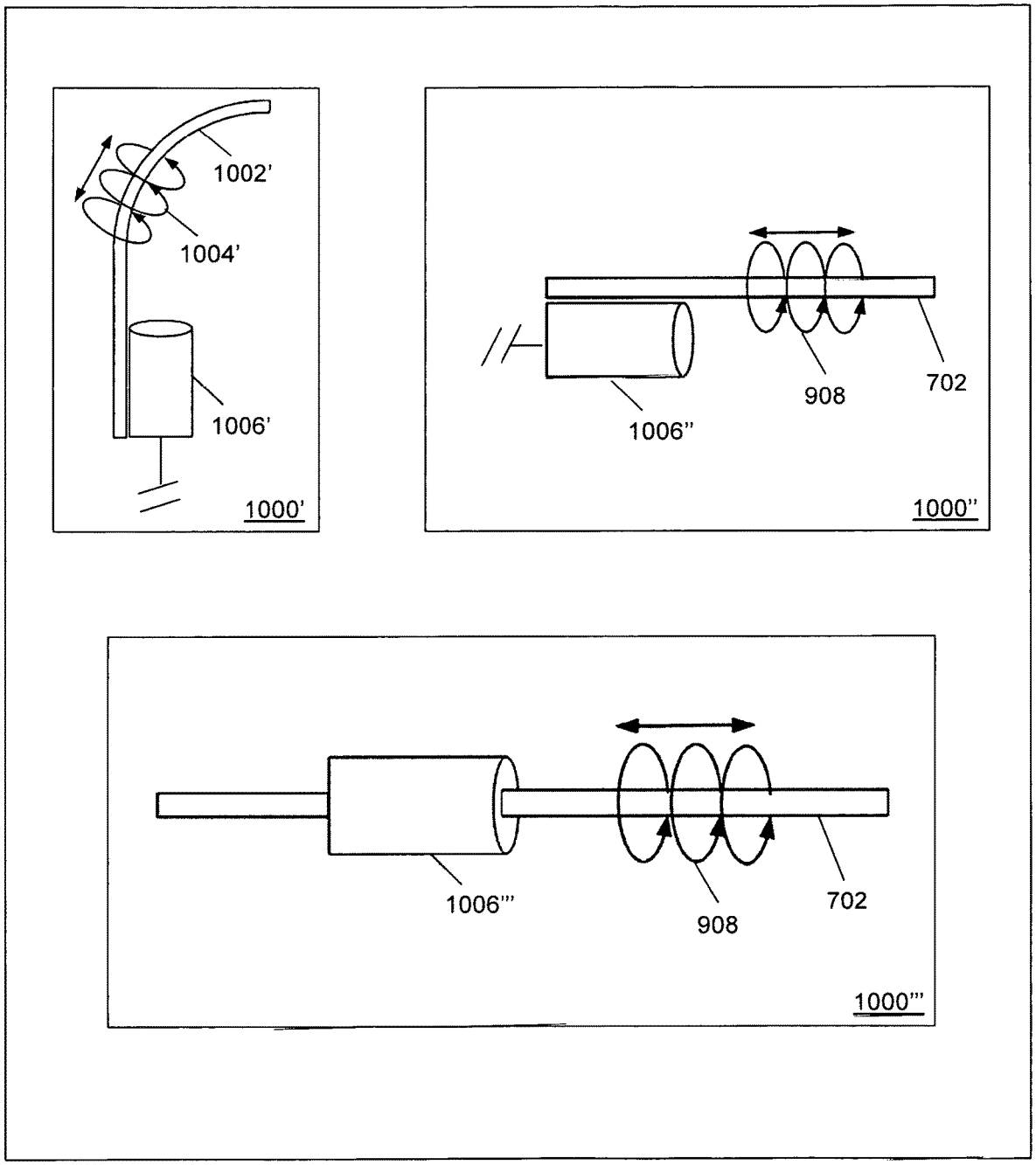

It will be appreciated that other constructs or combinations of the transmitter/receiver device 1006 and stub coupler 1002 are possible. For example, a stub coupler 1002' can be placed tangentially or in parallel (with or without a gap) with respect to an outer surface of the hollow metal waveguide of the transmitter/receiver device 1006' (corresponding circuitry not shown) as depicted by reference 1000' of FIG. 10B. In another embodiment, not shown by reference 1000', the stub coupler 1002' can be placed inside the hollow metal waveguide of the transmitter/receiver device 1006' without an axis of the stub coupler 1002' being coaxially aligned with an axis of the hollow metal waveguide of the transmitter/receiver device 1006'. In either of these embodiments, the guided wave generated by the transmitter/receiver device 1006' can couple to a surface of the stub coupler 1002' to induce one or more wave propagation modes of the guided wave 1004' on the stub coupler 1002' including a fundamental mode (e.g., a symmetric mode) and/or a non-fundamental mode (e.g., asymmetric mode).

In one embodiment, the guided wave 1004' can propagate in part on the outer surface of the stub coupler 1002' and in part inside the stub coupler 1002'. In another embodiment, the guided wave 1004' can propagate substantially or completely on the outer surface of the stub coupler 1002'. In yet other embodiments, the guided wave 1004' can propagate substantially or completely inside the stub coupler 1002'. In this latter embodiment, the guided wave 1004' can radiate at an end of the stub coupler 1002' (such as the tapered end shown in FIG. 9) for coupling to a transmission medium such as a wire 702 of FIG. 9.

It will be further appreciated that other constructs the transmitter/receiver device 1006 are possible. For example, a hollow metal waveguide of a transmitter/receiver device 1006" (corresponding circuitry not shown), depicted in FIG. 10B as reference 1000", can be placed tangentially or in parallel (with or without a gap) with respect to an outer surface of a transmission medium such as the wire 702 of FIG. 4 without the use of the stub coupler 1002. In this embodiment, the guided wave generated by the transmitter/receiver device 1006" can couple to a surface of the wire 702 to induce one or more wave propagation modes of a guided wave 908 on the wire 702 including a fundamental mode (e.g., a symmetric mode) and/or a non-fundamental mode (e.g., asymmetric mode). In another embodiment, the wire 702 can be positioned inside a hollow metal waveguide of a transmitter/receiver device 1006''' (corresponding circuitry not shown) so that an axis of the wire 702 is coaxially (or not coaxially) aligned with an axis of the hollow metal waveguide without the use of the stub coupler 1002—see FIG. 10B reference 1000'''. In this embodiment, the guided wave generated by the transmitter/receiver device 1006''' can couple to a surface of the wire 702 to induce one or more wave propagation modes of a guided wave 908 on the wire including a fundamental mode (e.g., a symmetric mode) and/or a non-fundamental mode (e.g., asymmetric mode).

In the embodiments of 1000" and 1000''', for a wire 702 having an insulated outer surface, the guided wave 908 can propagate in part on the outer surface of the insulator and in part inside the insulator. In embodiments, the guided wave 908 can propagate substantially or completely on the outer surface of the insulator, or substantially or completely inside the insulator. In the embodiments of 1000" and 1000''', for a wire 702 that is a bare conductor, the guided wave 908 can propagate in part on the outer surface of the conductor and in part inside the conductor. In another embodiment, the guided wave 908 can propagate substantially or completely on the outer surface of the conductor.

Figure 11:
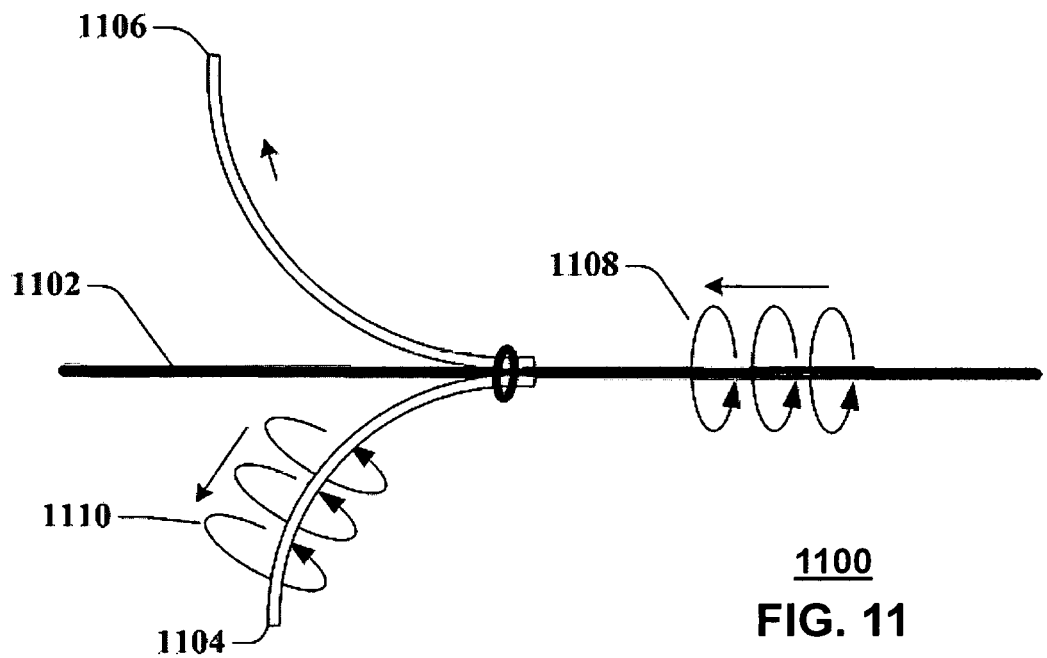
FIG. 11 is a block diagram illustrating an example, non-limiting embodiment of a dual stub coupler in accordance with various aspects described herein.

Referring now to FIG. 11, a block diagram 1100 illustrating an example, non-limiting embodiment of a dual stub coupler is shown. In particular, a dual coupler design is presented for use in a transmission device, such as transmission device 101 or 102 presented in conjunction with FIG. 1. In an embodiment, two or more couplers (such as the stub couplers 1104 and 1106) can be positioned around a wire 1102 in order to receive guided wave 1108. In an embodiment, one coupler is enough to receive the guided wave 1108. In that case, guided wave 1108 couples to coupler 1104 and propagates as guided wave 1110. If the field structure of the guided wave 1108 oscillates or undulates around the wire 1102 due to the particular guided wave mode(s) or various outside factors, then coupler 1106 can be placed such that guided wave 1108 couples to coupler 1106. In some embodiments, four or more couplers can be placed around a portion of the wire 1102, e.g., at 90 degrees or another spacing with respect to each other, in order to receive guided waves that may oscillate or rotate around the wire 1102, that have been induced at different azimuthal orientations or that have non-fundamental or higher order modes that, for example, have lobes and/or nulls or other asymmetries that are orientation dependent. However, it will be appreciated that there may be less than or more than four couplers placed around a portion of the wire 1102 without departing from example embodiments.

It should be noted that while couplers 1106 and 1104 are illustrated as stub couplers, any other of the coupler designs described herein including arc couplers, antenna or horn couplers, magnetic couplers, etc., could likewise be used. It will also be appreciated that while some example embodiments have presented a plurality of couplers around at least a portion of a wire 1102, this plurality of couplers can also be considered as part of a single coupler system having multiple coupler subcomponents. For example, two or more couplers can be manufactured as single system that can be installed around a wire in a single installation such that the couplers are either pre-positioned or adjustable relative to each other (either manually or automatically with a controllable mechanism such as a motor or other actuator) in accordance with the single system.

Receivers coupled to couplers 1106 and 1104 can use diversity combining to combine signals received from both couplers 1106 and 1104 in order to maximize the signal quality. In other embodiments, if one or the other of the couplers 1104 and 1106 receive a transmission that is above a predetermined threshold, receivers can use selection diversity when deciding which signal to use. Further, while reception by a plurality of couplers 1106 and 1104 is illustrated, transmission by couplers 1106 and 1104 in the same configuration can likewise take place. In particular, a wide range of multi-input multi-output (MIMO) transmission and reception techniques can be employed for transmissions where a transmission device, such as transmission device 101 or 102 presented in conjunction with FIG. 1 includes multiple transceivers and multiple couplers.

It is noted that the graphical representations of waves 1108 and 1110 are presented merely to illustrate the principles that guided wave 1108 induces or otherwise launches a wave 1110 on a coupler 1104. The actual electric and magnetic fields generated as a result of such wave propagation may vary depending on the frequencies employed, the design of the coupler 1104, the dimensions and composition of the wire 1102, as well as its surface characteristics, its insulation if any, the electromagnetic properties of the surrounding environment, etc.

Figure 12:
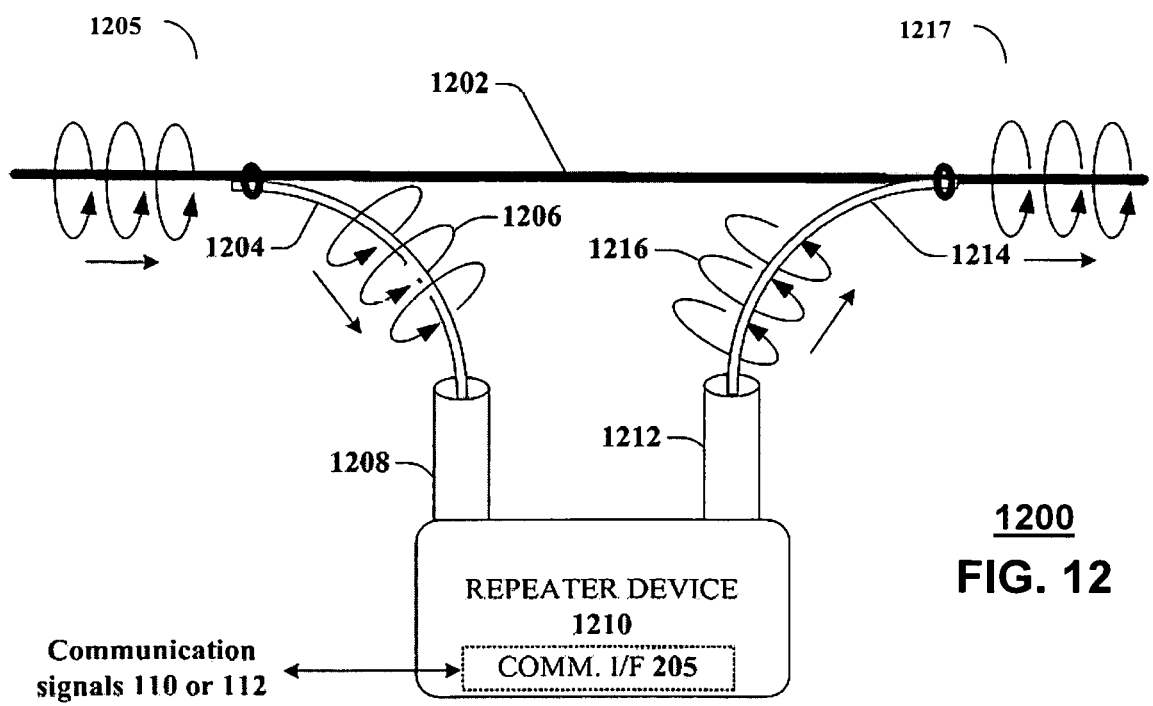
FIG. 12 is a block diagram illustrating an example, non-limiting embodiment of a repeater system in accordance with various aspects described herein.

Referring now to FIG. 12, a block diagram 1200 illustrating an example, non-limiting embodiment of a repeater system is shown. In particular, a repeater device 1210 is presented for use in a transmission device, such as transmission device 101 or 102 presented in conjunction with FIG. 1. In this system, two couplers 1204 and 1214 can be placed near a wire 1202 or other transmission medium such that guided waves 1205 propagating along the wire 1202 are extracted by coupler 1204 as wave 1206 (e.g. as a guided wave), and then are boosted or repeated by repeater device 1210 and launched as a wave 1216 (e.g., as a guided wave) onto coupler 1214. The wave 1216 can then be launched on the wire 1202 and continue to propagate along the wire 1202 as a guided wave 1217. In an embodiment, the repeater device 1210 can receive at least a portion of the power utilized for boosting or repeating through magnetic coupling with the wire 1202, for example, when the wire 1202 is a power line or otherwise contains a power-carrying conductor. It should be noted that while couplers 1204 and 1214 are illustrated as stub couplers, any other of the coupler designs described herein including arc couplers, antenna or horn couplers, magnetic couplers, or the like, could likewise be used.

In some embodiments, repeater device 1210 can repeat the transmission associated with wave 1206, and in other embodiments, repeater device 1210 can include a communications interface 205 that extracts data or other signals from the wave 1206 for supplying such data or signals to another network and/or one or more other devices as communication signals 110 or 112 and/or receiving communication signals 110 or 112 from another network and/or one or more other devices and launch guided wave 1216 having embedded therein the received communication signals 110 or 112. In a repeater configuration, receiver waveguide 1208 can receive the wave 1206 from the coupler 1204 and transmitter waveguide 1212 can launch guided wave 1216 onto coupler 1214 as guided wave 1217. Between receiver waveguide 1208 and transmitter waveguide 1212, the signal embedded in guided wave 1206 and/or the guided wave 1216 itself can be amplified to correct for signal loss and other inefficiencies associated with guided wave communications or the signal can be received and processed to extract the data contained therein and regenerated for transmission. In an embodiment, the receiver waveguide 1208 can be configured to extract data from the signal, process the data to correct for data errors utilizing for example error correcting codes, and regenerate an updated signal with the corrected data. The transmitter waveguide 1212 can then transmit guided wave 1216 with the updated signal embedded therein. In an embodiment, a signal embedded in guided wave 1206 can be extracted from the transmission and processed for communication with another network and/or one or more other devices via communications interface 205 as communication signals 110 or 112. Similarly, communication signals 110 or 112 received by the communications interface 205 can be inserted into a transmission of guided wave 1216 that is generated and launched onto coupler 1214 by transmitter waveguide 1212.

It is noted that although FIG. 12 shows guided wave transmissions 1206 and 1216 entering from the left and exiting to the right respectively, this is merely a simplification and is not intended to be limiting. In other embodiments, receiver waveguide 1208 and transmitter waveguide 1212 can also function as transmitters and receivers respectively, allowing the repeater device 1210 to be bi-directional.

In an embodiment, repeater device 1210 can be placed at locations where there are discontinuities or obstacles on the wire 1202 or other transmission medium. In the case where the wire 1202 is a power line, these obstacles can include transformers, connections, utility poles, and other such power line devices. The repeater device 1210 can help the guided (e.g., surface) waves jump over these obstacles on the line and boost the transmission power at the same time. In other embodiments, a coupler can be used to jump over the obstacle without the use of a repeater device. In that embodiment, both ends of the coupler can be tied or fastened to the wire, thus providing a path for the guided wave to travel without being blocked by the obstacle.

Figure 13:
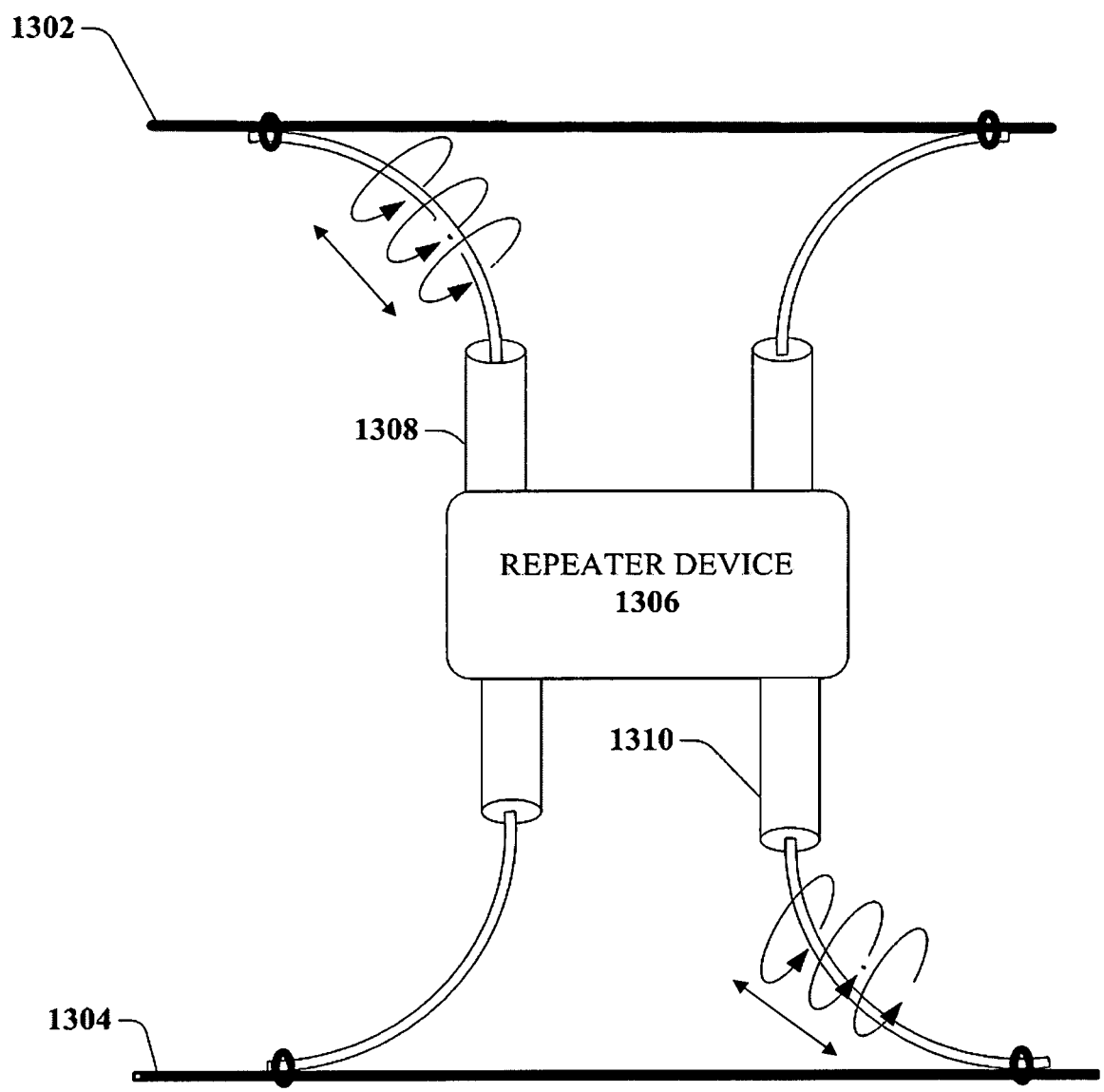
FIG. 13 illustrates a block diagram illustrating an example, non-limiting embodiment of a bidirectional repeater in accordance with various aspects described herein.

Turning now to FIG. 13, illustrated is a block diagram 1300 of an example, non-limiting embodiment of a bidirectional repeater in accordance with various aspects described herein. In particular, a bidirectional repeater device 1306 is presented for use in a transmission device, such as transmission device 101 or 102 presented in conjunction with FIG. 1. It should be noted that while the couplers are illustrated as stub couplers, any other of the coupler designs described herein including arc couplers, antenna or horn couplers, magnetic couplers, or the like, could likewise be used. The bidirectional repeater 1306 can employ diversity paths in the case of when two or more wires or other transmission media are present. Since guided wave transmissions have different transmission efficiencies and coupling efficiencies for transmission medium of different types such as insulated wires, un-insulated wires or other types of transmission media and further, if exposed to the elements, can be affected by weather, and other atmospheric conditions, it can be advantageous to selectively transmit on different transmission media at certain times. In various embodiments, the various transmission media can be designated as a primary, secondary, tertiary, etc. whether or not such designation indicates a preference of one transmission medium over another.

In the embodiment shown, the transmission media include an insulated or uninsulated wire 1302 and an insulated or uninsulated wire 1304 (referred to herein as wires 1302 and 1304, respectively). The repeater device 1306 uses a receiver coupler 1308 to receive a guided wave traveling along wire 1302 and repeats the transmission using transmitter waveguide 1310 as a guided wave along wire 1304. In other embodiments, repeater device 1306 can switch from the wire 1304 to the wire 1302, or can repeat the transmissions along the same paths. Repeater device 1306 can include sensors, or be in communication with sensors (or a network management system 1601 depicted in FIG. 16A) that indicate conditions that can affect the transmission. Based on the feedback received from the sensors, the repeater device 1306 can make the determination about whether to keep the transmission along the same wire, or transfer the transmission to the other wire.

Figure 14:
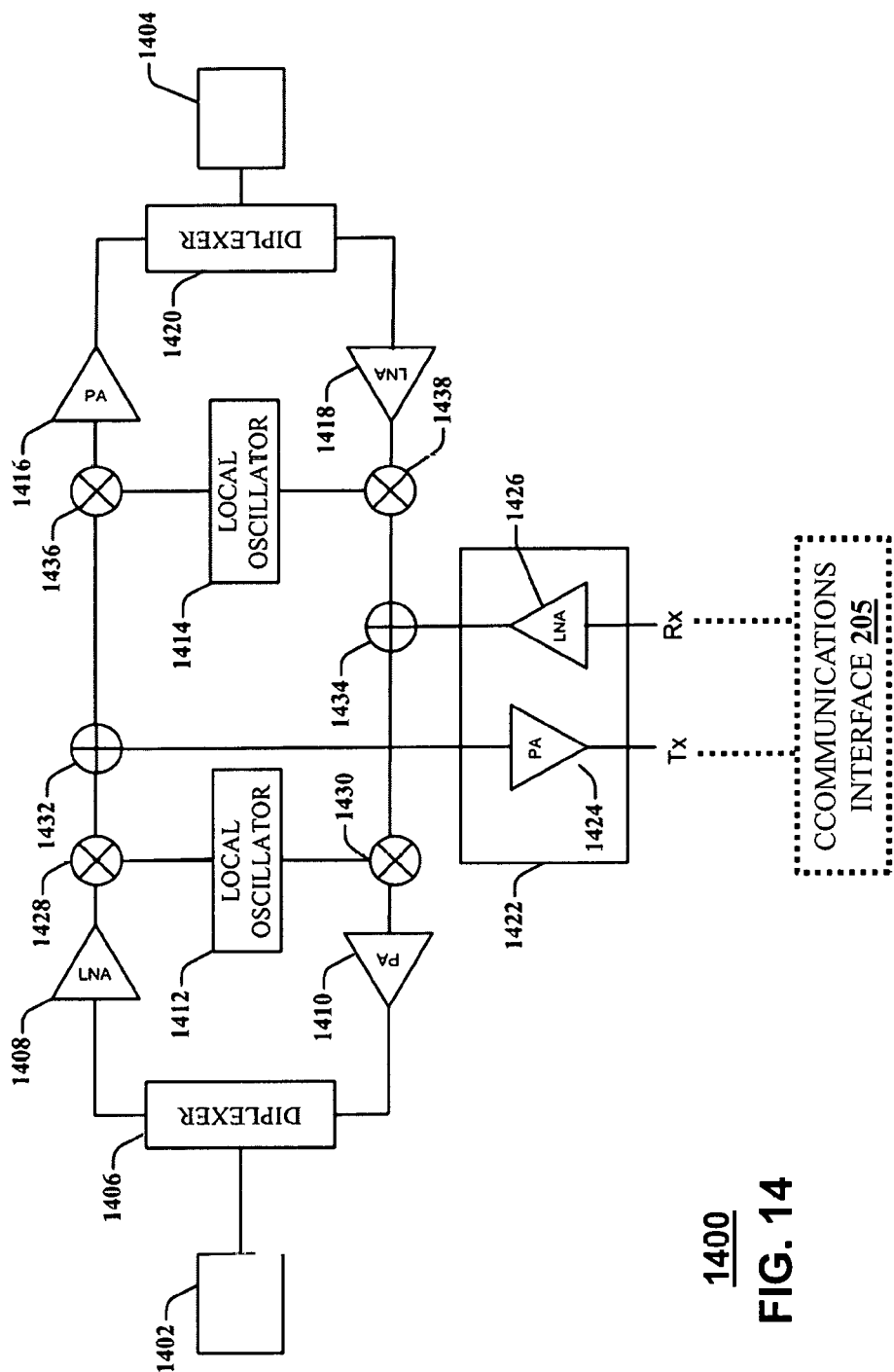
FIG. 14 is a block diagram illustrating an example, non-limiting embodiment of a waveguide system in accordance with various aspects described herein.

Turning now to FIG. 14, illustrated is a block diagram 1400 illustrating an example, non-limiting embodiment of a bidirectional repeater system. In particular, a bidirectional repeater system is presented for use in a transmission device, such as transmission device 101 or 102 presented in conjunction with FIG. 1. The bidirectional repeater system includes waveguide coupling devices 1402 and 1404 that receive and transmit transmissions from other coupling devices located in a distributed antenna system or backhaul system.

In various embodiments, waveguide coupling device 1402 can receive a transmission from another waveguide coupling device, wherein the transmission has a plurality of subcarriers. Diplexer 1406 can separate the transmission from other transmissions, and direct the transmission to low-noise amplifier ("LNA") 1408. A frequency mixer 1428, with help from a local oscillator 1412, can downshift the transmission (which is in the millimeter-wave band or around 38 GHz in some embodiments) to a lower frequency, such as a cellular band (~1.9 GHz) for a distributed antenna system, a native frequency, or other frequency for a backhaul system. An extractor (or demultiplexer) 1432 can extract the signal on a subcarrier and direct the signal to an output component 1422 for optional amplification, buffering or isolation by power amplifier 1424 for coupling to communications interface 205. The communications interface 205 can further process the signals received from the power amplifier 1424 or otherwise transmit such signals over a wireless or wired interface to other devices such as a base station, mobile devices, a building, etc. For the signals that are not being extracted at this location, extractor 1432 can redirect them to another frequency mixer 1436, where the signals are used to modulate a carrier wave generated by local oscillator 1414. The carrier wave, with its subcarriers, is directed to a power amplifier ("PA") 1416 and is retransmitted by waveguide coupling device 1404 to another system, via diplexer 1420.

An LNA 1426 can be used to amplify, buffer or isolate signals that are received by the communication interface 205 and then send the signal to a multiplexer 1434 which merges the signal with signals that have been received from waveguide coupling device 1404. The signals received from coupling device 1404 have been split by diplexer 1420, and then passed through LNA 1418, and downshifted in frequency by frequency mixer 1438. When the signals are combined by multiplexer 1434, they are upshifted in frequency by frequency mixer 1430, and then boosted by PA 1410, and transmitted to another system by waveguide coupling device 1402. In an embodiment bidirectional repeater system can be merely a repeater without the output device 1422. In this embodiment, the multiplexer 1434 would not be utilized and signals from LNA 1418 would be directed to mixer 1430 as previously described. It will be appreciated that in some embodiments, the bidirectional repeater system could also be implemented using two distinct and separate unidirectional repeaters. In an alternative embodiment, a bidirectional repeater system could also be a booster or otherwise perform retransmissions without downshifting and upshifting. Indeed, in example embodiment, the retransmissions can be based upon receiving a signal or guided wave and performing some signal or guided wave processing or reshaping, filtering, and/or amplification, prior to retransmission of the signal or guided wave.

Figure 15:
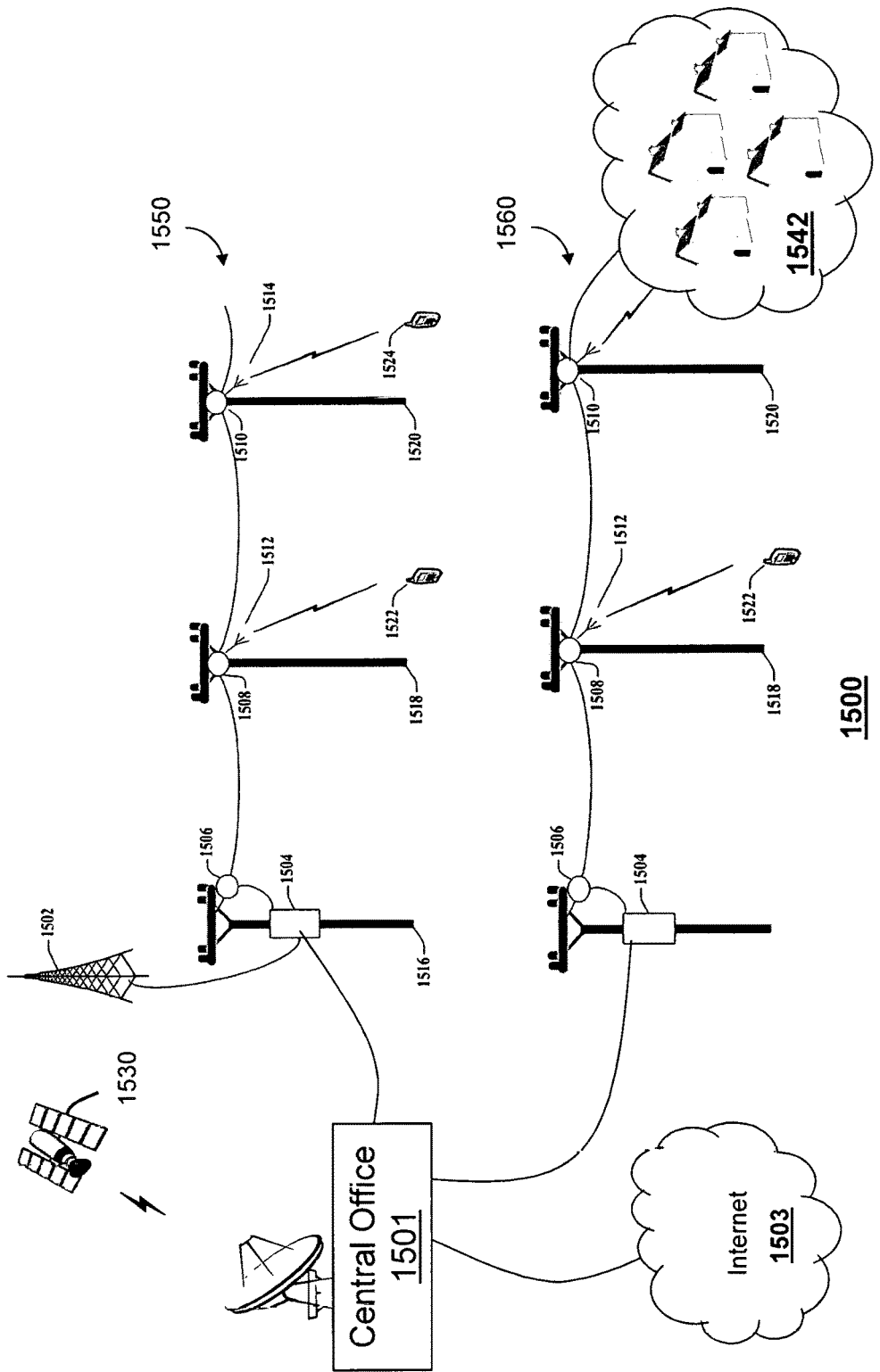
FIG. 15 is a block diagram illustrating an example, non-limiting embodiment of a guided-wave communications system in accordance with various aspects described herein.

Referring now to FIG. 15, a block diagram 1500 illustrating an example, non-limiting embodiment of a guided wave communications system is shown. This diagram depicts an exemplary environment in which a guided wave communication system, such as the guided wave communication system presented in conjunction with FIG. 1, can be used.

To provide network connectivity to additional base station devices, a backhaul network that links the communication cells (e.g., microcells and macrocells) to network devices of a core network correspondingly expands. Similarly, to provide network connectivity to a distributed antenna system, an extended communication system that links base station devices and their distributed antennas is desirable. A guided wave communication system 1500 such as shown in FIG. 15 can be provided to enable alternative, increased or additional network connectivity and a waveguide coupling system can be provided to transmit and/or receive guided wave (e.g., surface wave) communications on a transmission medium such as a wire that operates as a single-wire transmission line (e.g., a utility line), and that can be used as a waveguide and/or that otherwise operates to guide the transmission of an electromagnetic wave.

The guided wave communication system 1500 can comprise a first instance of a distribution system 1550 that includes one or more base station devices (e.g., base station device 1504) that are communicably coupled to a central office 1501 and/or a macrocell site 1502. Base station device 1504 can be connected by a wired (e.g., fiber and/or cable), or by a wireless (e.g., microwave wireless) connection to the macrocell site 1502 and the central office 1501. A second instance of the distribution system 1560 can be used to provide wireless voice and data services to mobile device 1522 and to residential and/or commercial establishments 1542 (herein referred to as establishments 1542). System 1500 can have additional instances of the distribution systems 1550 and 1560 for providing voice and/or data services to mobile devices 1522-1524 and establishments 1542 as shown in FIG. 15.

Macrocells such as macrocell site 1502 can have dedicated connections to a mobile network and base station device 1504 or can share and/or otherwise use another connection. Central office 1501 can be used to distribute media content and/or provide internet service provider (ISP) services to mobile devices 1522-1524 and establishments 1542. The central office 1501 can receive media content from a constellation of satellites 1530 (one of which is shown in FIG. 15) or other sources of content, and distribute such content to mobile devices 1522-1524 and establishments 1542 via the first and second instances of the distribution system 1550 and 1560. The central office 1501 can also be communicatively coupled to the Internet 1503 for providing internet data services to mobile devices 1522-1524 and establishments 1542.

Base station device 1504 can be mounted on, or attached to, utility pole 1516. In other embodiments, base station device 1504 can be near transformers and/or other locations situated nearby a power line. Base station device 1504 can facilitate connectivity to a mobile network for mobile devices 1522 and 1524. Antennas 1512 and 1514, mounted on or near utility poles 1518 and 1520, respectively, can receive signals from base station device 1504 and transmit those signals to mobile devices 1522 and 1524 over a much wider area than if the antennas 1512 and 1514 were located at or near base station device 1504.

It is noted that FIG. 15 displays three utility poles, in each instance of the distribution systems 1550 and 1560, with one base station device, for purposes of simplicity. In other embodiments, utility pole 1516 can have more base station devices, and more utility poles with distributed antennas and/or tethered connections to establishments 1542.

A transmission device 1506, such as transmission device 101 or 102 presented in conjunction with FIG. 1, can transmit a signal from base station device 1504 to antennas 1512 and 1514 via utility or power line(s) that connect the utility poles 1516, 1518, and 1520. To transmit the signal, radio source and/or transmission device 1506 upconverts the signal (e.g., via frequency mixing) from base station device 1504 or otherwise converts the signal from the base station device 1504 to a microwave band signal and the transmission device 1506 launches a microwave band wave that propagates as a guided wave traveling along the utility line or other wire as described in previous embodiments. At utility pole 1518, another transmission device 1508 receives the guided wave (and optionally can amplify it as needed or desired or operate as a repeater to receive it and regenerate it) and sends it forward as a guided wave on the utility line or other wire. The transmission device 1508 can also extract a signal from the microwave band guided wave and shift it down in frequency or otherwise convert it to its original cellular band frequency (e.g., 1.9 GHz or other defined cellular frequency) or another cellular (or non-cellular) band frequency. An antenna 1512 can wireless transmit the down-shifted signal to mobile device 1522. The process can be repeated by transmission device 1510, antenna 1514 and mobile device 1524, as necessary or desirable.

Transmissions from mobile devices 1522 and 1524 can also be received by antennas 1512 and 1514 respectively. The transmission devices 1508 and 1510 can upshift or otherwise convert the cellular band signals to microwave band and transmit the signals as guided wave (e.g., surface wave or other electromagnetic wave) transmissions over the power line(s) to base station device 1504.

Media content received by the central office 1501 can be supplied to the second instance of the distribution system 1560 via the base station device 1504 for distribution to mobile devices 1522 and establishments 1542. The transmission device 1510 can be tethered to the establishments 1542 by one or more wired connections or a wireless interface. The one or more wired connections may include without limitation, a power line, a coaxial cable, a fiber cable, a twisted pair cable, a guided wave transmission medium or other suitable wired mediums for distribution of media content and/or for providing internet services. In an example embodiment, the wired connections from the transmission device 1510 can be communicatively coupled to one or more very high bit rate digital subscriber line (VDSL) modems located at one or more corresponding service area interfaces (SAIs—not shown) or pedestals, each SAI or pedestal providing services to a portion of the establishments 1542. The VDSL modems can be used to selectively distribute media content and/or provide internet services to gateways (not shown) located in the establishments 1542. The SAIs or pedestals can also be communicatively coupled to the establishments 1542 over a wired medium such as a power line, a coaxial cable, a fiber cable, a twisted pair cable, a guided wave transmission medium or other suitable wired mediums. In other example embodiments, the transmission device 1510 can be communicatively coupled directly to establishments 1542 without intermediate interfaces such as the SAIs or pedestals.

In another example embodiment, system 1500 can employ diversity paths, where two or more utility lines or other wires are strung between the utility poles 1516, 1518, and 1520 (e.g., for example, two or more wires between poles 1516 and 1520) and redundant transmissions from base station/macrocell site 1502 are transmitted as guided waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 1500 can enable alternate routing capabilities, load balancing, increased load handling, concurrent bi-directional or synchronous communications, spread spectrum communications, etc.

It is noted that the use of the transmission devices 1506, 1508, and 1510 in FIG. 15 are by way of example only, and that in other embodiments, other uses are possible. For instance, transmission devices can be used in a backhaul communication system, providing network connectivity to base station devices. Transmission devices 1506, 1508, and 1510 can be used in many circumstances where it is desirable to transmit guided wave communications over a wire, whether insulated or not insulated. Transmission devices 1506, 1508, and 1510 are improvements over other coupling devices due to no contact or limited physical and/or electrical contact with the wires that may carry high voltages. The transmission device can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, for example in configurations where the wires correspond to a telephone network, cable television network, broadband data service, fiber optic communications system or other network employing low voltages or having insulated transmission lines.

It is further noted, that while base station device 1504 and macrocell site 1502 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as an 802.11 protocol, WIMAX protocol, UltraWideband protocol, Bluetooth protocol, ZigBee protocol or other wireless protocol.

Figure 16A:
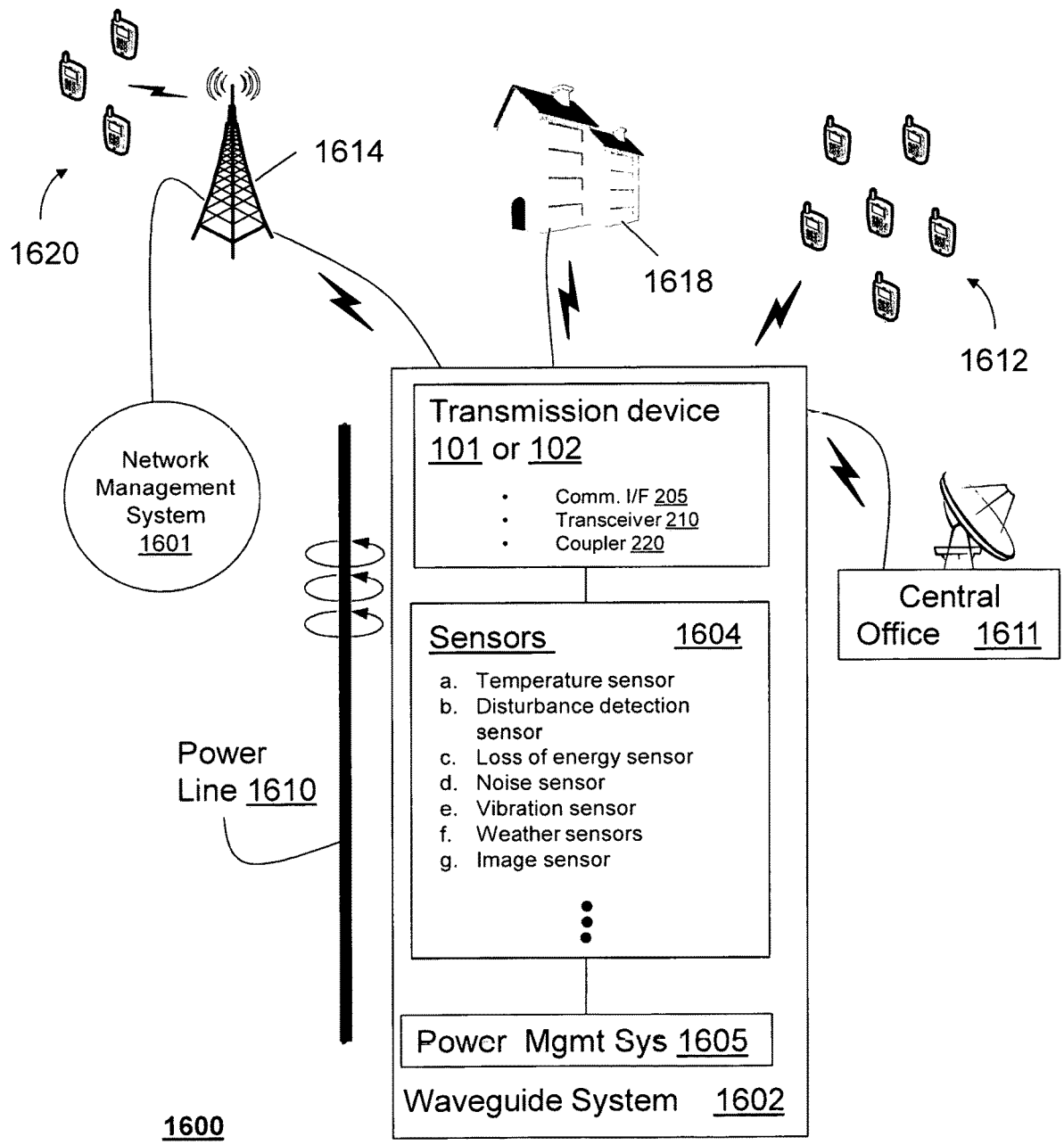
FIGS. 16A & 16B are block diagrams illustrating an example, non-limiting embodiment of a system for managing a power grid communication system in accordance with various aspects described herein.
Figure 16B:
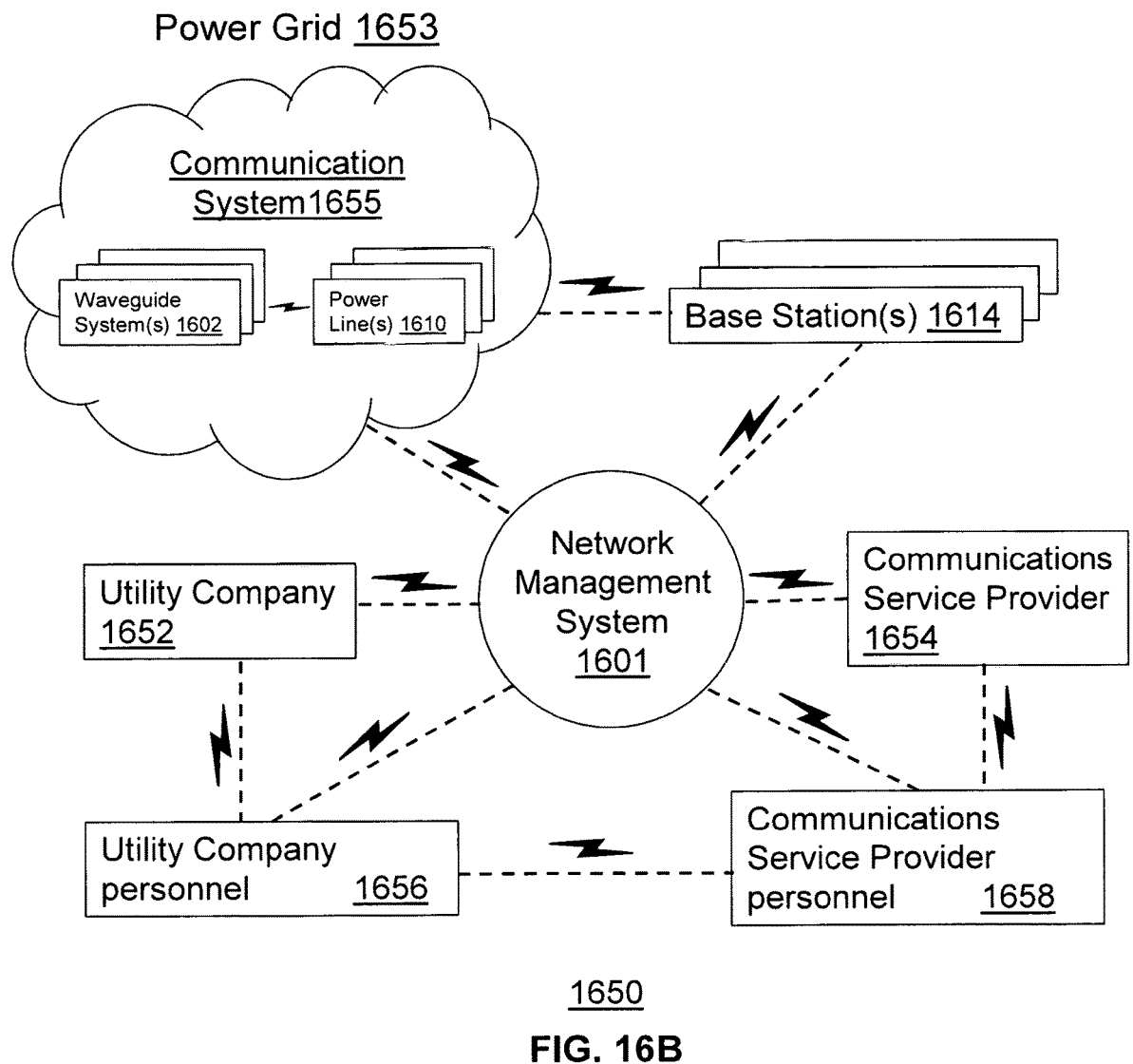

Referring now to FIGS. 16A & 16B, block diagrams illustrating an example, non-limiting embodiment of a system for managing a power grid communication system are shown. Considering FIG. 16A, a waveguide system 1602 is presented for use in a guided wave communications system, such as the system presented in conjunction with FIG. 15. The waveguide system 1602 can comprise sensors 1604, a power management system 1605, a transmission device 101 or 102 that includes at least one communication interface 205, transceiver 210 and coupler 220.

The waveguide system 1602 can be coupled to a power line 1610 for facilitating guided wave communications in accordance with embodiments described in the subject disclosure. In an example embodiment, the transmission device 101 or 102 includes coupler 220 for inducing electromagnetic waves on a surface of the power line 1610 that longitudinally propagate along the surface of the power line 1610 as described in the subject disclosure. The transmission device 101 or 102 can also serve as a repeater for retransmitting electromagnetic waves on the same power line 1610 or for routing electromagnetic waves between power lines 1610 as shown in FIGS. 12-13.

The transmission device 101 or 102 includes transceiver 210 configured to, for example, up-convert a signal operating at an original frequency range to electromagnetic waves operating at, exhibiting, or associated with a carrier frequency that propagate along a coupler to induce corresponding guided electromagnetic waves that propagate along a surface of the power line 1610. A carrier frequency can be represented by a center frequency having upper and lower cutoff frequencies that define the bandwidth of the electromagnetic waves. The power line 1610 can be a wire (e.g., single stranded or multi-stranded) having a conducting surface or insulated surface. The transceiver 210 can also receive signals from the coupler 220 and down-convert the electromagnetic waves operating at a carrier frequency to signals at their original frequency.

Signals received by the communications interface 205 of transmission device 101 or 102 for up-conversion can include without limitation signals supplied by a central office 1611 over a wired or wireless interface of the communications interface 205, a base station 1614 over a wired or wireless interface of the communications interface 205, wireless signals transmitted by mobile devices 1620 to the base station 1614 for delivery over the wired or wireless interface of the communications interface 205, signals supplied by in-building communication devices 1618 over the wired or wireless interface of the communications interface 205, and/or wireless signals supplied to the communications interface 205 by mobile devices 1612 roaming in a wireless communication range of the communications interface 205. In embodiments where the waveguide system 1602 functions as a repeater, such as shown in FIGS. 12-13, the communications interface 205 may or may not be included in the waveguide system 1602.

The electromagnetic waves propagating along the surface of the power line 1610 can be modulated and formatted to include packets or frames of data that include a data payload and further include networking information (such as header information for identifying one or more destination waveguide systems 1602). The networking information may be provided by the waveguide system 1602 or an originating device such as the central office 1611, the base station 1614, mobile devices 1620, or in-building devices 1618, or a combination thereof. Additionally, the modulated electromagnetic waves can include error correction data for mitigating signal disturbances. The networking information and error correction data can be used by a destination waveguide system 1602 for detecting transmissions directed to it, and for down-converting and processing with error correction data transmissions that include voice and/or data signals directed to recipient communication devices communicatively coupled to the destination waveguide system 1602.

Referring now to the sensors 1604 of the waveguide system 1602, the sensors 1604 can comprise one or more of a temperature sensor 1604a, a disturbance detection sensor 1604b, a loss of energy sensor 1604c, a noise sensor 1604d, a vibration sensor 1604e, an environmental (e.g., weather) sensor 1604f, and/or an image sensor 1604g. The temperature sensor 1604a can be used to measure ambient temperature, a temperature of the transmission device 101 or 102, a temperature of the power line 1610, temperature differentials (e.g., compared to a setpoint or baseline, between transmission device 101 or 102 and 1610, etc.), or any combination thereof. In one embodiment, temperature metrics can be collected and reported periodically to a network management system 1601 by way of the base station 1614.

The disturbance detection sensor 1604b can perform measurements on the power line 1610 to detect disturbances such as signal reflections, which may indicate a presence of a downstream disturbance that may impede the propagation of electromagnetic waves on the power line 1610. A signal reflection can represent a distortion resulting from, for example, an electromagnetic wave transmitted on the power line 1610 by the transmission device 101 or 102 that reflects in whole or in part back to the transmission device 101 or 102 from a disturbance in the power line 1610 located downstream from the transmission device 101 or 102.

Signal reflections can be caused by obstructions on the power line 1610. For example, a tree limb may cause electromagnetic wave reflections when the tree limb is lying on the power line 1610, or is in close proximity to the power line 1610 which may cause a corona discharge. Other obstructions that can cause electromagnetic wave reflections can include without limitation an object that has been entangled on the power line 1610 (e.g., clothing, a shoe wrapped around a power line 1610 with a shoe string, etc.), a corroded build-up on the power line 1610 or an ice build-up. Power grid components may also impede or obstruct with the propagation of electromagnetic waves on the surface of power lines 1610. Illustrations of power grid components that may cause signal reflections include without limitation a transformer and a joint for connecting spliced power lines. A sharp angle on the power line 1610 may also cause electromagnetic wave reflections.

The disturbance detection sensor 1604b can comprise a circuit to compare magnitudes of electromagnetic wave reflections to magnitudes of original electromagnetic waves transmitted by the transmission device 101 or 102 to determine how much a downstream disturbance in the power line 1610 attenuates transmissions. The disturbance detection sensor 1604b can further comprise a spectral analyzer circuit for performing spectral analysis on the reflected waves. The spectral data generated by the spectral analyzer circuit can be compared with spectral profiles via pattern recognition, an expert system, curve fitting, matched filtering or other artificial intelligence, classification or comparison technique to identify a type of disturbance based on, for example, the spectral profile that most closely matches the spectral data. The spectral profiles can be stored in a memory of the disturbance detection sensor 1604b or may be remotely accessible by the disturbance detection sensor 1604b. The profiles can comprise spectral data that models different disturbances that may be encountered on power lines 1610 to enable the disturbance detection sensor 1604b to identify disturbances locally. An identification of the disturbance if known can be reported to the network management system 1601 by way of the base station 1614. The disturbance detection sensor 1604b can also utilize the transmission device 101 or 102 to transmit electromagnetic waves as test signals to determine a roundtrip time for an electromagnetic wave reflection. The round trip time measured by the disturbance detection sensor 1604b can be used to calculate a distance traveled by the electromagnetic wave up to a point where the reflection takes place, which enables the disturbance detection sensor 1604b to calculate a distance from the transmission device 101 or 102 to the downstream disturbance on the power line 1610.

The distance calculated can be reported to the network management system 1601 by way of the base station 1614. In one embodiment, the location of the waveguide system 1602 on the power line 1610 may be known to the network management system 1601, which the network management system 1601 can use to determine a location of the disturbance on the power line 1610 based on a known topology of the power grid. In another embodiment, the waveguide system 1602 can provide its location to the network management system 1601 to assist in the determination of the location of the disturbance on the power line 1610. The location of the waveguide system 1602 can be obtained by the waveguide system 1602 from a pre-programmed location of the waveguide system 1602 stored in a memory of the waveguide system 1602, or the waveguide system 1602 can determine its location using a GPS receiver (not shown) included in the waveguide system 1602.

The power management system 1605 provides energy to the aforementioned components of the waveguide system 1602. The power management system 1605 can receive energy from solar cells, or from a transformer (not shown) coupled to the power line 1610, or by inductive coupling to the power line 1610 or another nearby power line. The power management system 1605 can also include a backup battery and/or a super capacitor or other capacitor circuit for providing the waveguide system 1602 with temporary power. The loss of energy sensor 1604c can be used to detect when the waveguide system 1602 has a loss of power condition and/or the occurrence of some other malfunction. For example, the loss of energy sensor 1604c can detect when there is a loss of power due to defective solar cells, an obstruction on the solar cells that causes them to malfunction, loss of power on the power line 1610, and/or when the backup power system malfunctions due to expiration of a backup battery, or a detectable defect in a super capacitor. When a malfunction and/or loss of power occurs, the loss of energy sensor 1604c can notify the network management system 1601 by way of the base station 1614.

The noise sensor 1604d can be used to measure noise on the power line 1610 that may adversely affect transmission of electromagnetic waves on the power line 1610. The noise sensor 1604d can sense unexpected electromagnetic interference, noise bursts, or other sources of disturbances that may interrupt reception of modulated electromagnetic waves on a surface of a power line 1610. A noise burst can be caused by, for example, a corona discharge, or other source of noise. The noise sensor 1604d can compare the measured noise to a noise profile obtained by the waveguide system 1602 from an internal database of noise profiles or from a remotely located database that stores noise profiles via pattern recognition, an expert system, curve fitting, matched filtering or other artificial intelligence, classification or comparison technique. From the comparison, the noise sensor 1604d may identify a noise source (e.g., corona discharge or otherwise) based on, for example, the noise profile that provides the closest match to the measured noise. The noise sensor 1604d can also detect how noise affects transmissions by measuring transmission metrics such as bit error rate, packet loss rate, jitter, packet retransmission requests, etc. The noise sensor 1604d can report to the network management system 1601 by way of the base station 1614 the identity of noise sources, their time of occurrence, and transmission metrics, among other things.

The vibration sensor 1604e can include accelerometers and/or gyroscopes to detect 2D or 3D vibrations on the power line 1610. The vibrations can be compared to vibration profiles that can be stored locally in the waveguide system 1602, or obtained by the waveguide system 1602 from a remote database via pattern recognition, an expert system, curve fitting, matched filtering or other artificial intelligence, classification or comparison technique. Vibration profiles can be used, for example, to distinguish fallen trees from wind gusts based on, for example, the vibration profile that provides the closest match to the measured vibrations. The results of this analysis can be reported by the vibration sensor 1604e to the network management system 1601 by way of the base station 1614.

The environmental sensor 1604f can include a barometer for measuring atmospheric pressure, ambient temperature (which can be provided by the temperature sensor 1604a), wind speed, humidity, wind direction, and rainfall, among other things. The environmental sensor 1604f can collect raw information and process this information by comparing it to environmental profiles that can be obtained from a memory of the waveguide system 1602 or a remote database to predict weather conditions before they arise via pattern recognition, an expert system, knowledge-based system or other artificial intelligence, classification or other weather modeling and prediction technique. The environmental sensor 1604*f* can report raw data as well as its analysis to the network management system 1601.

The image sensor 1604*g* can be a digital camera (e.g., a charged coupled device or CCD imager, infrared camera, etc.) for capturing images in a vicinity of the waveguide system 1602. The image sensor 1604*g* can include an electromechanical mechanism to control movement (e.g., actual position or focal points/zooms) of the camera for inspecting the power line 1610 from multiple perspectives (e.g., top surface, bottom surface, left surface, right surface and so on). Alternatively, the image sensor 1604*g* can be designed such that no electromechanical mechanism is needed in order to obtain the multiple perspectives. The collection and retrieval of imaging data generated by the image sensor 1604*g* can be controlled by the network management system 1601, or can be autonomously collected and reported by the image sensor 1604*g* to the network management system 1601.

Other sensors that may be suitable for collecting telemetry information associated with the waveguide system 1602 and/or the power lines 1610 for purposes of detecting, predicting and/or mitigating disturbances that can impede the propagation of electromagnetic wave transmissions on power lines 1610 (or any other form of a transmission medium of electromagnetic waves) may be utilized by the waveguide system 1602.

Referring now to FIG. 16B, block diagram 1650 illustrates an example, non-limiting embodiment of a system for managing a power grid 1653 and a communication system 1655 embedded therein or associated therewith in accordance with various aspects described herein. The communication system 1655 comprises a plurality of waveguide systems 1602 coupled to power lines 1610 of the power grid 1653. At least a portion of the waveguide systems 1602 used in the communication system 1655 can be in direct communication with a base station 1614 and/or the network management system 1601. Waveguide systems 1602 not directly connected to a base station 1614 or the network management system 1601 can engage in communication sessions with either a base station 1614 or the network management system 1601 by way of other downstream waveguide systems 1602 connected to a base station 1614 or the network management system 1601.

The network management system 1601 can be communicatively coupled to equipment of a utility company 1652 and equipment of a communications service provider 1654 for providing each entity, status information associated with the power grid 1653 and the communication system 1655, respectively. The network management system 1601, the equipment of the utility company 1652, and the communications service provider 1654 can access communication devices utilized by utility company personnel 1656 and/or communication devices utilized by communications service provider personnel 1658 for purposes of providing status information and/or for directing such personnel in the management of the power grid 1653 and/or communication system 1655.

Figure 17A:
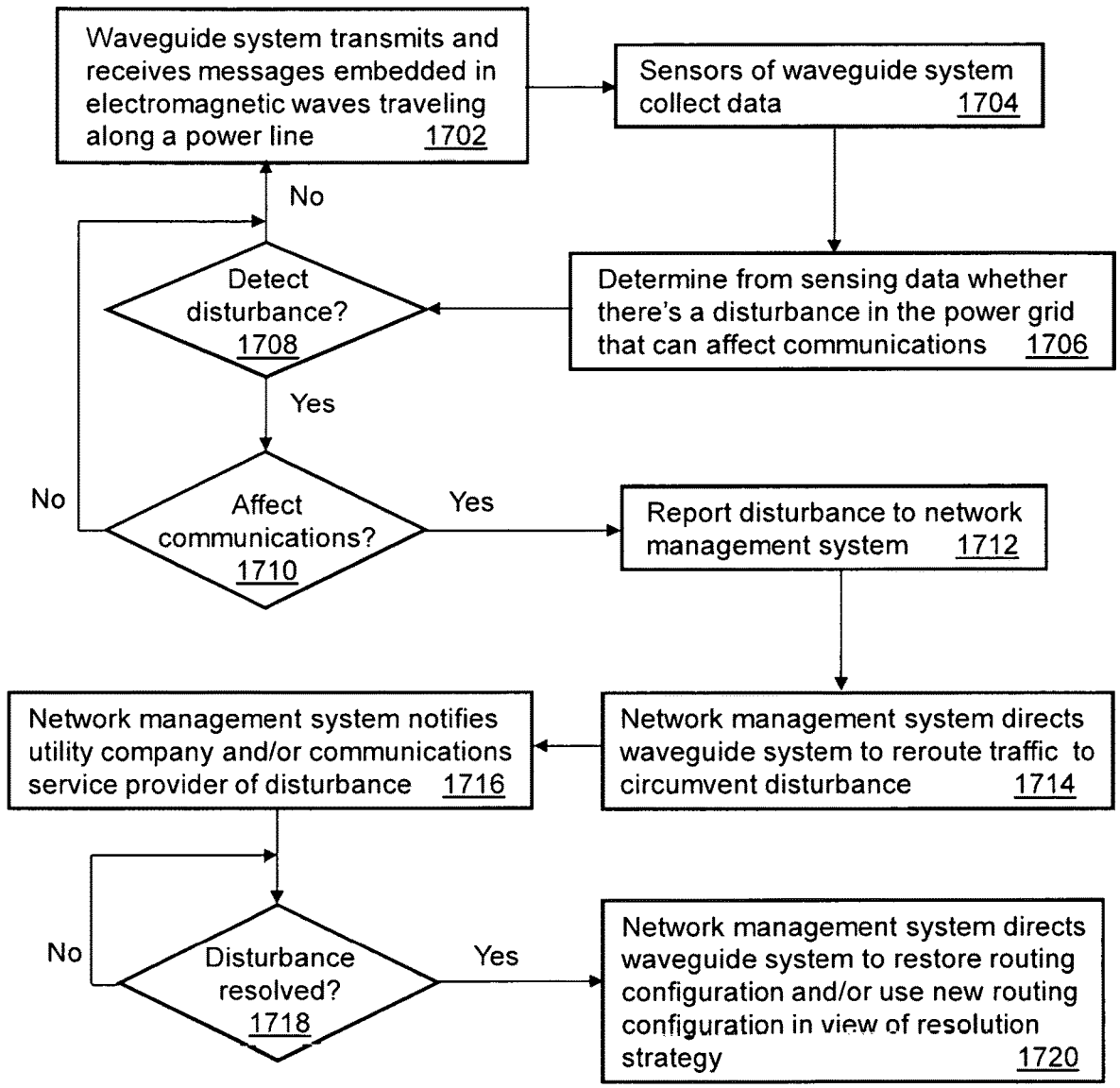
FIG. 17A illustrates a flow diagram of an example, non-limiting embodiment of a method for detecting and mitigating disturbances occurring in a communication network of the system of FIGS. 16A and 16B.

FIG. 17A illustrates a flow diagram of an example, non-limiting embodiment of a method 1700 for detecting and mitigating disturbances occurring in a communication network of the systems of FIGS. 16A & 16B. Method 1700 can begin with step 1702 where a waveguide system 1602 transmits and receives messages embedded in, or forming part of, modulated electromagnetic waves or another type of electromagnetic waves traveling along a surface of a power line 1610. The messages can be voice messages, streaming video, and/or other data/information exchanged between communication devices communicatively coupled to the communication system 1655. At step 1704 the sensors 1604 of the waveguide system 1602 can collect sensing data. In an embodiment, the sensing data can be collected in step 1704 prior to, during, or after the transmission and/or receipt of messages in step 1702. At step 1706 the waveguide system 1602 (or the sensors 1604 themselves) can determine from the sensing data an actual or predicted occurrence of a disturbance in the communication system 1655 that can affect communications originating from (e.g., transmitted by) or received by the waveguide system 1602. The waveguide system 1602 (or the sensors 1604) can process temperature data, signal reflection data, loss of energy data, noise data, vibration data, environmental data, or any combination thereof to make this determination. The waveguide system 1602 (or the sensors 1604) may also detect, identify, estimate, or predict the source of the disturbance and/or its location in the communication system 1655. If a disturbance is neither detected/identified nor predicted/estimated at step 1708, the waveguide system 1602 can proceed to step 1702 where it continues to transmit and receive messages embedded in, or forming part of, modulated electromagnetic waves traveling along a surface of the power line 1610.

If at step 1708 a disturbance is detected/identified or predicted/estimated to occur, the waveguide system 1602 proceeds to step 1710 to determine if the disturbance adversely affects (or alternatively, is likely to adversely affect or the extent to which it may adversely affect) transmission or reception of messages in the communication system 1655. In one embodiment, a duration threshold and a frequency of occurrence threshold can be used at step 1710 to determine when a disturbance adversely affects communications in the communication system 1655. For illustration purposes only, assume a duration threshold is set to 500 ms, while a frequency of occurrence threshold is set to 5 disturbances occurring in an observation period of 10 sec. Thus, a disturbance having a duration greater than 500 ms will trigger the duration threshold. Additionally, any disturbance occurring more than 5 times in a 10 sec time interval will trigger the frequency of occurrence threshold.

In one embodiment, a disturbance may be considered to adversely affect signal integrity in the communication systems 1655 when the duration threshold alone is exceeded. In another embodiment, a disturbance may be considered as adversely affecting signal integrity in the communication systems 1655 when both the duration threshold and the frequency of occurrence threshold are exceeded. The latter embodiment is thus more conservative than the former embodiment for classifying disturbances that adversely affect signal integrity in the communication system 1655. It will be appreciated that many other algorithms and associated parameters and thresholds can be utilized for step 1710 in accordance with example embodiments.

Referring back to method 1700, if at step 1710 the disturbance detected at step 1708 does not meet the condition for adversely affected communications (e.g., neither exceeds the duration threshold nor the frequency of occurrence threshold), the waveguide system 1602 may proceed to step 1702 and continue processing messages. For instance, if the disturbance detected in step 1708 has a duration of 1 msec with a single occurrence in a 10 sec time period, then neither threshold will be exceeded. Consequently, such a disturbance may be considered as having a nominal effect on signal integrity in the communication system 1655 and thus would not be flagged as a disturbance requiring mitigation. Although not flagged, the occurrence of the disturbance, its time of occurrence, its frequency of occurrence, spectral data, and/or other useful information, may be reported to the network management system 1601 as telemetry data for monitoring purposes.

Referring back to step 1710, if on the other hand the disturbance satisfies the condition for adversely affected communications (e.g., exceeds either or both thresholds), the waveguide system 1602 can proceed to step 1712 and report the incident to the network management system 1601. The report can include raw sensing data collected by the sensors 1604, a description of the disturbance if known by the waveguide system 1602, a time of occurrence of the disturbance, a frequency of occurrence of the disturbance, a location associated with the disturbance, parameters readings such as bit error rate, packet loss rate, retransmission requests, jitter, latency and so on. If the disturbance is based on a prediction by one or more sensors of the waveguide system 1602, the report can include a type of disturbance expected, and if predictable, an expected time occurrence of the disturbance, and an expected frequency of occurrence of the predicted disturbance when the prediction is based on historical sensing data collected by the sensors 1604 of the waveguide system 1602.

At step 1714, the network management system 1601 can determine a mitigation, circumvention, or correction technique, which may include directing the waveguide system 1602 to reroute traffic to circumvent the disturbance if the location of the disturbance can be determined. In one embodiment, the waveguide coupling device 1402 detecting the disturbance may direct a repeater such as the one shown in FIGS. 13-14 to connect the waveguide system 1602 from a primary power line affected by the disturbance to a secondary power line to enable the waveguide system 1602 to reroute traffic to a different transmission medium and avoid the disturbance. In an embodiment where the waveguide system 1602 is configured as a repeater the waveguide system 1602 can itself perform the rerouting of traffic from the primary power line to the secondary power line. It is further noted that for bidirectional communications (e.g., full or half-duplex communications), the repeater can be configured to reroute traffic from the secondary power line back to the primary power line for processing by the waveguide system 1602.

In another embodiment, the waveguide system 1602 can redirect traffic by instructing a first repeater situated upstream of the disturbance and a second repeater situated downstream of the disturbance to redirect traffic from a primary power line temporarily to a secondary power line and back to the primary power line in a manner that avoids the disturbance. It is further noted that for bidirectional communications (e.g., full or half-duplex communications), repeaters can be configured to reroute traffic from the secondary power line back to the primary power line.

To avoid interrupting existing communication sessions occurring on a secondary power line, the network management system 1601 may direct the waveguide system 1602 to instruct repeater(s) to utilize unused time slot(s) and/or frequency band(s) of the secondary power line for redirecting data and/or voice traffic away from the primary power line to circumvent the disturbance.

At step 1716, while traffic is being rerouted to avoid the disturbance, the network management system 1601 can notify equipment of the utility company 1652 and/or equipment of the communications service provider 1654, which in turn may notify personnel of the utility company 1656 and/or personnel of the communications service provider 1658 of the detected disturbance and its location if known.

Field personnel from either party can attend to resolving the disturbance at a determined location of the disturbance. Once the disturbance is removed or otherwise mitigated by personnel of the utility company and/or personnel of the communications service provider, such personnel can notify their respective companies and/or the network management system 1601 utilizing field equipment (e.g., a laptop computer, smartphone, etc.) communicatively coupled to network management system 1601, and/or equipment of the utility company and/or the communications service provider. The notification can include a description of how the disturbance was mitigated and any changes to the power lines 1610 that may change a topology of the communication system 1655.

Once the disturbance has been resolved (as determined in decision 1718), the network management system 1601 can direct the waveguide system 1602 at step 1720 to restore the previous routing configuration used by the waveguide system 1602 or route traffic according to a new routing configuration if the restoration strategy used to mitigate the disturbance resulted in a new network topology of the communication system 1655. In another embodiment, the waveguide system 1602 can be configured to monitor mitigation of the disturbance by transmitting test signals on the power line 1610 to determine when the disturbance has been removed. Once the waveguide system 1602 detects an absence of the disturbance it can autonomously restore its routing configuration without assistance by the network management system 1601 if it determines the network topology of the communication system 1655 has not changed, or it can utilize a new routing configuration that adapts to a detected new network topology.

Figure 17B:
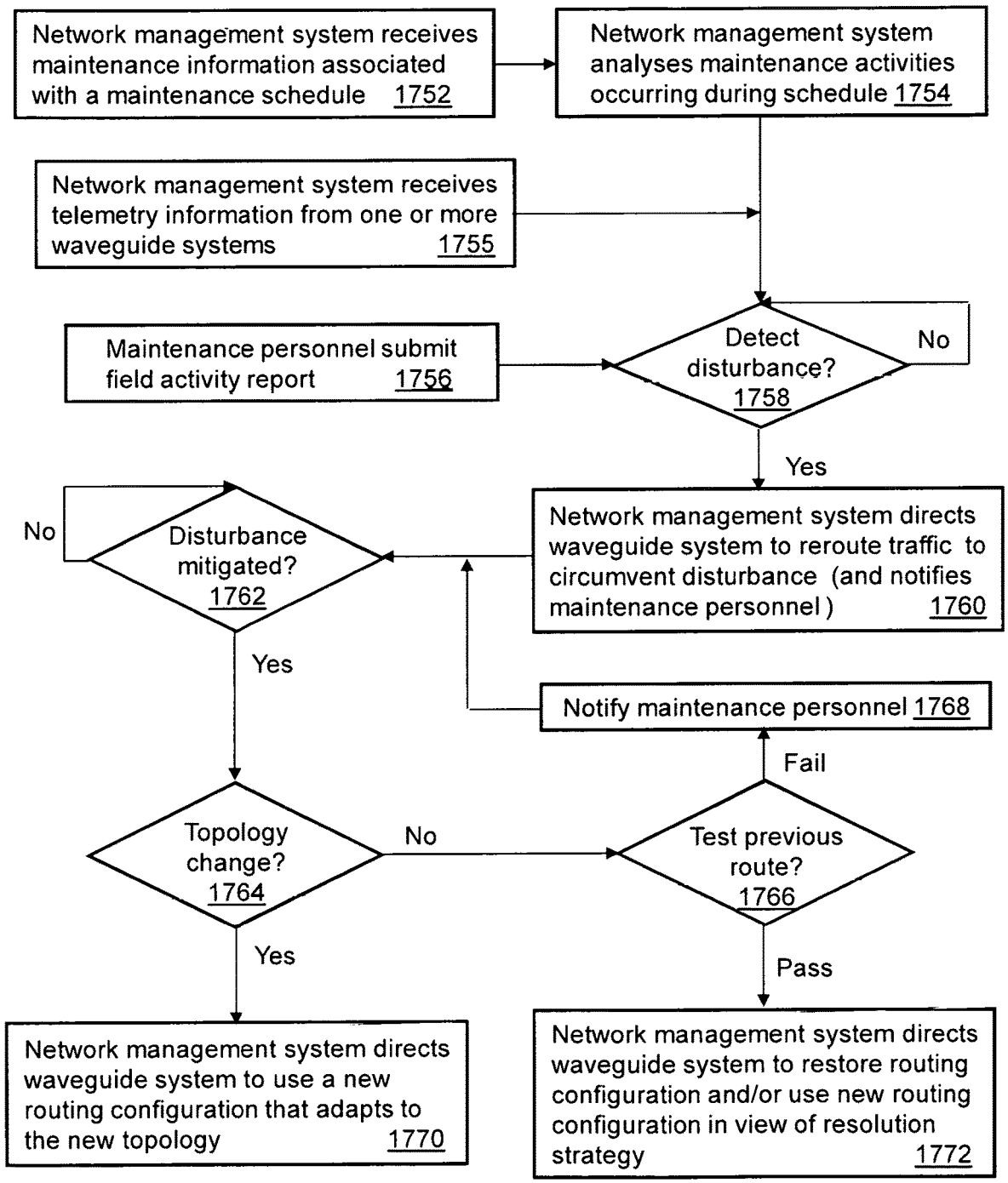
FIG. 17B illustrates a flow diagram of an example, non-limiting embodiment of a method for detecting and mitigating disturbances occurring in a communication network of the system of FIGS. 16A and 16B.

FIG. 17B illustrates a flow diagram of an example, non-limiting embodiment of a method 1750 for detecting and mitigating disturbances occurring in a communication network of the system of FIGS. 16A and 16B. In one embodiment, method 1750 can begin with step 1752 where a network management system 1601 receives from equipment of the utility company 1652 or equipment of the communications service provider 1654 maintenance information associated with a maintenance schedule. The network management system 1601 can at step 1754 identify from the maintenance information, maintenance activities to be performed during the maintenance schedule. From these activities, the network management system 1601 can detect a disturbance resulting from the maintenance (e.g., scheduled replacement of a power line 1610, scheduled replacement of a waveguide system 1602 on the power line 1610, scheduled reconfiguration of power lines 1610 in the power grid 1653, etc.).

In another embodiment, the network management system 1601 can receive at step 1755 telemetry information from one or more waveguide systems 1602. The telemetry information can include among other things an identity of each waveguide system 1602 submitting the telemetry information, measurements taken by sensors 1604 of each waveguide system 1602, information relating to predicted, estimated, or actual disturbances detected by the sensors 1604 of each waveguide system 1602, location information associated with each waveguide system 1602, an estimated location of a detected disturbance, an identification of the disturbance, and so on. The network management system 1601 can determine from the telemetry information a type of disturbance that may be adverse to operations of the waveguide, transmission of the electromagnetic waves along the wire surface, or both. The network management system 1601 can also use telemetry information from multiple waveguide systems 1602 to isolate and identify the disturbance. Additionally, the network management system 1601 can request telemetry information from waveguide systems 1602 in a vicinity of an affected waveguide system 1602 to triangulate a location of the disturbance and/or validate an identification of the disturbance by receiving similar telemetry information from other waveguide systems 1602.

In yet another embodiment, the network management system 1601 can receive at step 1756 an unscheduled activity report from maintenance field personnel. Unscheduled maintenance may occur as result of field calls that are unplanned or as a result of unexpected field issues discovered during field calls or scheduled maintenance activities. The activity report can identify changes to a topology configuration of the power grid 1653 resulting from field personnel addressing discovered issues in the communication system 1655 and/or power grid 1653, changes to one or more waveguide systems 1602 (such as replacement or repair thereof), mitigation of disturbances performed if any, and so on.

At step 1758, the network management system 1601 can determine from reports received according to steps 1752 through 1756 if a disturbance will occur based on a maintenance schedule, or if a disturbance has occurred or is predicted to occur based on telemetry data, or if a disturbance has occurred due to an unplanned maintenance identified in a field activity report. From any of these reports, the network management system 1601 can determine whether a detected or predicted disturbance requires rerouting of traffic by the affected waveguide systems 1602 or other waveguide systems 1602 of the communication system 1655.

When a disturbance is detected or predicted at step 1758, the network management system 1601 can proceed to step 1760 where it can direct one or more waveguide systems 1602 to reroute traffic to circumvent the disturbance. When the disturbance is permanent due to a permanent topology change of the power grid 1653, the network management system 1601 can proceed to step 1770 and skip steps 1762, 1764, 1766, and 1772. At step 1770, the network management system 1601 can direct one or more waveguide systems 1602 to use a new routing configuration that adapts to the new topology. However, when the disturbance has been detected from telemetry information supplied by one or more waveguide systems 1602, the network management system 1601 can notify maintenance personnel of the utility company 1656 or the communications service provider 1658 of a location of the disturbance, a type of disturbance if known, and related information that may be helpful to such personnel to mitigate the disturbance. When a disturbance is expected due to maintenance activities, the network management system 1601 can direct one or more waveguide systems 1602 to reconfigure traffic routes at a given schedule (consistent with the maintenance schedule) to avoid disturbances caused by the maintenance activities during the maintenance schedule.

Returning back to step 1760 and upon its completion, the process can continue with step 1762. At step 1762, the network management system 1601 can monitor when the disturbance(s) have been mitigated by field personnel. Mitigation of a disturbance can be detected at step 1762 by analyzing field reports submitted to the network management system 1601 by field personnel over a communications network (e.g., cellular communication system) utilizing field equipment (e.g., a laptop computer or handheld computer/device). If field personnel have reported that a disturbance has been mitigated, the network management system 1601 can proceed to step 1764 to determine from the field report whether a topology change was required to mitigate the disturbance. A topology change can include rerouting a power line 1610, reconfiguring a waveguide system 1602 to utilize a different power line 1610, otherwise utilizing an alternative link to bypass the disturbance and so on. If a topology change has taken place, the network management system 1601 can direct at step 1770 one or more waveguide systems 1602 to use a new routing configuration that adapts to the new topology.

If, however, a topology change has not been reported by field personnel, the network management system 1601 can proceed to step 1766 where it can direct one or more waveguide systems 1602 to send test signals to test a routing configuration that had been used prior to the detected disturbance(s). Test signals can be sent to affected waveguide systems 1602 in a vicinity of the disturbance. The test signals can be used to determine if signal disturbances (e.g., electromagnetic wave reflections) are detected by any of the waveguide systems 1602. If the test signals confirm that a prior routing configuration is no longer subject to previously detected disturbance(s), then the network management system 1601 can at step 1772 direct the affected waveguide systems 1602 to restore a previous routing configuration. If, however, test signals analyzed by one or more waveguide coupling device 1402 and reported to the network management system 1601 indicate that the disturbance(s) or new disturbance(s) are present, then the network management system 1601 will proceed to step 1768 and report this information to field personnel to further address field issues. The network management system 1601 can in this situation continue to monitor mitigation of the disturbance(s) at step 1762.

In the aforementioned embodiments, the waveguide systems 1602 can be configured to be self-adapting to changes in the power grid 1653 and/or to mitigation of disturbances. That is, one or more affected waveguide systems 1602 can be configured to self-monitor mitigation of disturbances and reconfigure traffic routes without requiring instructions to be sent to them by the network management system 1601. In this embodiment, the one or more waveguide systems 1602 that are self-configurable can inform the network management system 1601 of its routing choices so that the network management system 1601 can maintain a macro-level view of the communication topology of the communication system 1655.

While for purposes of simplicity of explanation, the respective processes are shown and described as a series of blocks in FIGS. 17A and 17B, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIGS. 18A, 18B, 18C, 18D, 18E, 18F and 18G are block diagrams illustrating example, non-limiting embodiments of a waveguide device for transmitting and/or receiving electromagnetic waves in accordance with various aspects described herein. In one or more embodiments, the waveguide device can be separable or otherwise configured to facilitate a physical connection with a transmission medium, such as a power line. As an example, the waveguide device can be selectively separable into portions (of the same or different sizes) so that the portions (any number of) can be joined or moved back together and clamped onto or otherwise physically connected with the transmission medium. Various components and/or techniques can be utilized for separating and rejoining portions of the waveguide device such as hinges, latching mechanisms, and so forth. The method of opening, closing or actuating the latching mechanism can vary including via a magnetic field, a servo-motor, a pushrod, and so forth. In one or more embodiments, the waveguide device can be self-closing, such as automatically actuating a latching mechanism of the waveguide device to physically connect with the transmission medium when in proximity to the transmission medium. In one or more embodiments, the latching mechanism can open or close responsive to a latching signal generated by the waveguide system or generated by another device, such as an unmanned aircraft utilized to deliver the waveguide device as described herein.

Figure 18A:
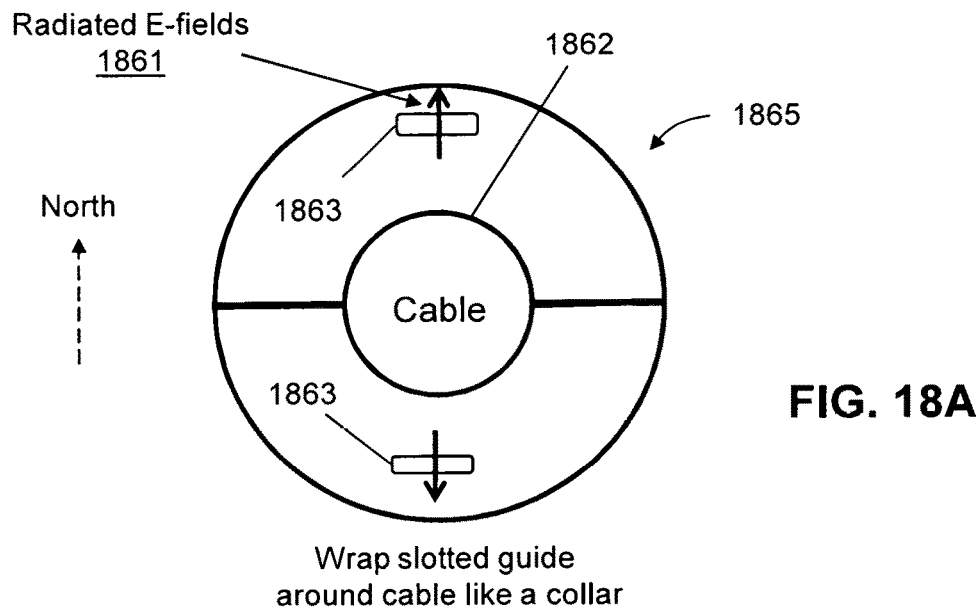
FIGS. 18A, 18B, 18C, 18D, 18E, 18F, 18G, 18H, 18I and 18J are block diagrams illustrating example, non-limiting embodiments of a waveguide device for transmitting or receiving electromagnetic waves in accordance with various aspects described herein.

In an embodiment, FIG. 18A illustrates a front view of a waveguide device 1865 having a plurality of slots 1863 (e.g., openings or apertures) for emitting electromagnetic waves having radiated electric fields (e-fields) 1861. In an embodiment, the radiated e-fields 1861 of pairs of symmetrically positioned slots 1863 (e.g., north and south slots of the waveguide 1865) can be directed away from each other (i.e., polar opposite radial orientations about the cable 1862). While the slots 1863 are shown as having a rectangular shape, other shapes such as other polygons, sector and arc shapes, ellipsoid shapes and other shapes are likewise possible. For illustration purposes only, the term north will refer to a relative direction as shown in the figures. All references in the subject disclosure to other directions (e.g., south, east, west, northwest, and so forth) will be relative to northern illustration. In an embodiment, to achieve e-fields with opposing orientations at the north and south slots 1863, for example, the north and south slots 1863 can be arranged to have a circumferential distance between each other that is approximately one wavelength of electromagnetic waves signals supplied to these slots. The waveguide 1865 can have a cylindrical cavity in a center of the waveguide 1865 to enable placement of a cable 1862. In one embodiment, the cable 1862 can comprise an insulated conductor. In another embodiment, the cable 1862 can comprise an uninsulated conductor. In yet other embodiments, the cable 1862 can comprise any of the embodiments of a transmission core 1852 of cable 1850 previously described.

In one embodiment, the cable 1862 can slide into the cylindrical cavity of the waveguide 1865. In another embodiment, the waveguide 1865 can utilize an assembly mechanism (not shown). The assembly mechanism (e.g., a hinge or other suitable mechanism that provides a way to open the waveguide 1865 at one or more locations) can be used to enable placement of the waveguide 1865 on an outer surface of the cable 1862 or otherwise to assemble separate pieces together to form the waveguide 1865 as shown. According to these and other suitable embodiments, the waveguide 1865 can be configured to wrap around the cable 1862 like a collar.

Figure 18B:
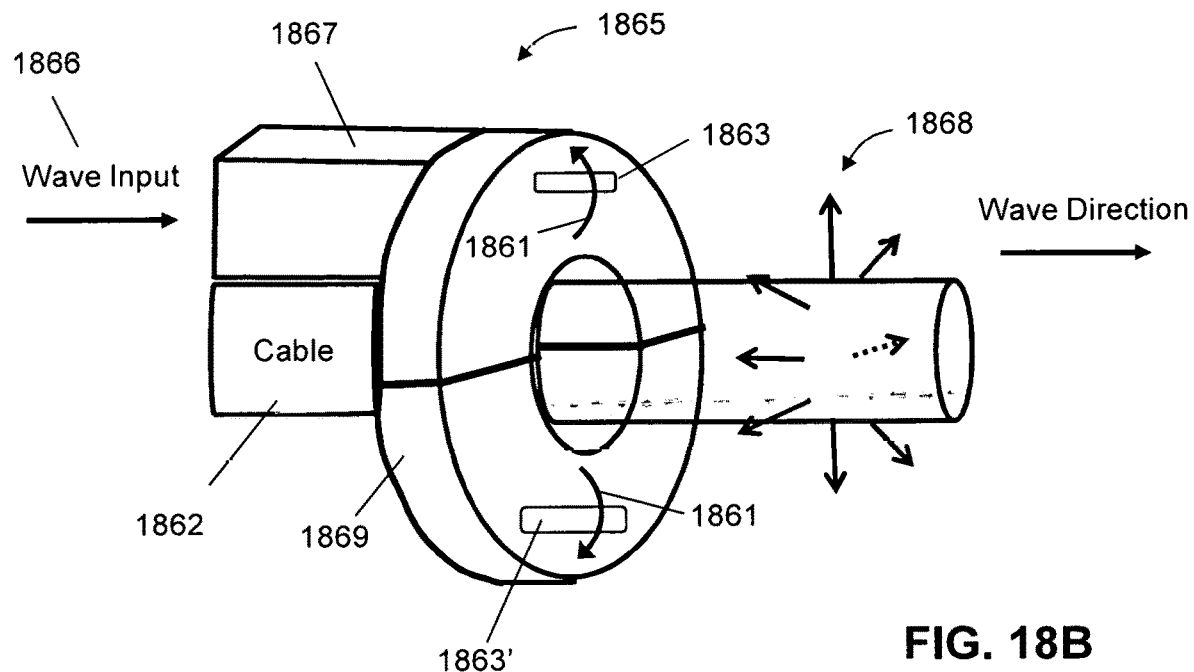

FIG. 18B illustrates a side view of an embodiment of the waveguide 1865. The waveguide 1865 can be adapted to have a hollow rectangular waveguide portion 1867 that receives electromagnetic waves 1866 generated by a transmitter circuit as previously described in the subject disclosure (e.g., see reference 101, 1000 of FIGS. 1 and 10A). The electromagnetic waves 1866 can be distributed by the hollow rectangular waveguide portion 1867 into in a hollow collar 1869 of the waveguide 1865. The rectangular waveguide portion 1867 and the hollow collar 1869 can be constructed of materials suitable for maintaining the electromagnetic waves within the hollow chambers of these assemblies (e.g., carbon fiber materials). It should be noted that while the waveguide portion 1867 is shown and described in a hollow rectangular configuration, other shapes and/or other non-hollow configurations can be employed. In particular, the waveguide portion 1867 can have a square or other polygonal cross section, an arc or sector cross section that is truncated to conform to the outer surface of the cable 1862, a circular or ellipsoid cross section or cross sectional shape. In addition, the waveguide portion 1867 can be configured as, or otherwise include, a solid dielectric material.

As previously described, the hollow collar 1869 can be configured to emit electromagnetic waves from each slot 1863 with opposite e-fields 1861 at pairs of symmetrically positioned slots 1863 and 1863'. In an embodiment, the electromagnetic waves emitted by the combination of slots 1863 and 1863' can in turn induce electromagnetic waves 1868 on that are bound to the cable 1862 for propagation according to a fundamental wave mode without other wave modes present—such as non-fundamental wave modes. In this configuration, the electromagnetic waves 1868 can propagate longitudinally along the cable 1862 to other downstream waveguide systems coupled to the cable 1862.

It should be noted that since the hollow rectangular waveguide portion 1867 of FIG. 18B is closer to slot 1863 (at the northern position of the waveguide 1865), slot 1863 can emit electromagnetic waves having a stronger magnitude than electromagnetic waves emitted by slot 1863' (at the southern position). To reduce magnitude differences between these slots, slot 1863' can be made larger than slot 1863. The technique of utilizing different slot sizes to balance signal magnitudes between slots can be applied to any of the embodiments of the subject disclosure relating to FIGS. 18A, 18B, 18D, 18F, 18H and 18I—some of which are described below.

Figure 18C:
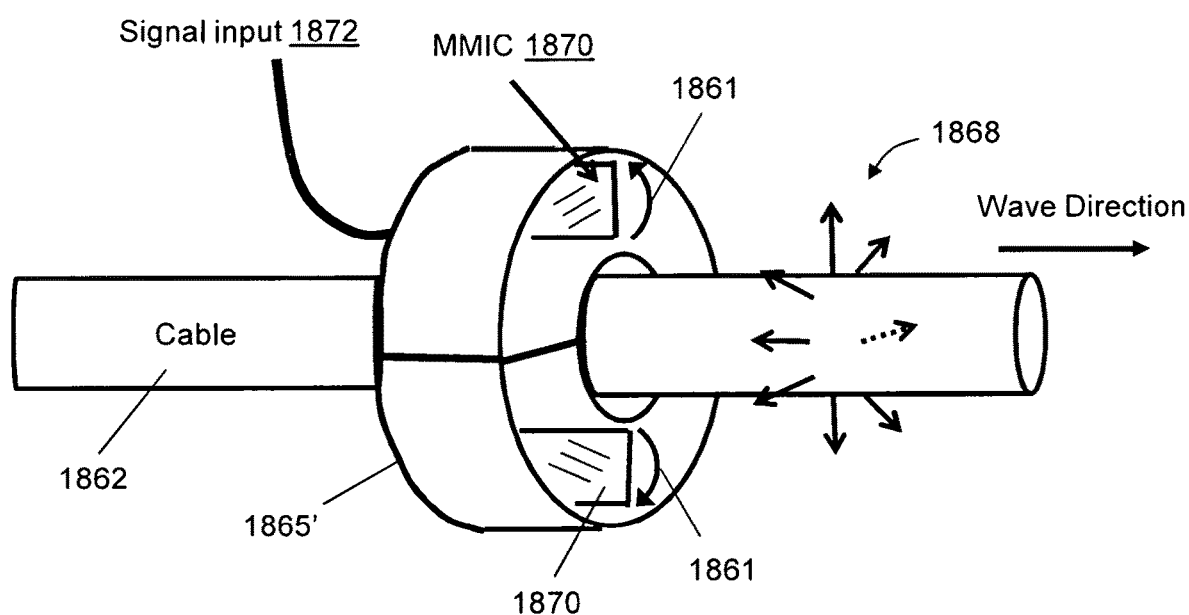

In another embodiment, FIG. 18C depicts a waveguide 1865' that can be configured to utilize circuitry such as monolithic microwave integrated circuits (MMICs) 1870 each coupled to a signal input 1872 (e.g., coaxial cable that provides a communication signal). The signal input 1872 can be generated by a transmitter circuit as previously described in the subject disclosure (e.g., see reference 101, 1000 of FIGS. 1 and 10A) adapted to provide electrical signals to the MMICs 1870. Each MMIC 1870 can be configured to receive signal 1872 which the MMIC 1870 can modulate and transmit with a radiating element (e.g., an antenna) to emit electromagnetic waves having radiated e-fields 1861. In one embodiment, the MMIC's 1870 can be configured to receive the same signal 1872, but transmit electromagnetic waves having e-fields 1861 of opposing orientation. This can be accomplished by configuring one of the MMICs 1870 to transmit electromagnetic waves that are 180 degrees out of phase with the electromagnetic waves transmitted by the other MMIC 1870. In an embodiment, the combination of the electromagnetic waves emitted by the MMICs 1870 can together induce electromagnetic waves 1868 that are bound to the cable 1862 for propagation according to a fundamental wave mode without other wave modes present—such as non-fundamental wave modes. In this configuration, the electromagnetic waves 1868 can propagate longitudinally along the cable 1862 to other downstream waveguide systems coupled to the cable 1862.

Figure 18D:
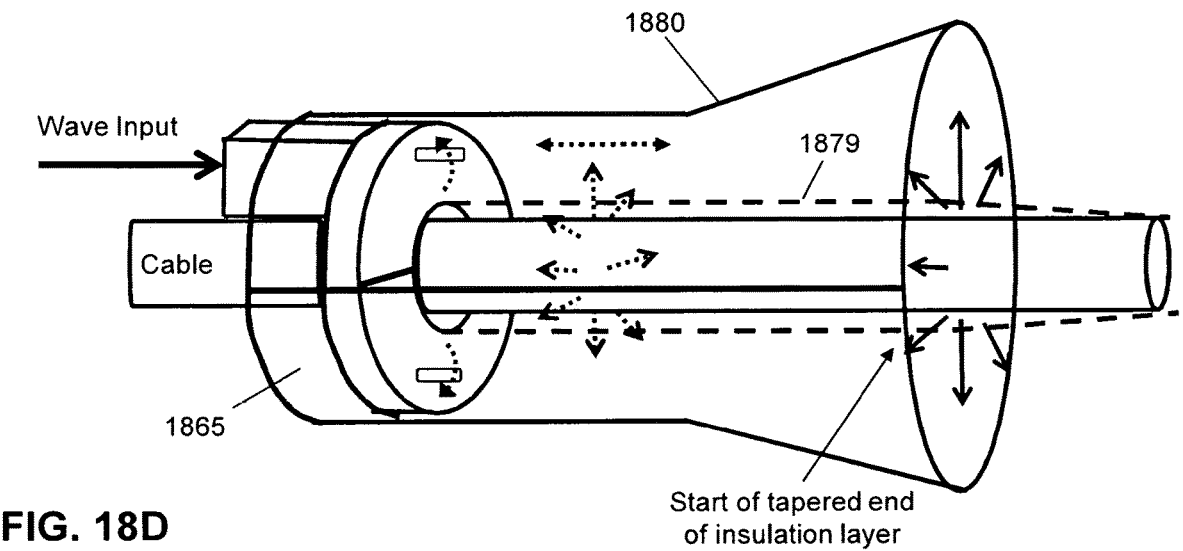
Figure 18E:
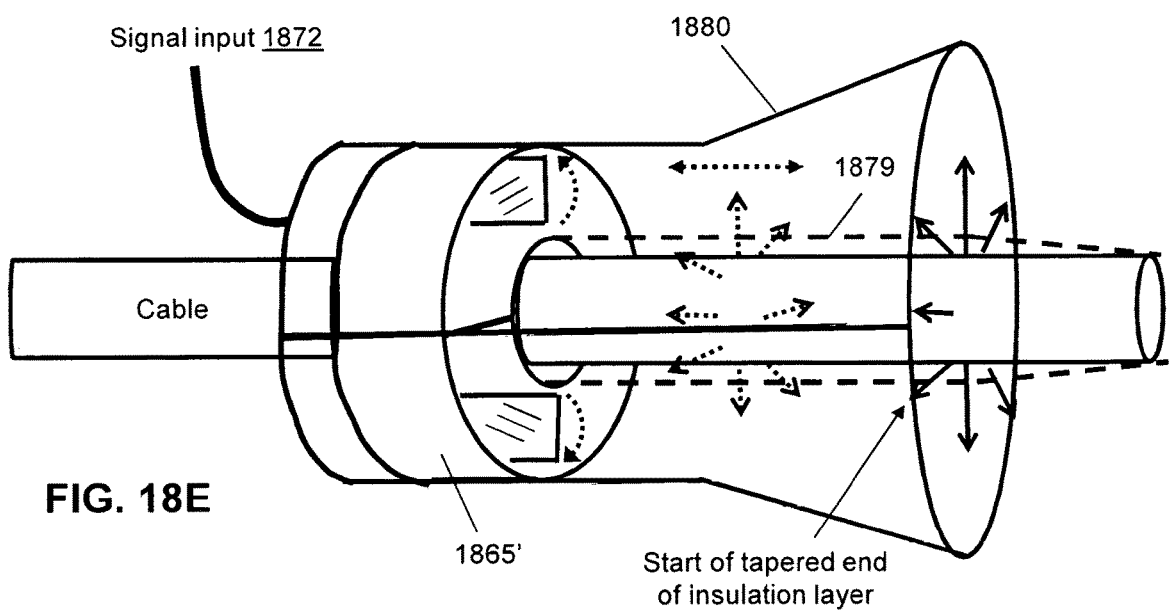

A tapered horn 1880 can be added to the embodiments of FIGS. 18B and 18C to assist in the inducement of the electromagnetic waves 1868 on cable 1862 as depicted in FIGS. 18D and 18E. In an embodiment where the cable 1862 is an uninsulated conductor, the electromagnetic waves induced on the cable 1862 can have a large radial dimension (e.g., 1 meter). To enable use of a smaller tapered horn 1880, an insulation layer 1879 can be applied on a portion of the cable 1862 at or near the cavity as depicted with hash lines in FIGS. 18D and 18E. The insulation layer 1879 can have a tapered end facing away from the waveguide 1865. The added insulation enables the electromagnetic waves 1868 initially launched by the waveguide 1865 (or 1865') to be tightly bound to the insulation, which in turn reduces the radial dimension of the electromagnetic fields 1868 (e.g., centimeters). As the electromagnetic waves 1868 propagate away from the waveguide 1865 (1865') and reach the tapered end of the insulation layer 1879, the radial dimension of the electromagnetic waves 1868 begin to increase eventually achieving the radial dimension they would have had had the electromagnetic waves 1868 been induced on the uninsulated conductor without an insulation layer. In the illustration of FIGS. 18D and 18E the tapered end begins at an end of the tapered horn 1880. In other embodiments, the tapered end of the insulation layer 1879 can begin before or after the end of the tapered horn 1880. The tapered horn can be metallic or constructed of other conductive material or constructed of a plastic or other non-conductive material that is coated or clad with a dielectric layer or doped with a conductive material to provide reflective properties similar to a metallic horn.

Figure 18F:
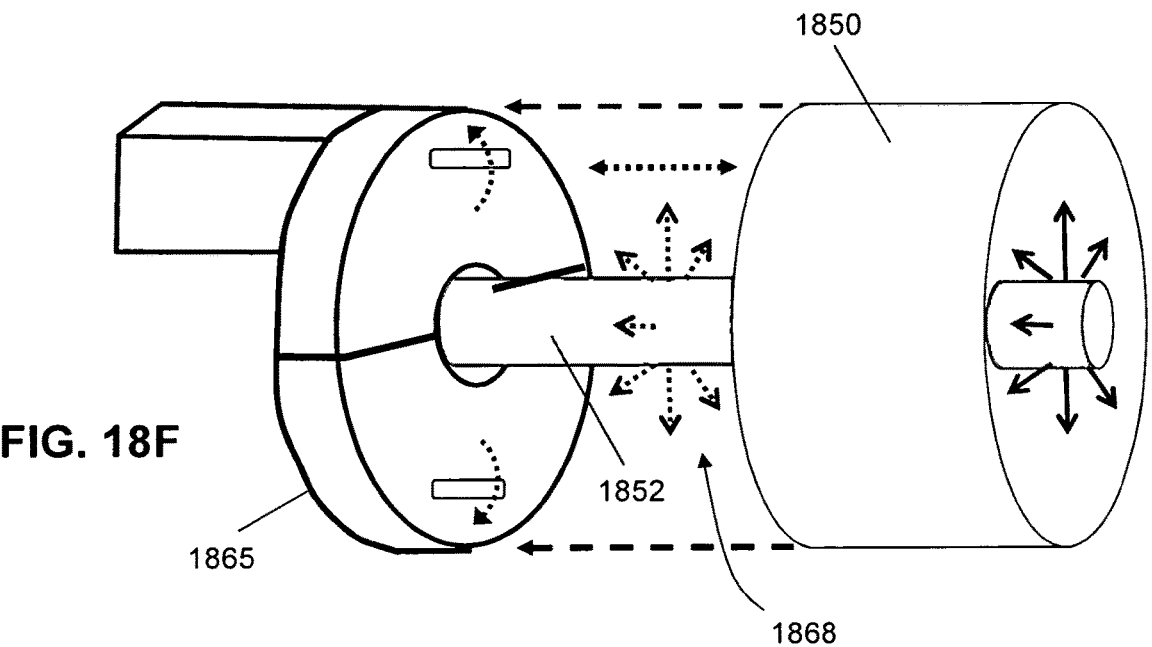
Figure 18G:
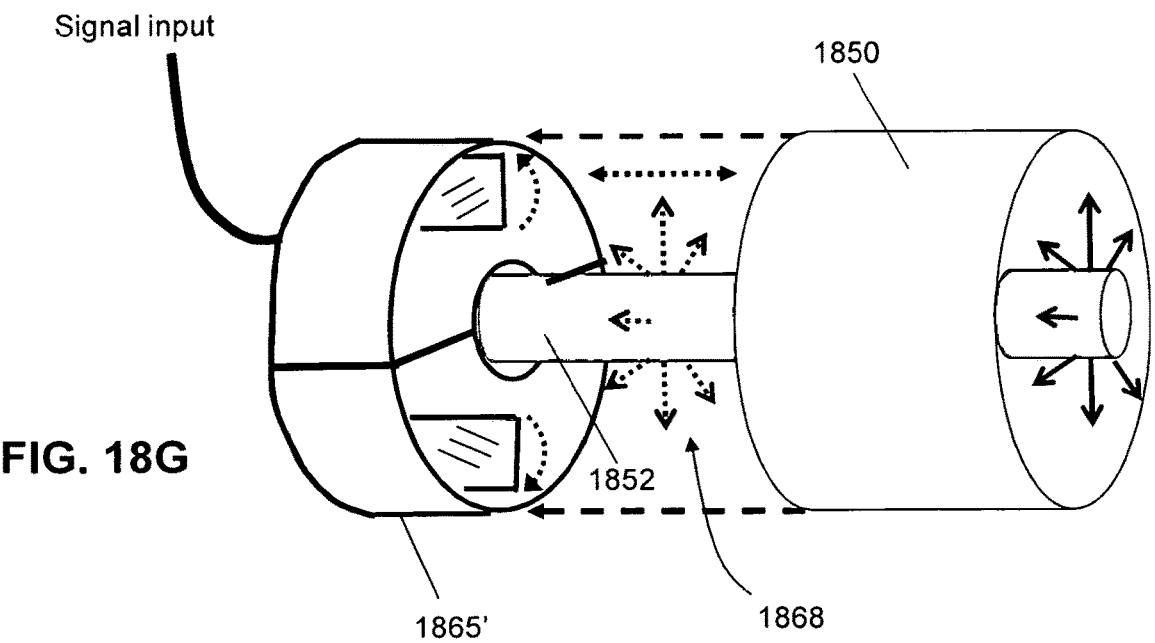

In an embodiment, cable 1862 can comprise any of the embodiments of cable 1850 described earlier. In this embodiment, waveguides 1865 and 1865' can be coupled to a transmission core 1852 of cable 1850 as depicted in FIGS. 18F and 18G. The waveguides 1865 and 1865' can induce, as previously described, electromagnetic waves 1868 on the transmission core 1852 for propagation entirely or partially within inner layers of cable 1850.

It is noted that for the foregoing embodiments of FIGS. 18D, 18E, 18F and 18G, electromagnetic waves 1868 can be bidirectional. For example, electromagnetic waves 1868 of a different operating frequency can be received by slots 1863 or MMIC's 1870 of the waveguides 1865 and 1865', respectively. Once received, the electromagnetic waves can be converted by a receiver circuit (e.g., see reference 101, 1000 of FIGS. 1 and 10A) for generating a communication signal for processing.

Although not shown, it is further noted that the waveguides 1865 and 1865' can be adapted so that the waveguides 1865 and 1865' can direct electromagnetic waves 1868 upstream or downstream longitudinally. For example, a first tapered horn 1880 coupled to a first instance of a waveguide 1865 or 1865' can be directed westerly on cable 1862, while a second tapered horn 1880 coupled to a second instance of a waveguide 1865 or 1865' can be directed easterly on cable 1862. The first and second instances of the waveguides 1865 or 1865' can be coupled so that in a repeater configuration, signals received by the first waveguide 1865 or 1865' can be provided to the second waveguide 1865 or 1865' for retransmission in an easterly direction on cable 1862. The repeater configuration just described can also be applied from an easterly to westerly direction on cable 1862.

Figure 18H:
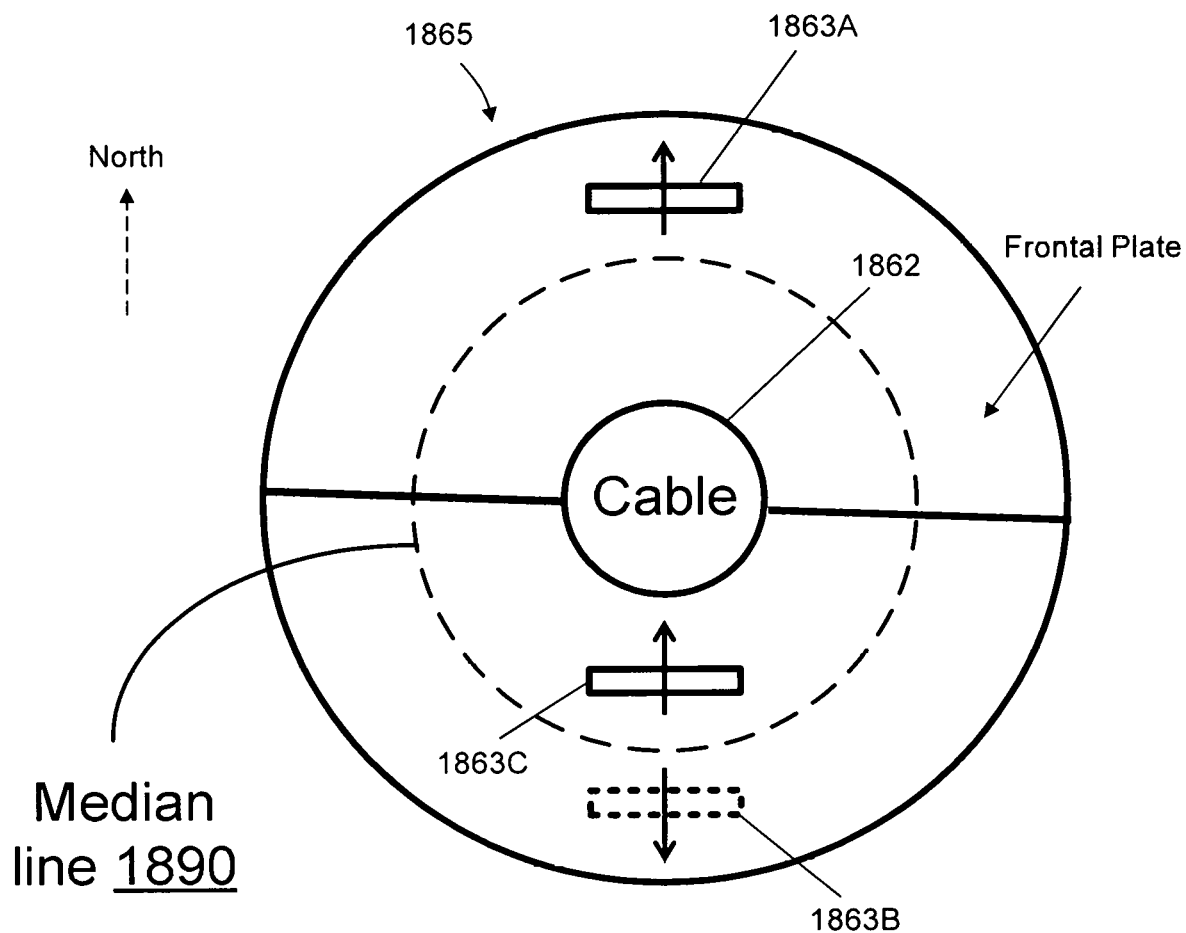

The waveguide 1865 of FIGS. 18A, 18B, 18D and 18F can also be configured to generate electromagnetic fields having only non-fundamental or asymmetric wave modes. FIG. 18H depicts an embodiment of a waveguide 1865 that can be adapted to generate electromagnetic fields having only non-fundamental wave modes. A median line 1890 represents a separation between slots where electrical currents on a backside (not shown) of a frontal plate of the waveguide 1865 change polarity. For example, electrical currents on the backside of the frontal plate corresponding to e-fields that are radially outward (i.e., point away from a center point of cable 1862) can in some embodiments be associated with slots located outside of the median line 1890 (e.g., slots 1863A and 1863B). Electrical currents on the backside of the frontal plate corresponding to e-fields that are radially inward (i.e., point towards a center point of cable 1862) can in some embodiments be associated with slots located inside of the median line 1890. The direction of the currents can depend on the operating frequency of the electromagnetic waves 1866 supplied to the hollow rectangular waveguide portion 1867 (see FIG. 18B) among other parameters.

For illustration purposes, assume the electromagnetic waves 1866 supplied to the hollow rectangular waveguide portion 1867 have an operating frequency whereby a circumferential distance between slots 1863A and 1863B is one full wavelength of the electromagnetic waves 1866. In this instance, the e-fields of the electromagnetic waves emitted by slots 1863A and 1863B point radially outward (i.e., have opposing orientations). When the electromagnetic waves emitted by slots 1863A and 1863B are combined, the resulting electromagnetic waves on cable 1862 will propagate according to the fundamental wave mode. In contrast, by repositioning one of the slots (e.g., slot 1863B) inside the media line 1890 (i.e., slot 1863C), slot 1863C will generate electromagnetic waves that have e-fields that are approximately 180 degrees out of phase with the e-fields of the electromagnetic waves generated by slot 1863A. Consequently, the e-field orientations of the electromagnetic waves generated by slot pairs 1863A and 1863C will be substantially aligned. The combination of the electromagnetic waves emitted by slot pairs 1863A and 1863C will thus generate electromagnetic waves that are bound to the cable 1862 for propagation according to a non-fundamental wave mode.

Figure 18I:
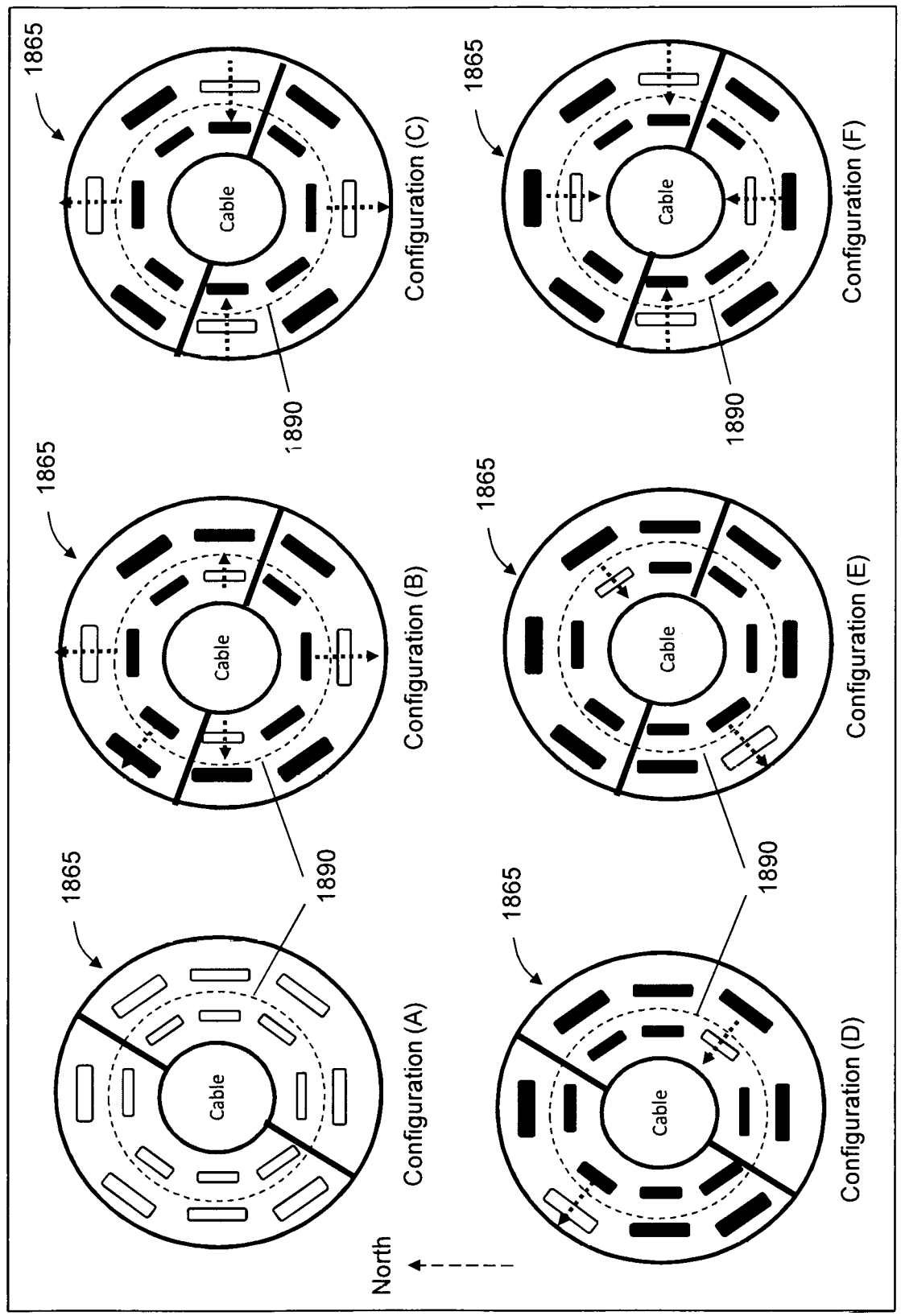

To achieve a reconfigurable slot arrangement, waveguide 1865 can be adapted according to the embodiments depicted in FIG. 18I. Configuration (A) depicts a waveguide 1865 having a plurality of symmetrically positioned slots. Each of the slots 1863 of configuration (A) can be selectively disabled by blocking the slot with a material (e.g., carbon fiber or metal) to prevent the emission of electromagnetic waves. A blocked (or disabled) slot 1863 is shown in black, while an enabled (or unblocked) slot 1863 is shown in white. Although not shown, a blocking material can be placed behind (or in front) of the frontal plate of the waveguide 1865. A mechanism (not shown) can be coupled to the blocking material so that the blocking material can slide in or out of a particular slot 1863 much like closing or opening a window with a cover. The mechanism can be coupled to a linear motor controllable by circuitry of the waveguide 1865 to selectively enable or disable individual slots 1863. With such a mechanism at each slot 1863, the waveguide 1865 can be configured to select different configurations of enabled and disabled slots 1863 as depicted in the embodiments of FIG. 18I. Other methods or techniques for covering or opening slots (e.g., utilizing rotatable disks behind or in front of the waveguide 1865) can be applied to the embodiments of the subject disclosure.

In one embodiment, the waveguide system 1865 can be configured to enable certain slots 1863 outside the median line 1890 and disable certain slots 1863 inside the median line 1890 as shown in configuration (B) to generate fundamental waves. Assume, for example, that the circumferential distance between slots 1863 outside the median line 1890 (i.e., in the northern and southern locations of the waveguide system 1865) is one full wavelength. These slots will therefore have electric fields (e-fields) pointing at certain instances in time radially outward as previously described. In contrast, the slots inside the median line 1890 (i.e., in the western and eastern locations of the waveguide system 1865) will have a circumferential distance of one-half a wavelength relative to either of the slots 1863 outside the median line. Since the slots inside the median line 1890 are half a wavelength apart, such slots will produce electromagnetic waves having e-fields pointing radially outward. If the western and eastern slots 1863 outside the median line 1890 had been enabled instead of the western and eastern slots inside the median line 1890, then the e-fields emitted by those slots would have pointed radially inward, which when combined with the electric fields of the northern and southern would produce non-fundamental wave mode propagation. Accordingly, configuration (B) as depicted in FIG. 18I can be used to generate electromagnetic waves at the northern and southern slots 1863 having e-fields that point radially outward and electromagnetic waves at the western and eastern slots 1863 with e-fields that also point radially outward, which when combined induce electromagnetic waves on cable 1862 having a fundamental wave mode.

In another embodiment, the waveguide system 1865 can be configured to enable a northerly, southerly, westerly and easterly slots 1863 all outside the median line 1890, and disable all other slots 1863 as shown in configuration (C). Assuming the circumferential distance between a pair of opposing slots (e.g., northerly and southerly, or westerly and easterly) is a full wavelength apart, then configuration (C) can be used to generate electromagnetic waves having a non-fundamental wave mode with some e-fields pointing radially outward and other fields pointing radially inward. In yet another embodiment, the waveguide system 1865 can be configured to enable a northwesterly slot 1863 outside the median line 1890, enable a southeasterly slot 1863 inside the median line 1890, and disable all other slots 1863 as shown in configuration (D). Assuming the circumferential distance between such a pair of slots is a full wavelength apart, then such a configuration can be used to generate electromagnetic waves having a non-fundamental wave mode with e-fields aligned in a northwesterly direction.

In another embodiment, the waveguide system 1865 can be configured to produce electromagnetic waves having a non-fundamental wave mode with e-fields aligned in a southwesterly direction. This can be accomplished by utilizing a different arrangement than used in configuration (D). Configuration (E) can be accomplished by enabling a southwesterly slot 1863 outside the median line 1890, enabling a northeasterly slot 1863 inside the median line 1890, and disabling all other slots 1863 as shown in configuration (E). Assuming the circumferential distance between such a pair of slots is a full wavelength apart, then such a configuration can be used to generate electromagnetic waves having a non-fundamental wave mode with e-fields aligned in a southwesterly direction. Configuration (E) thus generates a non-fundamental wave mode that is orthogonal to the non-fundamental wave mode of configuration (D).

In yet another embodiment, the waveguide system 1865 can be configured to generate electromagnetic waves having a fundamental wave mode with e-fields that point radially inward. This can be accomplished by enabling a northerly slot 1863 inside the median line 1890, enabling a southerly slot 1863 inside the median line 1890, enabling an easterly slot outside the median 1890, enabling a westerly slot 1863 outside the median 1890, and disabling all other slots 1863 as shown in configuration (F). Assuming the circumferential distance between the northerly and southerly slots is a full wavelength apart, then such a configuration can be used to generate electromagnetic waves having a fundamental wave mode with radially inward e-fields. Although the slots selected in configurations (B) and (F) are different, the fundamental wave modes generated by configurations (B) and (F) are the same.

It yet another embodiment, e-fields can be manipulated between slots to generate fundamental or non-fundamental wave modes by varying the operating frequency of the electromagnetic waves 1866 supplied to the hollow rectangular waveguide portion 1867. For example, assume in the illustration of FIG. 18H that for a particular operating frequency of the electromagnetic waves 1866 the circumferential distance between slot 1863A and 1863B is one full wavelength of the electromagnetic waves 1866. In this instance, the e-fields of electromagnetic waves emitted by slots 1863A and 1863B will point radially outward as shown, and can be used in combination to induce electromagnetic waves on cable 1862 having a fundamental wave mode. In contrast, the e-fields of electromagnetic waves emitted by slots 1863A and 1863C will be radially aligned (i.e., pointing northerly) as shown, and can be used in combination to induce electromagnetic waves on cable 1862 having a non-fundamental wave mode.

Now suppose that the operating frequency of the electromagnetic waves 1866 supplied to the hollow rectangular waveguide portion 1867 is changed so that the circumferential distance between slot 1863A and 1863B is one-half a wavelength of the electromagnetic waves 1866. In this instance, the e-fields of electromagnetic waves emitted by slots 1863A and 1863B will be radially aligned (i.e., point in the same direction). That is, the e-fields of electromagnetic waves emitted by slot 1863B will point in the same direction as the e-fields of electromagnetic waves emitted by slot 1863A. Such electromagnetic waves can be used in combination to induce electromagnetic waves on cable 1862 having a non-fundamental wave mode. In contrast, the e-fields of electromagnetic waves emitted by slots 1863A and 1863C will be radially outward (i.e., away from cable 1862), and can be used in combination to induce electromagnetic waves on cable 1862 having a fundamental wave mode.

Figure 18J:
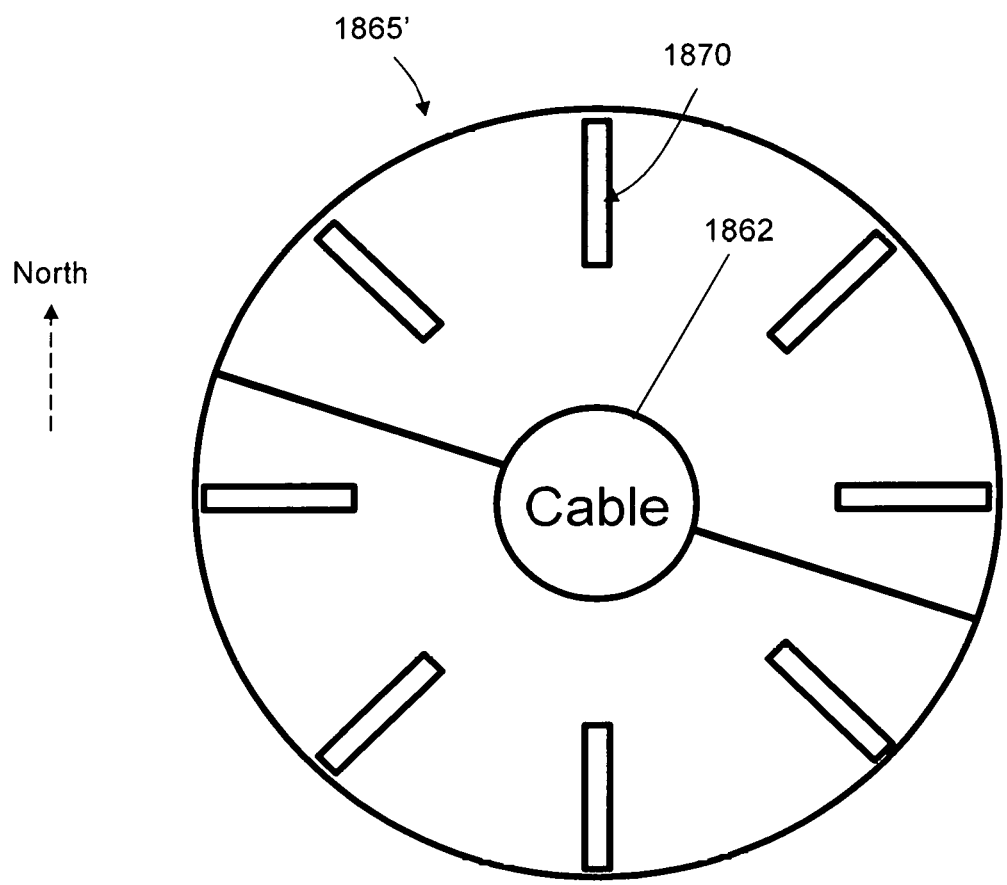

In another embodiment, the waveguide 1865' of FIGS. 18C, 18E and 18G can also be configured to generate electromagnetic waves having only non-fundamental wave modes. This can be accomplished by adding more MMICs 1870 as depicted in FIG. 18J. Each MMIC 1870 can be configured to receive the same signal input 1872. However, MMICs 1870 can selectively be configured to emit electromagnetic waves having differing phases using controllable phase-shifting circuitry in each MMIC 1870. For example, the northerly and southerly MMICs 1870 can be configured to emit electromagnetic waves having a 180-degree phase difference, thereby aligning the e-fields either in a northerly or southerly direction. Any combination of pairs of MMICs 1870 (e.g., westerly and easterly MMICs 1870, northwesterly and southeasterly MMICs 1870, northeasterly and southwesterly MMICs 1870) can be configured with opposing or aligned e-fields. Consequently, waveguide 1865' can be configured to generate electromagnetic waves with one or more non-fundamental wave modes, electromagnetic waves with one or more fundamental wave modes, or any combinations thereof.

It is submitted that it is not necessary to select slots 1863 in pairs to generate electromagnetic waves having a non-fundamental wave mode. For example, electromagnetic waves having a non-fundamental wave mode can be generated by enabling a single slot from the plurality of slots shown in configuration (A) of FIG. 18I and disabling all other slots. Similarly, a single MMIC 1870 of the MMICs 1870 shown in FIG. 18J can be configured to generate electromagnetic waves having a non-fundamental wave mode while all other MMICs 1870 are not in use or disabled. Likewise other wave modes and wave mode combinations can be induced by enabling other non-null proper subsets of waveguide slots 1863 or the MMICs 1870.

It is further submitted that the e-field arrows shown in FIGS. 18H-18I are illustrative only and represent a static depiction of e-fields. In practice, the electromagnetic waves may have oscillating e-fields, which at one instance in time point outwardly, and at another instance in time point inwardly. For example, in the case of non-fundamental wave modes having e-fields that are aligned in one direction (e.g., northerly), such waves may at another instance in time have e-fields that point in an opposite direction (e.g., southerly). Similarly, fundamental wave modes having e-fields that are radial may at one instance have e-fields that point radially away from the cable 1862 and at another instance in time point radially towards the cable 1862. It is further noted that the embodiments of FIGS. 18H-18J can be adapted to generate electromagnetic waves with one or more non-fundamental wave modes, electromagnetic waves with one or more fundamental wave modes (e.g., TM00 and HE11 modes), or any combinations thereof. It is further noted that such adaptions can be used in combination with any embodiments described in the subject disclosure. It is also noted that the embodiments of FIGS. 18H-18J can be combined (e.g., slots used in combination with MMICs).

It is further noted that in some embodiments, the waveguide systems 1865 and 1865' of FIGS. 18A-18J may generate combinations of fundamental and non-fundamental wave modes where one wave mode is dominant over the other. For example, in one embodiment electromagnetic waves generated by the waveguide systems 1865 and 1865' of FIGS. 18A-18J may have a weak signal component that has a non-fundamental wave mode, and a substantially strong signal component that has a fundamental wave mode. Accordingly, in this embodiment, the electromagnetic waves have a substantially fundamental wave mode. In another embodiment electromagnetic waves generated by the waveguide systems 1865 and 1865' of FIGS. 18A-18J may have a weak signal component that has a fundamental wave mode, and a substantially strong signal component that has a non-fundamental wave mode. Accordingly, in this embodiment, the electromagnetic waves have a substantially non-fundamental wave mode. Further, a non-dominant wave mode may be generated that propagates only trivial distances along the length of the transmission medium.

It is also noted that the waveguide systems 1865 and 1865' of FIGS. 18A-18J can be configured to generate instances of electromagnetic waves that have wave modes that can differ from a resulting wave mode or modes of the combined electromagnetic wave. It is further noted that each MMIC 1870 of the waveguide system 1865' of FIG. 18J can be configured to generate an instance of electromagnetic waves having wave characteristics that differ from the wave characteristics of another instance of electromagnetic waves generated by another MMIC 1870. One MMIC 1870, for example, can generate an instance of an electromagnetic wave having a spatial orientation and a phase, frequency, magnitude, electric field orientation, and/or magnetic field orientation that differs from the spatial orientation and phase, frequency, magnitude, electric field orientation, and/ or magnetic field orientation of a different instance of another electromagnetic wave generated by another MMIC 1870. The waveguide system 1865' can thus be configured to generate instances of electromagnetic waves having different wave and spatial characteristics, which when combined achieve resulting electromagnetic waves having one or more desirable wave modes.

From these illustrations, it is submitted that the waveguide systems 1865 and 1865' of FIGS. 18A-18J can be adapted to generate electromagnetic waves with one or more selectable wave modes. In one embodiment, for example, the waveguide systems 1865 and 1865' can be adapted to select one or more wave modes and generate electromagnetic waves having a single wave mode or multiple wave modes selected and produced from a process of combining instances of electromagnetic waves having one or more configurable wave and spatial characteristics. In an embodiment, for example, parametric information can be stored in a look-up table. Each entry in the look-up table can represent a selectable wave mode. A selectable wave mode can represent a single wave mode, or a combination of wave modes. The combination of wave modes can have one or dominant wave modes. The parametric information can provide configuration information for generating instances of electromagnetic waves for producing resultant electromagnetic waves that have the desired wave mode.

For example, once a wave mode or modes is selected, the parametric information obtained from the look-up table from the entry associated with the selected wave mode(s) can be used to identify which of one or more MMICs 1870 to utilize, and/or their corresponding configurations to achieve electromagnetic waves having the desired wave mode(s). The parametric information may identify the selection of the one or more MMICs 1870 based on the spatial orientations of the MMICs 1870, which may be required for producing electromagnetic waves with the desired wave mode. The parametric information can also provide information to configure each of the one or more MMICs 1870 with a particular phase, frequency, magnitude, electric field orientation, and/or magnetic field orientation which may or may not be the same for each of the selected MMICs 1870. A look-up table with selectable wave modes and corresponding parametric information can be adapted for configuring the slotted waveguide system 1865.

In some embodiments, a guided electromagnetic wave can be considered to have a desired wave mode if the corresponding wave mode propagates non-trivial distances on a transmission medium and has a field strength that is substantially greater in magnitude (e.g., 20 dB higher in magnitude) than other wave modes that may or may not be desirable. Such a desired wave mode or modes can be referred to as dominant wave mode(s) with the other wave modes being referred to as non-dominant wave modes. In a similar fashion, a guided electromagnetic wave that is said to be substantially without the fundamental wave mode has either no fundamental wave mode or a non-dominant fundamental wave mode. A guided electromagnetic wave that is said to be substantially without a non-fundamental wave mode has either no non-fundamental wave mode(s) or only non-dominant non-fundamental wave mode(s). In some embodiments, a guided electromagnetic wave that is said to have only a single wave mode or a selected wave mode may have only one corresponding dominant wave mode.

It is further noted that the embodiments of FIGS. 18H-18J can be applied to other embodiments of the subject disclosure. For example, the embodiments of FIGS. 18H-18J can be used as alternate embodiments to the embodiments depicted in FIGS. 18A-18G or can be combined with the embodiments depicted in FIGS. 18A-18G.

Figure 19A:
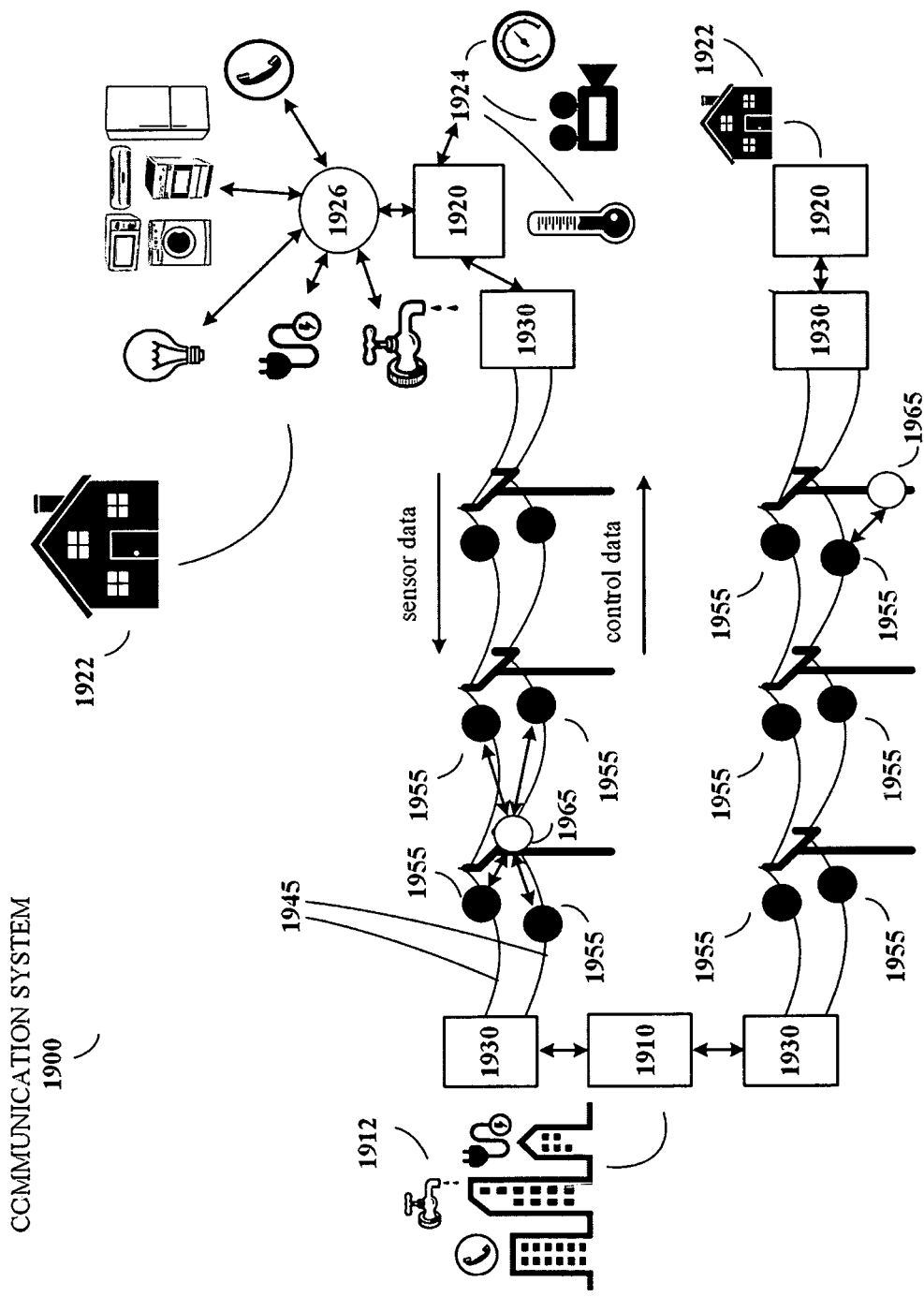
FIG. 19A is an illustration of a communication system in accordance with various aspects described herein.

Referring to FIG. 19A, a communication system 1900 is illustrated in which one or more supervisory entities 1912 communicate bidirectionally with one or more supervised entities 1922 via guided wave communications between corresponding one or more supervisory processing systems 1910 and one or more supervised processing systems 1920. This communication system can enable a supervisory processing system 1910 to collect data from the supervised entities and/or control the supervised entities via the supervised processing system 1920. The supervised processing system 1920 can be coupled to or otherwise communicate bidirectionally via a wired and/or wireless connection with one or more sensor devices 1924 and/or one or more control devices 1926 to facilitate collection of sensor data and/or control of the supervised entity. Each supervisory processing system 1910 and supervised processing system 1920 can be coupled to at least one guided wave transceiver device 1930 to facilitate communication between the supervisor processing systems and supervised processing systems via electromagnetic waves at a physical interface of a transmission medium 1945, where the electromagnetic waves are guided by the transmission medium and propagate without utilizing an electrical return path as discussed previously. The transmission medium 1945 can include, for example, one or more power lines as discussed previously or other transmission media. The guided waves can be routed directly between supervisory processing systems and supervised processing systems, or can be repeated along the transmission path by a plurality of repeater devices 1955, which can be implemented by utilizing repeater 1210 of FIG. 12. In various embodiments, some or all of the repeater devices 1955 can be coupled to additional supervisory processing systems 1910 and/or additional supervised processing systems 1920. The communication system 1900 can further include a plurality of intelligent devices 1965, which can include for example, smart grid devices or other intelligent devices. Intelligent devices 1965 can communicate with one or more neighboring repeaters 1955 and/or supervised processing systems 1920 along the transmission path, and can be physically attached to utility poles that support the transmission medium. In various embodiments, some or all the intelligent devices 1965 are implemented by utilizing additional supervisory processing systems 1910 and/or additional supervised processing systems 1920.

In accordance with one or more embodiments, communication system 1900 is utilized for utilities management, and can include a utilities management system. The utilities management system can include a processing system that includes a processor, such as supervisory processing system 1910; a guided wave transceiver, such as guided wave transceiver 1930, that transmits and receives communications by electromagnetic waves at a physical interface of a transmission medium, such as transmission medium 1945, where the electromagnetic waves are guided by the transmission medium and propagate without utilizing an electrical return path; and a memory, such as memory device 1913 of FIG. 19B, that stores executable instructions that, when executed by the processing system, facilitate performance of operations. The operations include receiving via the guided wave transceiver a plurality of utility status signals from a plurality of utility sensors, such as sensor devices 1924, located at a plurality of supervised sites, such as supervised entities 1922. Utility control data is generated based on the plurality of utility status signals. At least one control signal is generated for transmission via the guided wave transceiver to at least one of the plurality of supervised sites, and the at least one control signal includes at least one utility deployment instruction based on the utility control data.

In various embodiments, the utilities management system is implemented in conjunction with a supervisory control and data acquisition (SCADA) system. In various embodiments, at least one of the plurality of supervised sites is a home, at least one of the plurality of utility sensors located in the home is coupled with a home automation controller, and the at least one utility deployment instruction is executed by the home automation controller, such as control device 1926. In various embodiments, the at least one control signal is sent to the home and includes an instruction to turn off appliances of the home.

In various embodiments, the utility control data is generated by utilizing a supervisory control algorithm based on the plurality of utility status signals to optimize utility consumption across the plurality of supervised sites. In various embodiments of the utilities management system, an emergency notification signal is received via the guided wave transceiver, and generating the utility control data is further based on the emergency notification signal. In various embodiments, the at least one control signal includes an instruction for the supervised site to switch from a primary power source to a secondary power source. In various embodiments, the secondary power source includes a battery and/or a solar panel. In various embodiments, a primary power consumption level is determined based on the plurality of utility status signals. The primary power consumption level is compared to a primary power load threshold, and the instruction to switch from the primary power source to the secondary power source is based on the primary power consumption level comparing unfavorably to the primary power load threshold.

In various embodiments of the utilities management system, a subset of the plurality of utility sensors monitor a power line, and the transmission medium that guides the electromagnetic waves includes the power line. In various embodiments, one of the subset of the plurality of utility sensors is coupled to an intermediate guided wave transceiver. The intermediate guided wave transceiver transmits at least one of the plurality of utility status signals corresponding to the one of the subset of the plurality of utility sensors to the utility management system as a first plurality of electromagnetic waves that are guided by the power line and that propagate without utilizing an electrical return path. The at least one control signal is received by the intermediate guided wave transceiver as a second plurality of electromagnetic waves that are guided by the power line and that propagate without utilizing an electrical return path, and the intermediate guided wave transceiver is a waypoint of a transmission path of the at least one control signal to the at least one of the plurality of supervised sites. The intermediate guided wave transceiver repeats second plurality of electromagnetic waves for transmission along the power line to a next guided wave transceiver of a remainder of the transmission path.

In accordance with one or more embodiments, communication system 1900 is utilized for broadcast communication and includes a broadcast communication system. The broadcast communication system includes a processing system that includes a processor, such as supervisory processing system 1910 or supervised processing system 1920; a guided wave transceiver, such as guided wave transceiver 1930, that transmits and receives communications by electromagnetic waves at a physical interface of a transmission medium 1945, where the electromagnetic waves are guided by the transmission medium and propagate without utilizing an electrical return path; and a memory, such as memory 1913 of FIG. 19B, that stores executable instructions that, when executed by the processing system, facilitate performance of operations. The operations include detecting a first power outage and further include generating a first plurality of electromagnetic waves for transmission to a plurality of user devices of the broadcast communication system via the guided wave transceiver, such as user devices 1970 and/or 1980, supervised entity 1922, and/or control device 1926, where the first plurality of electromagnetic waves include an outage status signal generated in response to detecting the first power outage.

In various embodiments, the broadcast communication system is physically attached to a first one of a plurality of power line phases of a power pole, and the first power outage corresponds to a failure of a second one of the plurality of power line phases of the power pole. In various embodiments, the broadcast communication system further includes a wireless transmitter, as well as a disturbance detection sensor, a loss of energy sensor, and/or a vibration sensor. A second power outage corresponding to a failure of the first one of the plurality of power line phases is detected based on sensor input to the disturbance detection sensor, the loss of energy sensor, and/or the vibration sensor, and a notification of the second power outage is generated for transmission via the wireless transmitter. In various embodiments, the broadcast communication system further includes a wireless transceiver and a power outage notification is received via the wireless transceiver. The first power outage is detected in response to receiving the power outage notification.

In various embodiments, the broadcast communication system further includes a wireless receiver, at least one wireless transmission that includes utility status data from at least one utility provider is received via the wireless receiver, and the outage status signal is generated based on the utility status data. In various embodiments, the broadcast communication system further comprises a wireless transmitter. At least one status request is generated for transmission via the wireless transmitter to the at least one utility provider in response to detecting the first power outage, and the at least one wireless transmission is received in response to the at least one status request.

In various embodiments of the broadcast communication system, a second plurality of electromagnetic waves are received via the guided wave transceiver that includes a power outage notification signal. The first power outage is detected in response to receiving the power outage notification signal. In various embodiments, at least one second plurality of electromagnetic waves are received from at least one utility provider via the guided wave transceiver. The second plurality of electromagnetic waves include utility status data, and the outage status signal is generated based on the utility status data. In various embodiments, at least one third plurality of electromagnetic waves that include a status request signal are generated for transmission via the guided wave transceiver to the at least one utility provider in response to detecting the first power outage, and the at least one second plurality of electromagnetic waves is received in response to the status request signal.

In various embodiments, the outage status signal includes message data for display by a subset of the plurality of user devices. In various embodiments, the message data corresponds to a message from a utility provider. A second plurality of electromagnetic waves are received via the guided wave transceiver that include a message response signal from one of the subset of the plurality of user devices corresponding to user input to the one of the subset of the plurality of user devices. The second plurality of electromagnetic waves are transmitted via the guided wave transceiver to the utility provider. In various embodiments, at least one of the plurality of user devices includes a home automation controller, and the outage status signal includes at least one instruction for execution by the home automation controller. In various embodiments, the broadcast the outage status signal includes at least one electric vehicle charging station location.

In various embodiments, a second plurality of electromagnetic waves are received from a utility provider via the guided wave transceiver that includes planned maintenance data. A third plurality of electromagnetic waves are generated for transmission to the plurality of user devices of the broadcast communication system via the guided wave transceiver, where the third plurality of electromagnetic waves includes the planned maintenance data.

In various embodiments, a first power outage likelihood value is determined. The first power outage likelihood value is compared to a power outage likelihood threshold. A second plurality of electromagnetic waves for transmission to the plurality of user devices of the broadcast communication system via the guided wave transceiver, the second plurality of electromagnetic waves includes power outage warning data, and the second plurality of electromagnetic waves is generated in response to the first power outage likelihood value comparing unfavorably to the power outage likelihood threshold. In various embodiments, the broadcast communication system includes an environmental sensor, and the first power outage likelihood value is based on sensor input to the environmental sensor. In various embodiments, the first power outage likelihood value is determined at a first time, and a second power outage likelihood value is determined at a second time that is later than the first time. The second power outage likelihood value is compared to the power outage likelihood threshold, and a third plurality of electromagnetic waves are generated for transmission to the plurality of user devices of the broadcast communication system via the guided wave transceiver. The third plurality of electromagnetic waves indicate that the power outage warning has passed, and the third plurality of electromagnetic waves is generated in response to the second power outage likelihood value comparing favorably to the power outage likelihood threshold.

In accordance with one or more embodiments, communication system 1900 is utilized for surveillance and can include a surveillance system. The surveillance system includes a processing system that includes a processor, such as supervised processing system 1920; a guided wave transceiver, such as guided wave transceiver 1930, that transmits and receives communications by electromagnetic waves at a physical interface of a transmission medium 1945, where the electromagnetic waves are guided by the transmission medium and propagate without utilizing an electrical return path; at least one sensor device such as sensor device 1924; and a memory, such as memory device 1923 of FIG. 19B, that stores executable instructions that, when executed by the processing system, facilitate performance of operations. The operations include generating surveillance data based on sensor input to the at least one sensor device. A plurality of electromagnetic waves are generated for transmission to an administrator of the surveillance system, such as supervisory entity 1912, via the guided wave transceiver, where the plurality of electromagnetic waves include a surveillance data signal generated based on the surveillance data.

In various embodiments, the surveillance system is physically attached to a power line, and the at least one sensor device monitors a region in proximity to the power line. In various embodiments, the at least one sensor device includes a camera, and where the surveillance data includes image data. In various embodiments, the transmitted surveillance data signal includes video data collected by the camera for viewing by the administrator. In various embodiments, a second plurality of electromagnetic waves are received that include camera control data. The camera is controlled based on the camera control data, and controlling the camera includes orienting the camera, positioning the camera, panning the camera, zooming a lens of the camera, starting a recording by the camera, and/or stopping a recording by the camera.

In various embodiments of the surveillance system where the surveillance data signal is transmitted to an administrator system, a processor of the administrator system performs analysis of surveillance data of the surveillance data signal to detect suspicious activity. In various embodiments, generating the surveillance data includes detecting suspicious activity, and where the surveillance data signal includes a notification of the suspicious activity.

In various embodiments, the surveillance system further includes a speaker. The speaker is controlled to sound an alarm in response to detecting the suspicious activity. In various embodiments where the at least one sensor device includes a camera, the camera is activated to begin capturing image data in response to detecting the suspicious activity. In various embodiments where the surveillance data includes image data, the suspicious activity is detected based on image analysis of the image data. In various embodiments, the image analysis includes at least one of: motion detection or facial detection. In various embodiments, the surveillance system further includes a lighting device. The lighting device is activated in response to detecting the suspicious activity. An orientation of the lighting device is controlled to track the detected motion and/or the detected face. In various embodiments, the camera is controlled based on the motion detection and/or the facial detection to track motion and/or a face. Controlling the camera includes orienting the camera towards the motion, orienting the camera towards the face, zooming in on the motion, and/or zooming in on the face.

In various embodiments of the surveillance system, a notification of the suspicious activity is transmitted to a law enforcement entity in response to detecting the suspicious activity. The notification of the suspicious activity is transmitted as electromagnetic waves that are guided by the transmission medium that and propagate without utilizing an electrical return path. In various embodiments, the at least one sensor device includes a disturbance detection sensor, a loss of energy sensor, and/or a vibration sensor, and the suspicious activity is detected based on surveillance data generated based on sensor input to the disturbance detection sensor, the loss of energy sensor, and/or the vibration sensor.

In accordance with one or more embodiments, communication system 1900 includes a guided wave repeater system, which can be implemented by utilizing repeater 1955 and/or supervised processing system 1920. The guided wave repeater system includes a processing system that includes a processor, such as supervised processing system 1920; a guided wave transceiver, such as guided wave transceiver 1930, that transmits and receives communications by electromagnetic waves at a physical interface of a transmission medium, where the electromagnetic waves are guided by the transmission medium 1945 and propagate without utilizing an electrical return; and a memory, such as memory device 1923 of FIG. 19B, that stores executable instructions that, when executed by the processing system, facilitate performance of operations. The operations include receiving via the guided wave transceiver a first plurality of electromagnetic waves that include a first communication signal. A second plurality of electromagnetic waves that include a second communication signal are transmitted via the guided wave transceiver. The first plurality of electromagnetic waves and the second plurality of electromagnetic waves are guided by a power line of a utility pole. A third communication signal is received from a smart grid device, such as intelligent device 1965. A fourth communication signal is transmitted to the smart grid device.

In various embodiments of the guided wave repeater system, the smart grid device is physically attached to the utility pole. In various embodiments, the smart grid device is powered by the power line. In various embodiments, the guided wave repeater system further includes a wireless transceiver. The third communication signal is a wireless communication signal received by the wireless transceiver, and the fourth communication signal is a wireless communication signal transmitted by the wireless transceiver. In various embodiments, the third communication signal and the fourth communication signal are received and transmitted, respectively, via an access line of sight radio link protocol. In various embodiments, the guided wave repeater system further includes a wired interface. The third communication signal is received from the smart grid device via the wired interface, and the fourth communication signal is transmitted to the smart grid device via the wired interface.

In various embodiments of the guided wave repeater system, the third communication signal is received as a third plurality of electromagnetic waves via the guided wave transceiver, and the fourth communication signal is received as a fourth plurality of electromagnetic waves via the guided wave transceiver. In various embodiments, the third communication signal is received as a third plurality of electromagnetic waves via a second guided wave transceiver, and where the fourth communication signal is received as a fourth plurality of electromagnetic waves via the second guided wave transceiver.

In various embodiments of the guided wave repeater system, the third communication signal includes supervisory control and data acquisition (SCADA) data. The third communication signal is transformed to generate the second plurality of electromagnetic waves for transmission, where the second communication signal includes the SCADA data. In various embodiments, the first communication signal includes supervisory control and data acquisition (SCADA) data. The first plurality of electromagnetic waves are transformed to generate the fourth communication signal for transmission to the smart grid device, where the fourth communication signal includes the SCADA data.

In various embodiments, the guided wave repeater system includes a wired interface and the first plurality of electromagnetic waves are transformed to generate a fifth communication signal that includes data of the first communication signal. The fifth communication signal is transmitted to a second guided wave repeater system via the wired interface. A sixth communication signal is received from the second guided wave repeater system via the wired interface. The sixth communication signal is transformed to generate the second plurality of electromagnetic waves, where the second plurality of electromagnetic waves include data of the sixth communication signal. In various embodiments where the guided wave repeater system is physically attached to the power line, the power line corresponds to a first phase on a first side of the utility pole. The second guided wave repeater system is physically attached to the first phase on an opposite side of the utility pole.

In various embodiments, the communication system 1900 can be implemented by utilizing the guided wave communication system 1500 of FIG. 15. The supervisory entities 1912 can include central office 1501, and/or can communicate with central office 1501 via wireless, wired, and/or surface wave communication links. The supervised entities 1922 can include residential and commercial establishments 1542. The supervisory processing system and/or supervised processing system can be implemented by utilizing one or more base station devices 1504 and/or the guided wave transceiver can be implemented by utilizing the transmission device 1506, 1508, and/or 1510. In various embodiments, the intelligent device 1965 can be implemented by utilizing one or more base station devices 1504. The repeaters 1955 can also be implemented by utilizing the transmission device 1506, 1508, and/or 1510.

In various embodiments, the communication system 1900 can be implemented by utilizing the power grid communication system of FIG. 16, utilizing the waveguide system 1602. The transmission medium can include power line 1610, and the supervised entities can include elements of the waveguide system, monitoring regions in proximity to the power line and/or the power line itself. Sensor devices 1924 can include sensors 1604 of FIG. 16, such as temperature sensor 1604a, disturbance detection sensor 1604b, loss of energy sensor 1604c, noise sensor 1604d, vibration sensor 1604e, environmental (e.g., weather) sensor 1604f, image sensor 1604g. and/or other sensors.

In various embodiments, bidirectional communication can be achieved via a single transmission medium 1945, for example, where a supervised entity and supervisory entity communicate via time division or frequency division duplexing, and where the repeaters 1955 repeat guided waves received from both directions along the transmission medium. In various embodiments, the bidirectional communication can be achieved via multiple transmission mediums 1945, for example, via multiple phases of a power line system as shown in FIG. 19A, where communication in one direction is achieved via a first power line phase, and where communication in the opposite direction is achieved via a second power line phase. In various embodiments, the guided wave transceiver 1930 can include a guided wave transmitter that transmits guided waves along a first phase and a guided wave receiver that receives guided waves along a second phase, for example, by utilizing transmission devices 101 and 102 of FIG. 1.

In various embodiments, communication system 1900 can be utilized to implement a supervisory control and data acquisition (SCADA) system, for example, to monitor and control utility distribution and/or elements of a smart grid infrastructure. For example, the communication system 1900 can bridge the communications gap in smart grid technologies between SCADA focal points within the substations and smart meters in the home. The supervisory entities 1912 can include utility providers such as electricity providers, gas providers, water providers, telephone providers, cellular providers, cable providers, and/or internet providers, and the supervisory processing system 1910 can operate as a utilities management system. The supervised entities 1922 can include users of the utilities, residential and/or commercial entities, infrastructure entities, transportation vehicles and/or entities, and/or utility production and/or distribution centers, channels, devices and/or equipment.

Figure 19B:
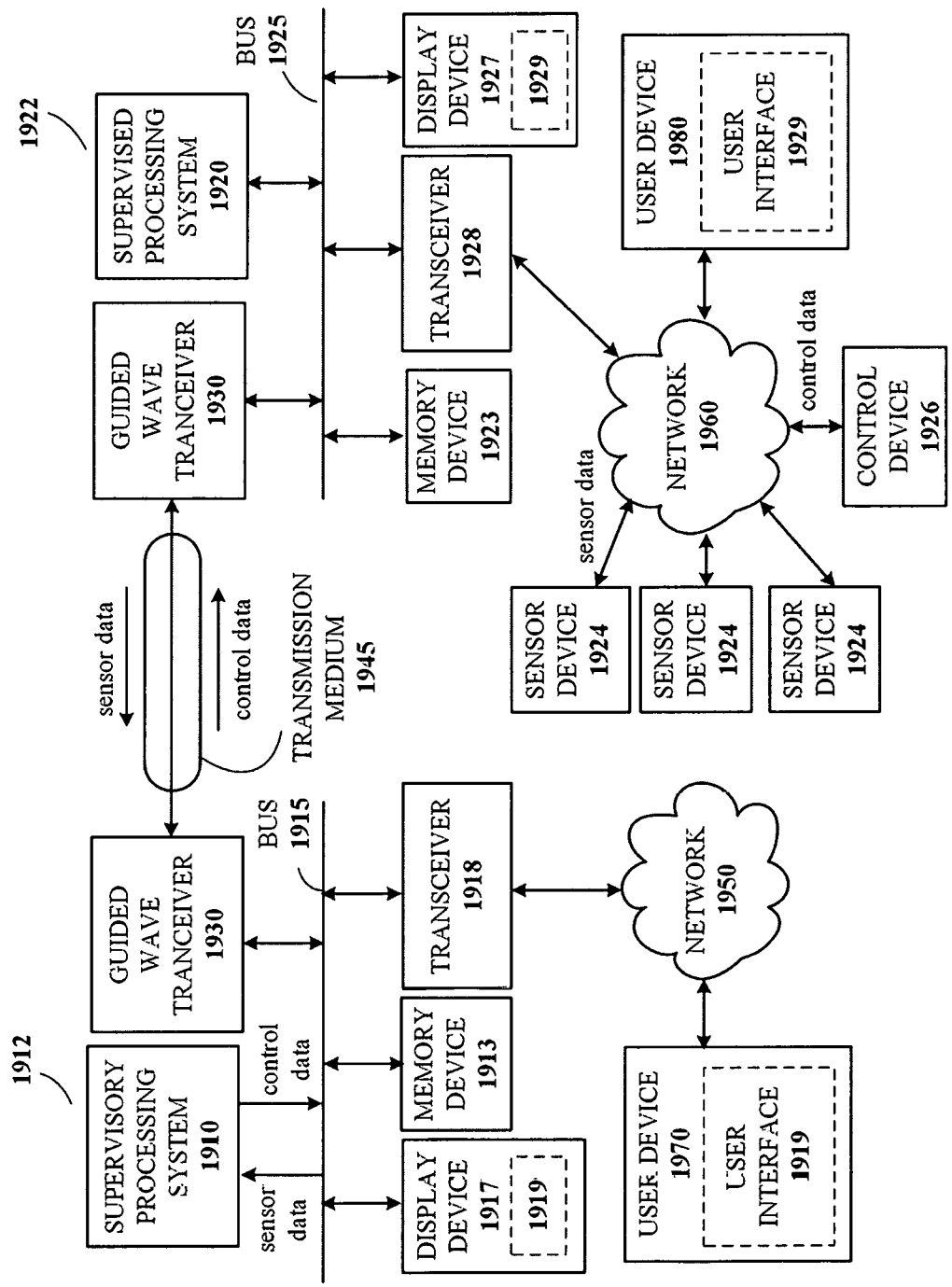
FIG. 19B is a block diagram illustrating a communication system in accordance with various aspects described herein.

FIG. 19B illustrates a block diagram of communication system 1900. In various embodiments, supervised processing system 1920 is operable to collect raw or processed status and/or sensor data from the at least one sensor device 1924 for transmission to supervisory processing system as guided wave communications via transmission medium 1945. Supervisory processing system 1910 is operable to process the status and/or sensor data received from supervised processing systems 1920 via guided wave communications to generate control data for transmission back to the supervised processing systems via guided wave communication. Supervised processing system 1920 is operable to facilitate execution of control data received from the supervisory processing system via guided wave communication by utilizing control device 1926.

In various embodiments, the supervisory processing system 1910 of supervisory entity 1912 can be coupled to least one guided wave transceiver device 1930 and at least one memory device 1913 that includes a memory, connected via bus 1915. In various embodiments, supervisory processing system 1910 is further coupled to at least one additional transceiver 1918, which can connect to additional devices such as user device 1970 and/or connect to a wired and/or wireless network 1950, which can include, a network associated with the supervisory entity and/or the Internet. In various embodiments, supervisory processing system 1910 can display a user interface 1919 on at least one display device 1917, allowing users such as administrators of a utility provider and/or administrators of communication system 1900 to monitor, direct, and/or override the supervisory processing system. Display device 1917 can be connected via bus 1915, or the at least one transceiver 1918 can be utilized to bidirectionally communicate with an external device such as user device 1970 that includes the display device 1917, for example, via network 1950. In various embodiments, the processing of status and/or sensor data, and/or the generation of the control data, is achieved on an external device such an external server and/or user device 1970, and the supervisory processing system 1910 merely receives and relays sensor collection data to the external processor via the at least one additional transceiver 1918 and/or receives control data from the external processor via the at least one additional transceiver for transmission back to the monitored entities via guided wave communication.

In various embodiments, supervised processing system 1920 is coupled to at least one guided wave transceiver device 1930 and at least one memory device 1923 that includes a memory, connected via bus 1925. In various embodiments, supervised processing system 1920 is coupled to at least one additional transceiver 1928, which can connect to additional devices such as user device 1980 and/or connect to a wired and/or wireless network 1960, which can include, a network associated with the supervised entity, for example, a residential network, and/or the Internet. In various embodiments, network 1960 includes network 1950 or vice versa. In various embodiments, supervised processing system 1920 is coupled to at least one sensor device 1924 and/or at least one control device 1926. Sensor device 1924 and/or control device 1926 can be connected via bus 1925, or the at least one transceiver 1928 can be utilized to bidirectionally communicate with sensor device 1924 and/or control device 1926, for example, via network 1960. In various embodiments, supervised processing system 1920 can communicate with a display device 1927 that displays a user interface 1929 allowing users associated with the supervised entity 1922 to monitor, direct, and/or override the supervised processing system. Display device 1927 can be connected via bus 1925, or the at least one transceiver 1928 can be utilized to bidirectionally communicate with an external device such as user device 1980 that includes the display device 1927, for example, via network 1960.

In various embodiments, the guided wave transceiver device 1930 of the supervisory processing system 1910 and/or the supervised processing system 1920 can be implemented, for example, by utilizing the transmission device 101 and/or 102 of FIG. 1, to facilitate bidirectional communication with the one or more supervisory processing systems 1910 via electromagnetic waves at a physical interface of a transmission medium, where the electromagnetic waves are guided by the transmission medium and propagate without utilizing an electrical return path as discussed previously. In particular, received electromagnetic waves can be converted to communications signals upon receipt by utilizing interface 205 and transceiver 210 of transmission device 102. Transmission device 101 can be utilized to convert communications signals into electromagnetic waves via interface 205 and transceiver 210 for transmission.

In various embodiments, the sensor devices 1924 can include sensors 1604 of FIG. 16 as discussed previously or any other sensors used to monitor the supervised entity. This can include, for example, temperature sensors, pressure sensors, Global Positioning System (GPS) sensors, gyroscopes, accelerometers, sensors measuring flow or fluid velocity, voltmeters, ammeters, chemical sensors, cameras, biometric sensors, infrared sensors, vibration sensors, and/or tactile sensors. Sensor devices 1924 can be directed towards monitoring equipment, for example, monitoring equipment health, efficiency, whether the equipment is operating under normal or extreme settings, etc. Sensors devices 1924 can be located at utility production and/or distribution centers and/or channels to gather data relating to status, utility consumption rate and/or production rate; and/or sensors at residential and/or commercial entities relating to utility status and/or consumption, which can include smart device sensor data, smart appliance sensor data, home automation sensor data, and/or sensor data received by personal devices such as mobile phones, personal computers, smart phones, and/or wearable technology. Sensor devices can also monitor human activity at the supervised entities, for example, by utilizing data collected by mobile devices, computers, laptops, surveillance systems, and/or wearable devices. For example, such data could include biometric data, location data, keyboard or touchscreen input, text data, voice data, and/or mobile application data. The supervised entity can also include transportation infrastructure and/or vehicles, and accordingly the sensor devices can also monitor personal vehicles, commercial vehicles, or public transportation vehicles and can be included in the vehicles themselves, for example, transmitting vehicle speed data, navigation data, location data, fuel data, etc. and/or located along transportation infrastructure such as roads, highways, railroads, subway lines, airports, etc. transmitting traffic data, collision data, status data, etc. The sensor data can also include information gathered via a network such as the Internet and/or via radio broadcasts, and can include weather data, emergency data, demographic data, social media data, text analysis of websites, messaging services data, news articles, etc. For example, this data could be used to detect extreme and/or emergency conditions, reported emergencies or utility outages, etc. In various embodiments, some or all of the sensor data is collected by the supervisory processing system directly without utilizing guided wave communications from a supervised processing system, for example, via the at least one additional transceiver 1918, which can include data collected from additional sensors and/or data collected via network 1950. Each sensor device 1924 can include its own processor, memory, and/or transceiver, operable to send raw and/or preprocessed data to the supervised processing system.

In various embodiments, the control devices 1926 can include automated controllers at utility production and/or distribution centers and/or controllers at residential or commercial entities such as home automation controllers. The control device 1926 can also include any intelligent controller that can control one or more devices, mechanical processes, and/or electrical processes associated with one or more homes, offices, buildings, commercial establishments, outdoor establishments, cars or other transportation vehicles, factories or plants, etc. For example, the control device could be utilized by an intelligent system and/or automated controller associated with the supervised entity, such as a home automation controller. In various embodiments, the control device includes its own processor, memory, and/or transceiver to process and execute control data received from the supervised processing system. In various embodiments, the control devices utilize one or more processors of supervised processing system 1920 itself to process and execute the control data.

In various embodiments, the at least one additional transceiver 1918 and/or 1928 can include a communications interface such as a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth protocol, ZigBee protocol, a direct broadcast satellite (DBS) or other satellite communication protocols or other wireless protocols. In addition or in the alternative, the transceiver can include a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocols. In additional to standards-based protocols, the transceiver can operate in conjunction with other wired or wireless protocols. In addition, additional transceiver 1918 and/or 1928 can optionally operate in conjunction with a protocol stack that includes multiple protocol layers including a MAC protocol, transport protocol, application protocol, etc. In various embodiments, additional transceiver 1918 and/or 1928 can be implemented by utilizing communications interface 205 of FIG. 1. In various embodiments, the at least one additional transceiver 1918 and/or 1928 can facilitate a connection to one or more devices, such as home devices, appliances, sensors such as sensor devices 1924, control devices such as control devices 1926, display devices, and/or user devices. In various embodiments, the at least one additional transceiver can facilitate a connection to a wired or wireless network, such as a home network, a network associated with the supervised entity, a network associated with the supervisory entity, and/or the Internet.

In various embodiments, display device 1917 and/or 1927 can include a screen or monitor, and a user can interact with user interface 1919 and/or 1929 respectively via a keyboard, touchscreen, text, voice, buttons, knobs, switches, a mouse, and/or other input mechanisms. In various embodiments, user device 1970 and/or 1980 can include a personal computer, laptop, monitor, mobile device, television, set top box, wearable device, and/or other device associated with a user. The user can interact with the user interface via user input to the user device. In various embodiments, a user can interact with the user interface 1919 and/or 1929 to monitor, direct, and/or override the supervisory processing system or supervised processing system, respectively. In various embodiments, a user can interact with the user interface 1919 and/or 1929 to set user preferences, for example, stored by user account of the system, for example, in memory 1913 or memory 1923. Users of user interface 1919 and/or 1929 can include, for example, residents a supervised residential entity, employees of a supervised commercial entity, employees of a utility provider, administrators of a utility provider, service or maintenance personnel of the communication system 1900, and/or administrators of the communication system 1900.

FIG. 19C-FIG. 19H illustrate embodiments of the communication system 1900 that include guided wave repeater systems. In various embodiments, the guided wave repeater systems can be implemented by utilizing repeater 1955. In various embodiments, some or all of the supervised processing systems 1920 operate as guided wave repeater systems. In various embodiments, such supervised processing systems 1920 are coupled to repeater devices 1955 or are otherwise operable to repeat guided wave transmissions. In various embodiments, these guided wave repeater systems correspond to supervised entities 1922 that include monitoring and/or control of the transmission medium itself, or the area in proximity to the transmission medium. For example, a supervisory entity 1912 that includes a power provider or smart grid infrastructure administrating entity may wish to monitor utility poles and/or one or more power line phases. In various embodiments, some or all supervised processing systems 1920 are physically attached to the power line or utility pole, for example allowing a direct connection to the power line by its guided wave transceiver 1930. In various embodiments, the supervised processing system 1920 can be implemented as a guided wave repeater system by utilizing the transmission device 1506, 1508, or 1510 of FIG. 15 in this fashion. Communications received from a supervisory processing system can be processed and/or executed, as well as forwarded along to a neighboring supervised processing system for processing, execution, and/or continued repeating down the transmission path via a plurality of subsequent repeaters 1955 and/or supervised processing systems 1920 operating in conjunction with guided wave repeater systems. In various embodiments, the repeaters and/or supervised processing system can be also be powered by the power line.

In various embodiments, such as the embodiment illustrated in FIG. 19C, the guided wave transmission medium 1945 is uninterrupted between neighboring supervised processing systems. In various embodiments, a repeater 1955 and/or a supervised processing system 1920 operating in conjunction with a guided wave repeater system can be coupled to two guided wave transceivers 1930, where the first guided wave transceiver can receive communication along a power line phase from one side to be repeated as a transmission via the second guided wave transceiver along the power line phase. In various embodiments, such as the embodiment illustrated in FIG. 19D, the transmission medium 1945 is interrupted by interruption 1967. For example, two repeaters 1955 and/or two supervised processing systems 1920 are on opposite sides of a utility pole, and the guided wave communication between the two units is interrupted when crossing the utility pole. Communication between the two units can instead be achieved via a wired and/or wireless connection, for example, by utilizing transceiver 1928. While network 1960 can be utilized in this fashion, the close proximity of the two repeaters 1955 and/or two supervised processing systems 1920 can be utilized by implementing a direct wired and/or wireless communication link 1966, for example, a wired communication cable and/or a short range wireless connection such as an access line of sight radio link connection, Bluetooth, ZigBee, and/or other short range communication link. In various embodiments, communication link 1966 can include another guided wave cable such as transmission media 2400, 2420 and/or 2430 described in conjunction with in FIG. 24A-FIG. 24C.

Figure 19D:
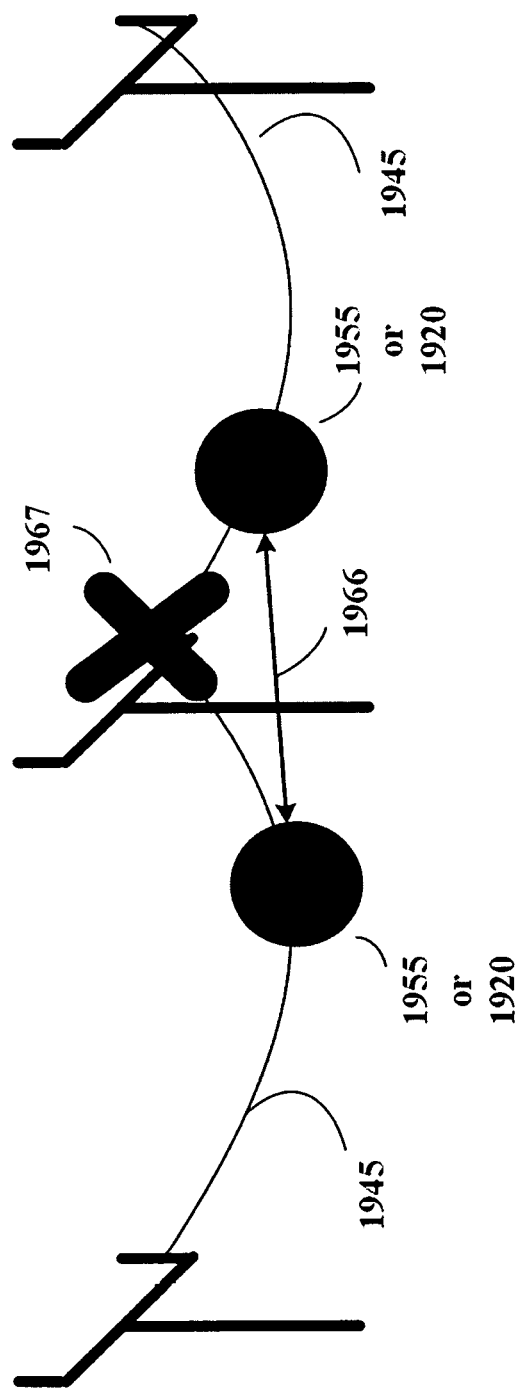
Figure 19E:
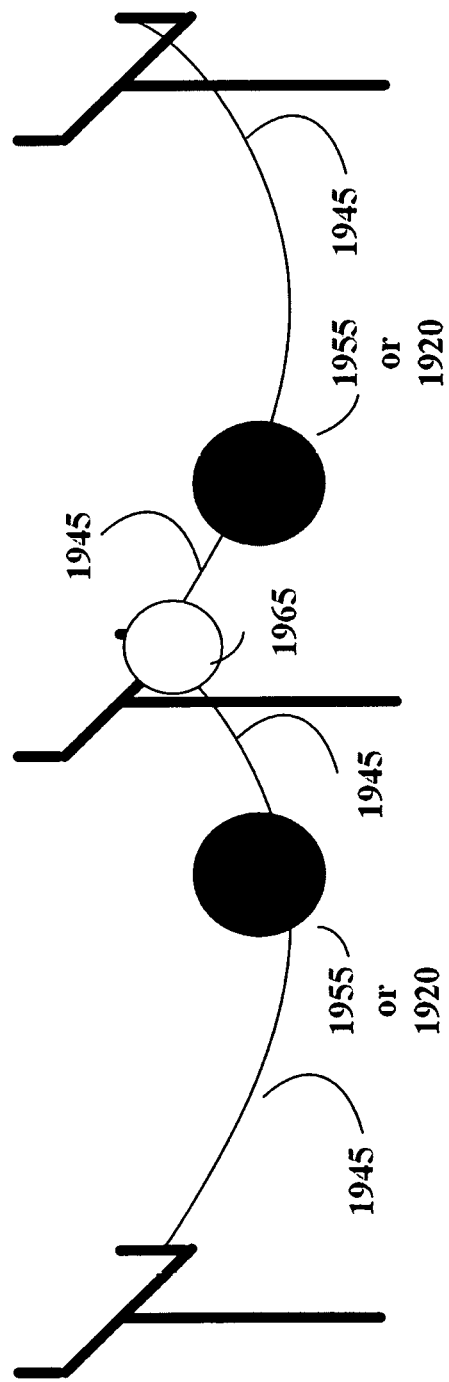
Figure 19F:
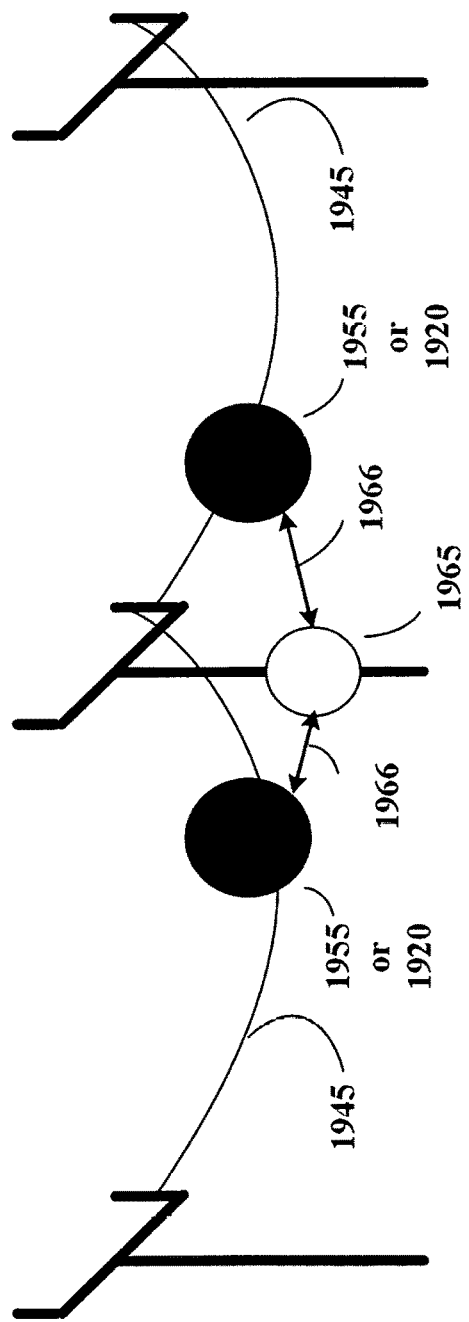

In various embodiments, a utility pole can include an intelligent device 1965 such as a smart grid device or other device that can, for example, process data, receive and transmit communications over a wired and/or wireless network, and/or execute commands. In various embodiments, the intelligent device can be powered via power lines of the utility pole. In various embodiments, the intelligent device can be implemented utilizing the base station device 1504 of FIG. 15. In various embodiments, the intelligent device 1965 includes one or more guided wave transceivers 1930 and in various embodiments, can be implemented by utilizing a supervisory processing system 1910 and/or supervised processing system 1920. In various embodiments, such as the embodiment illustrated in FIG. 19E, intelligent device 1965 can receive and transmit communications via the power line on opposite sides of the utility pole. In various embodiments where the two repeaters 1955 and/or two supervised processing systems operating in conjunction with guided wave repeater systems are attached on either side of the utility pole, the intelligent device can facilitate the connection between them via the power line or another transmission medium for the guided wave communications. In various embodiments, such as the embodiment illustrated in FIG. 19F, the intelligent device can facilitate the connection between them instead via the short range wired or wireless communication link 1966. In this fashion the intelligent device can be implemented by utilizing the supervisory processing system 1910 and/or supervised processing system 1920, communicating with guided wave transceivers 1930 via the short range link to the two repeaters 1955 and/or two supervised processing systems 1920. In various embodiments, the intelligent device can collect the data received via one or both repeaters 1955 or one or both supervised processing systems 1920 for processing, as well as forward it along the transmission path. In various embodiments, the intelligent device can also transmit its own data to the one or both repeaters 1955 and/or supervised processing systems 1920 for processing and/or repeated transmission along the transmission path. In various embodiments, the intelligent device may be part of an unrelated system, and is merely utilized as a repeater. In various embodiments, the intelligent device causes the interruption 1967, and the short range link between the two repeaters 1955 or two supervised processing systems 1920 can be implemented utilizing a wired connection such as communication link 1966 that circumvents the intelligent device, such as depicted in FIG. 19D.

Figure 19G:
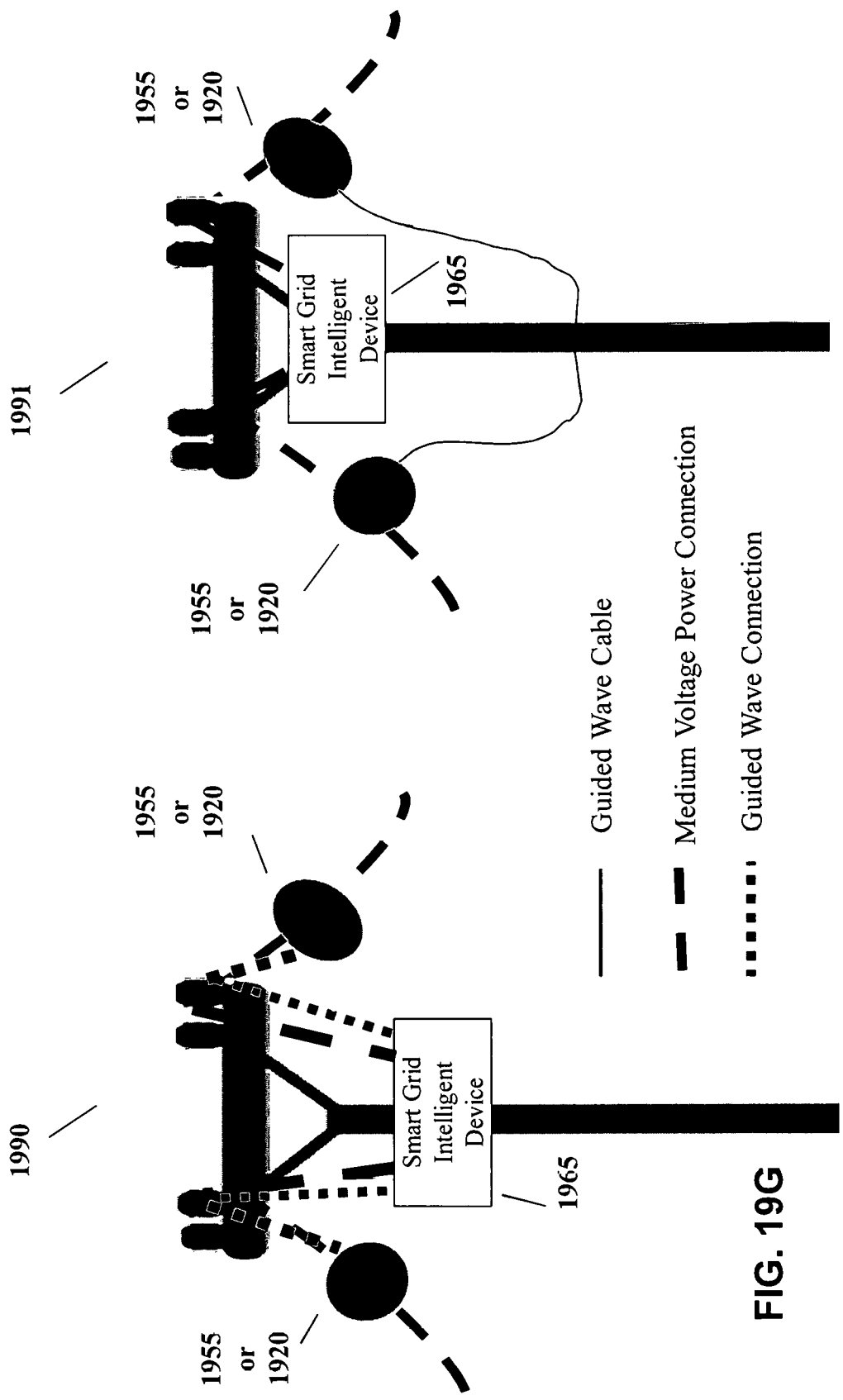
Figure 19H:
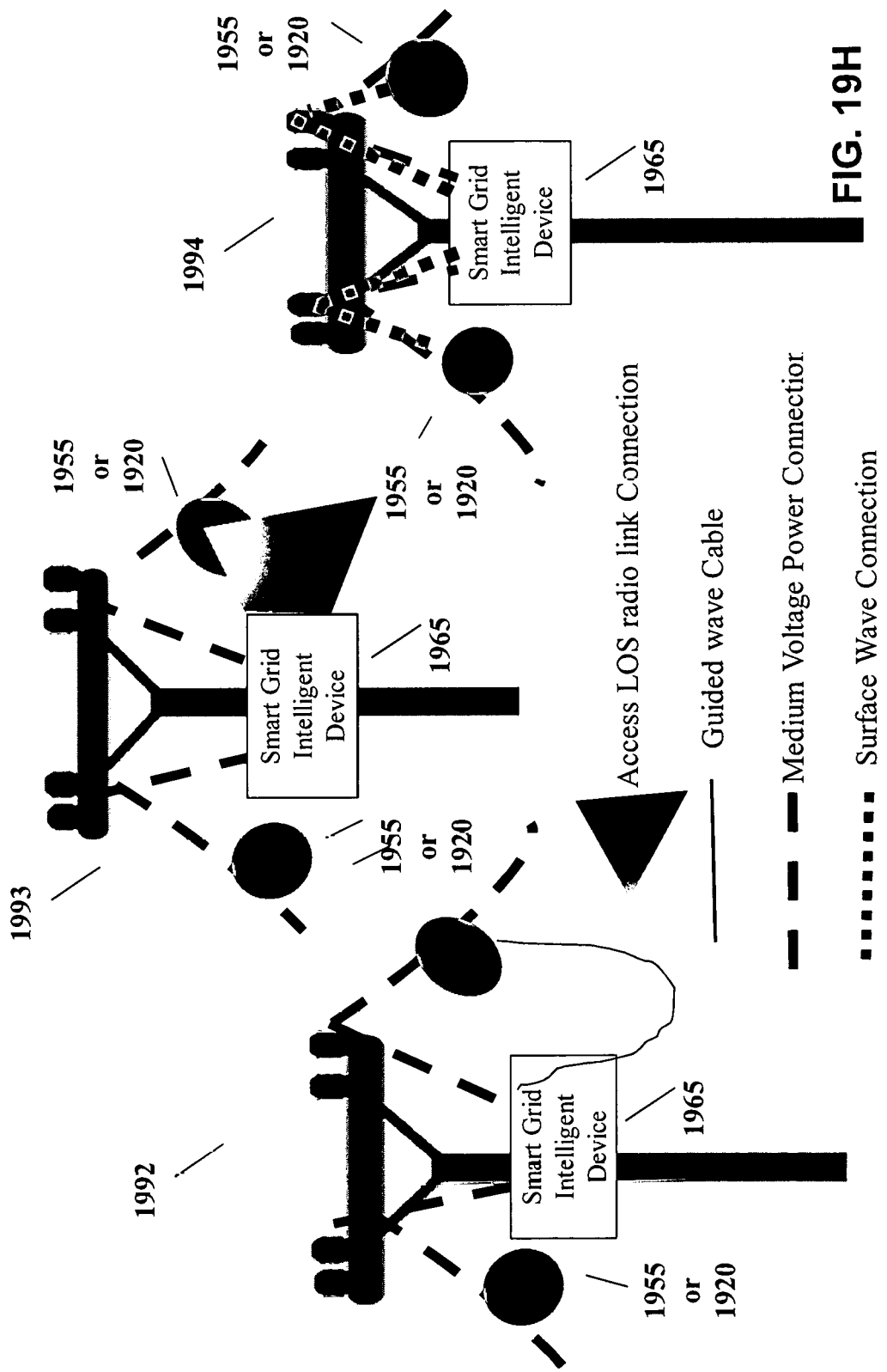

FIG. 19G and FIG. 19H further illustrate example utility pole configurations in conjunction with the discussion of FIG. 19C-FIG. 19F. FIG. 19G illustrates two methods of communication between neighboring repeaters 1955 and/or supervised processing systems 1920, and a first utility pole configuration 1990 and a second utility pole configuration 1991 are presented. In configuration 1990, communication is achieved by communicating through the intelligent device 1965. Repeaters 1955 and/or supervised processing systems 1920 are connected via a medium voltage power connection, and communicate via guided surface waves through intelligent device 1965 via a physical interface for integrating a low loss mode surface wave launcher such as guided wave transceiver 1930, emphasizing aperture methodologies with circuit parameter considerations. Configuration 1990 can be implemented, for example, by utilizing the configuration of FIG. 19E. In configuration 1991, communication is achieved by communicating around the intelligent device. Repeaters 1955 and/or supervised processing systems 1920 still receive the a medium voltage power connection, but repeaters 1955 and/or supervised processing system 1920 communicate via a direct link by utilizing a guided wave cable, such as transmission medium 2400, 2420 and/or 2430 of FIG. 24A-24C. Configuration 1991 can be implemented, for example, by utilizing the configuration of FIG. 19D.

FIG. 19H illustrates three methods of communication between an intelligent device 1965 and a repeater 1955 and/or supervised processing system 1920, and a third utility pole configuration 1992, and a fourth utility pole configuration 1993, and a fifth utility pole configuration 1994 are presented. In configuration 1992, the repeaters 1955 and/or supervised processing system 1920 communicate with the intelligent device 1965 via a direct link by utilizing a guided wave cable, such as transmission medium 2400, 2420, and/or 2430 of FIG. 24A-24C. In configuration 1993, the repeaters 1955 and/or supervised processing system 1920 communicate with the intelligent device 1965 via a direct link by utilizing a standard access radio link. Configurations 1992 and 1993 can be implemented, for example, by utilizing the configuration of FIG. 19F. In configuration 1994, the repeaters 1955 and/or supervised processing system 1920 communicate with the intelligent device 1965 via an integrated physical interface for integrating a low loss mode surface wave launcher such as guided wave transceiver 1930, emphasizing aperture methodologies with circuit parameter considerations. Configuration 1994 can be implemented, for example, by utilizing the configuration of FIG. 19E.

Figure 19I:
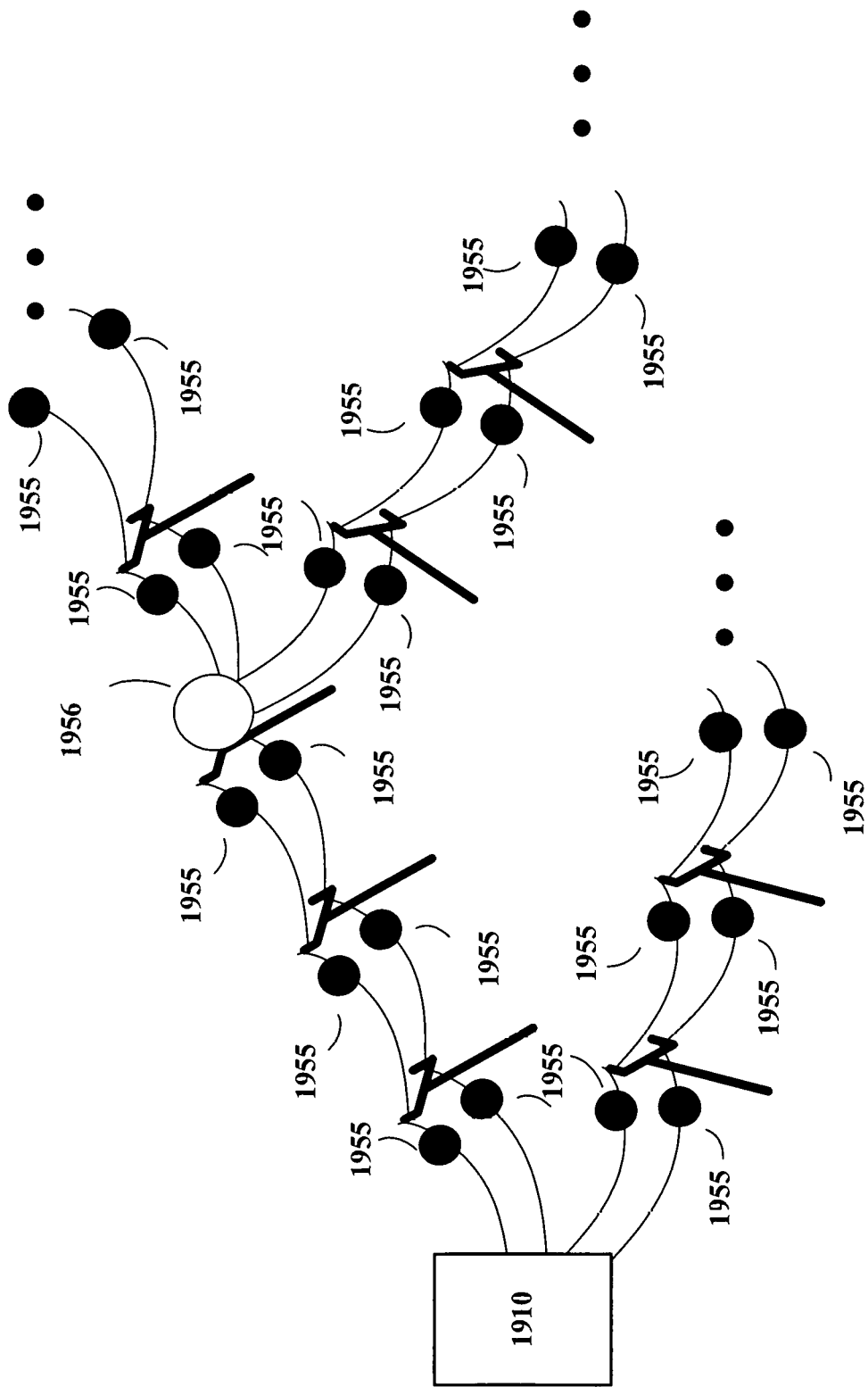

FIG. 19I is an illustration of an embodiment of communication system 1900. In various embodiments, a network of power lines is a complex network with various branches and forks. In various embodiments, a repeater 1956 can repeat an incoming guided wave communication to two or more guided wave transmission branches. For example, repeater 1956 can include three or more guided wave transceivers 1930 to handle three or more transmission medium branches. In various embodiments, the communication system 1900 includes a plurality of multi-way repeaters 1956 to facilitate communication across a vast network of guided wave transmission mediums, such as a power line network or smart grid network. In various embodiments, the multi-way repeater 1956 can be implemented by utilizing one or more repeaters 1955 and/or one or more transmission devices 1506, 1508, and 1510 of FIG. 15. In various embodiments, the multi-way repeater 1956 can be implemented by utilizing a supervised processing system 1920 or supervisory processing system operating 1910 in conjunction with a guided wave repeater system, coupled to a plurality of guided wave transceivers corresponding to the number of guided wave transmission medium branches. In various embodiments a processor of the multi-way repeater 1956 such as the supervised processing system or supervisory processing system can choose to route incoming communications to a subset of branches, for example, based on an indicated destination of the transmission. In various embodiments, the multi-way repeater 1956 can include a memory such as memory 1913 or 1923 that can, for example store a map of the guided wave network or other instructions for routing communications given destination and/or routing information included in the communication signal. A processor of the multi-way repeater can use this information to select a subset of branches, or in some instances select no branches, to route the transmission. In various embodiments, conventional network communication strategies can be utilized to route guided wave communications in communication system 1900.

Figure 19J:
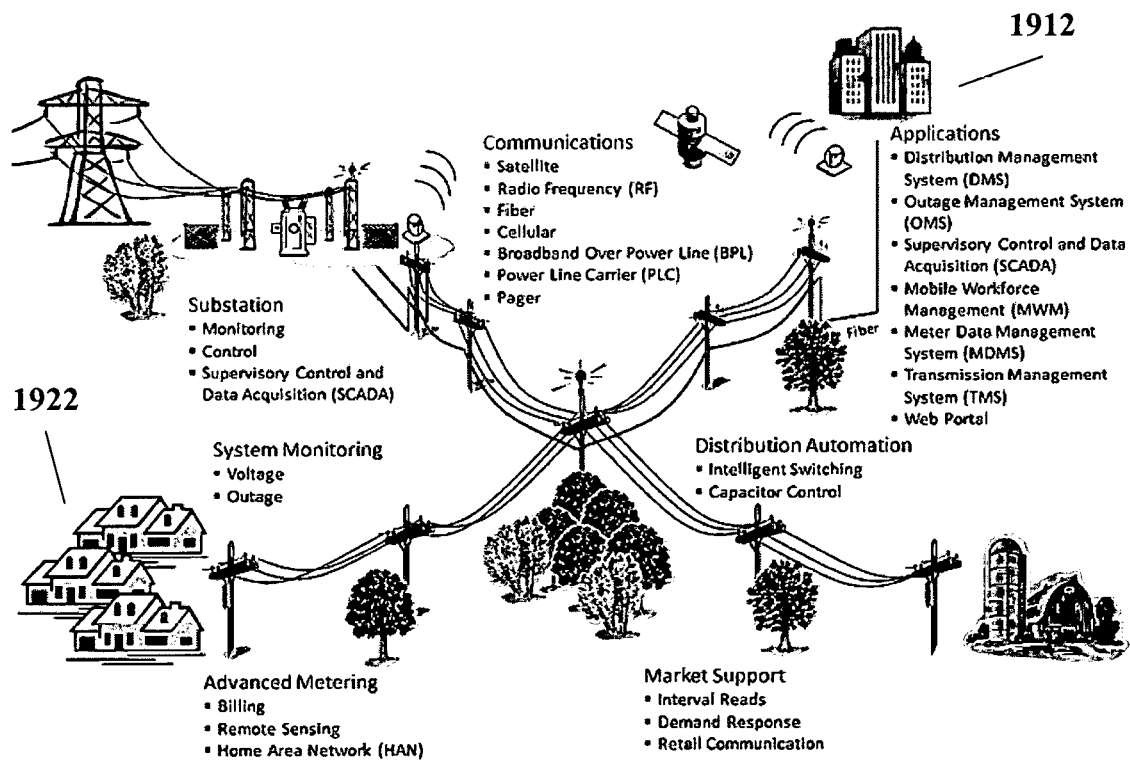
FIGS. 19J and 19K are illustrations of example non-limiting embodiments of implemented in conjunction with utilities management in accordance with various aspects described herein.
Figure 19K:
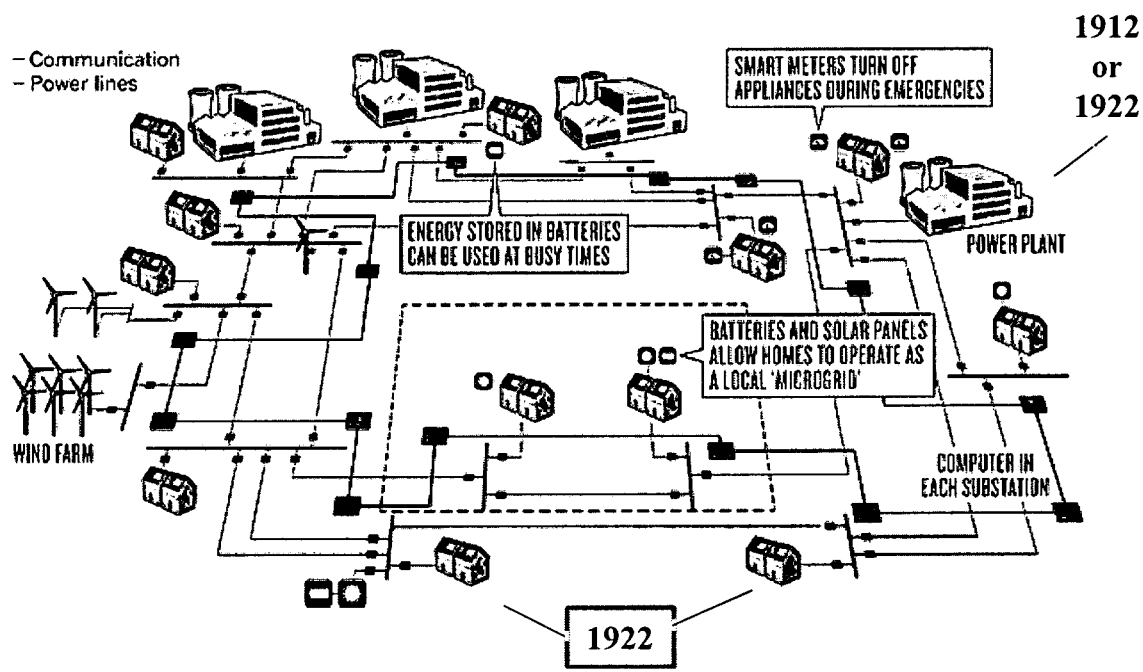

FIG. 19J and FIG. 19K illustrate example embodiments of the communication system 1900 utilized in conjunction with utilities management. A SCADA system can be implemented to facilitate bidirectional communication between supervised entities 1922 and supervisory entities 1912 via guided wave communications across power lines. A SCADA system can be implemented in a smart grid network, facilitating communication between homes and power providers, enabling communication with smart devices to control home energy usage, and also enabling control and communication with of a plurality of power sources, including traditional power lines, batteries, and power from renewable resources such as wind farms and solar cells.

In various embodiments, the supervisory processing system can be utilized as a utilities management system associated with a particular utility provider, or can manage a plurality of utilities provided by a plurality of utility providers. In an example embodiment, the supervisory processing system can receive sensor and/or status data relating to energy consumption by residential and/or commercial entities 1922 such as data from smart devices or smart appliances, load stability, equipment status, power outages, status of secondary power sources and/or equipment such as batteries, solar cells, and/or wind turbines. The supervisory processing system can process and respond to the sensor and/or status data to generate control data for transmission to some or all of the monitored entities. For example, the supervisory processing system can send instructions to an automated home controller to turn off some or all smart appliances in response to a power surge, control a portion of a power grid to switch to a backup battery source in response to high or busy consumption of the primary power source, in response to a power outage, and/or in response to an emergency. As another example, the supervisory processing system can utilize an optimization algorithm to determine optimal power distribution for load stability, and generate control data directed to the power distribution to various entities accordingly.

As another example, a supervisory processing system operating in conjunction with a utilities management system could respond to water availability data, water toxicity data, weather data, and/or water consumption data to control water distribution to residential and commercial entities. For example, the water management system could use this data to determine that drought conditions exist, that water availability is low, that there is a major water contamination problem, and/or that there is a major malfunction at a water treatment plant. The water management system can generate control data in response, for example, limiting water distribution and/or instructing home automation controllers to limit and/or cut off water usage by an entire residential or commercial entity, or individually controlling taps, showers, sprinklers, dishwashing appliances, washing machine appliances, etc.

As another example, a supervisory processing system implemented as a utilities management system could monitor additional data collected over a network such as the Internet to determine a high number of news articles and/or social media posts relating to a gas leak, and the supervisory processing system can use this data to turn off a gas source or a gas line. As another example the supervisory processing system can determine that an extreme thunderstorm is likely based on weather data collected via weather sensors or via weather data collected via the Internet, and in response instruct portions of a smart grid to turn off switch to an emergency backup power source.

In various embodiments, the supervised processing system can execute specific control instructions received from the supervisory entity, for example, executing an instruction to turn off the water or turn off the gas. In various embodiments, the supervised processing system can transmit specific control settings to the supervisory processing system which can include a list of utilities controlled, devices or appliances monitored and/or controlled, power specifications of the devices, usage history, a predefined or custom priority of devices, etc. In response, the supervisory entity can evaluate these settings when generating the control data, and can send more specific instructions such as "turn off the kitchen light" and "set the air conditioning to 70 degrees." In various embodiments, the priority data can be used in response to the need to limit consumption of a utility. For example, a supervised processing system of a first home may prioritize the microwave and refrigerator, as the resident really enjoys eating frozen meals. A supervised processing system of a second home whose resident typically orders takeout may instead prioritize the television. If the supervisory processing system determines that a set of residential entities need to reduce electricity consumption by 10 percent, the supervisory processing system can generate the control data based on this information, and may instruct the first system to turn off the television while instructing the second system to turn off the microwave. In other embodiments, the distribution of power between appliances is determined by the supervised processing system itself, for example where the supervised entity is an individual home, and the control settings are not transmitted to the supervisory processing system. In the previous example, the supervisory processing system could instead send the same instruction to reduce electricity by 10 percent to both homes. The first supervised processing system would process this data and determine which appliances to turn off based on the control settings, and may still determine to turn off the television based on the priority settings stored by the supervised processing system. In various embodiments, priority settings are determined based on analysis of appliance usage, and the first home may turn off the television because it is not normally used. As another example, the television and lights may be turned off in response to a 4 am requirement to reduce power because television and lights are seldom used at this time, and the refrigerator will remain on because the resident never cuts power to their refrigerating unit to prevent food from spoiling. In various embodiments, mass analytics are employed by the supervisory processing system and/or the supervised processing system to prioritize appliances based on all residential entities across the entire system.

In various embodiments, the supervisory processing system can be directed towards other applications other than SCADA utility management, for example, communicating with monitored entities in conjunction with a Distribution Management System (DMS), Outage Management System (OMS), Mobile Workforce Management (MWM), Meter Data Management System (MDMS), or a Transmission Management System (TMS).

In various embodiments, communication system 1900 can be utilized for broadcast communication, and a supervisory processing system 1910 can operate in conjunction with a broadcast communication system, transmitting notification data and/or control data to some or all supervised processing systems 1920. For example, emergency notifications and/or emergency instructions can be sent in this fashion. In various embodiments where the supervisory processing system is operating in conjunction with a utilities management system, the supervisory processing system can transmit broadcast communications relating to widespread utility outages, such as a power outage. In particular, utilizing the guided wave communication system enables important messages and instructions to be broadcast to supervised entities such as residential and commercial entities via the transmission medium in situations where communication may otherwise be impossible, such as in the case of a power outage. In various embodiments, the messages and/or instructions are displayed on one or more user devices and/or one or more display devices of the supervised processing system, such as a message indicating status of the outage, indicating that users should avoid transit near a gas leak, indicating loss of power, indicating nearby charging stations for electric vehicles, indicating current maintenance to a utility or future maintenance to a utility, etc. In various embodiments, messages and/or instructions are interpreted as control data and are executed automatically by the supervised processing system and/or an external processing system communicating with the supervised processing system via the network, for example, directing some or all residential and/or commercial entities to switch a backup power supply and/or turn off home appliances. In various embodiments, a user can respond to a received message displayed via user interface 1929, for example, via voice and/or text input to a user device. The user device can communicate the response back to the supervised processing system, and the supervised processing system can relay the response back to the supervisory processing system via guided wave communication. The response can also be transmitted to the supervisory processing system instead via a wired and/or wireless connection, for example, by utilizing network 1950 and/or network 1960. In various embodiments, the supervisory processing system, upon receiving the message, can relay the message, for example, via a wired and/or wireless connection to a user device of an administrator of the system for display by the administrator, for example, via user device 1980. In various embodiments, a messaging service that enables bidirectional communication between users and administrators can be implemented in this fashion.

In various embodiments where the communication system utilizes the supervised processing systems coupled to repeaters as discussed in conjunction with FIG. 19C-FIG. 19H, the broadcast of the notification and/or instruction is facilitated as the supervisory processing system 1910 can transmit a communication to as few as one supervised processing system via the guided wave transceiver, and this supervised processing system can repeat the electromagnetic wave to further supervised processing systems as discussed previously, while processing the data and/or executing an instruction.

In various embodiments, the guided wave broadcast communications can be sent to a subset of supervised processing systems based on broadcast parameters. For example, broadcast parameters could include sending the message and/or instruction data only to residential entities. In various embodiments, users of the supervised processing system can update notification preferences in a user account, for example via a user input to the user interface, and the broadcast will be sent based on the preference data. In various embodiments where a supervised processing system is communicating with various entities and/or users, for example, transmitting data wirelessly to multiple user devices and/or vehicles via network 1960, the supervised processing system can also broadcast this information via the network to some or all of the entities and/or users based on parameter data stored in memory 1923, parameter data received from the supervised broadcast system via guided wave communication, parameter data received from an external server via the network, and/or parameter data received directly from one or more user devices via the network. In various embodiments, the parameter data can include location data, for example, location data associated with user devices, such as mobile device geospatial data, addresses of supervised entities, and/or a physical location associated with the supervised processing system itself. For example, only supervised entities within proximity of the location of a gas leak or within proximity of an approaching storm will receive communications from the supervisory processing system.

In various embodiments, a user device and/or vehicle is associated with a particular supervised processing system, such as the supervised processing system of a residential entity associated with the vehicle or of a transportation service associated with the vehicle. A supervised processing system will transmit the notification and/or instructions to their associated user devices and/or vehicles. In various embodiments, vehicles and user devices such as mobile phones may not be in proximity to its respective supervised processing system and/or the network connection to its respective supervised processing system may not be available. To address this issue, all supervised processing systems can broadcast the notification and/or instruction, for example, as a radio signal or short wave communication signal, and any nearby vehicles and user devices can receive the broadcast. In various embodiments, the supervised processing system will transmit the communication directly to nearby vehicles and/or user devices based on location data received from the vehicles and/or user devices.

In various embodiments where the supervised entities include vehicles, such as a privately owned car or a vehicle that is part of a public transportation system, the supervised processing system can communicate wirelessly with the vehicles via network 1960 as described previously. In particular, the supervised processing system can transmit messages to vehicles to be delivered to one or more users via a display and/or speaker associated with the vehicle. This can also include location data and/or navigational instructions for display, for example, giving the location of a hazardous area or electric vehicle charging station, and/or giving navigational instructions to avoid a hazardous area or route to an electric vehicle charging station. The broadcast communication system can also send control data to the vehicle, for example, an instruction for a subway car to stop due to an emergency situation such as a gas leak, or control data directing an autonomous vehicle to avoid a hazardous area or to route to the nearest electric vehicle charging station.

In various embodiments, a supervised processing system can also generate their own broadcast in response to detecting an emergency situation such as a power outage. The supervised entity can detect an emergency situation, for example, based on sensor data and/or based on notifications received from the additional transceiver, for example, from a user device or from the network. For example, a supervised processing system that transmits guided waves via a power line can determine that a power outage has occurred, for example, by detecting a voltage drop and/or that the power line was severed by utilizing sensors 1604, and/or by receiving a radio emergency broadcast, receiving a notification of a planned or unplanned outage via a user device of a maintenance worker, etc. In various embodiments, the supervised processing system can broadcast a notification and/or instruction relating to the emergency via guided wave communication to other supervised processing systems, for example, where one or more supervised processing systems utilize repeaters as discussed in conjunction with FIG. 19C-FIG. 19I. In various embodiments, the supervised processing system can transmit this information directly to the supervisory processing system, and the supervisory processing system will generate the broadcast accordingly. In various embodiments, the supervisory processing system will detect the emergency itself, based on user input by an administrative authority, information from its own sensors, and/or information received via the network 1950 as discussed previously.

Figure 19L:
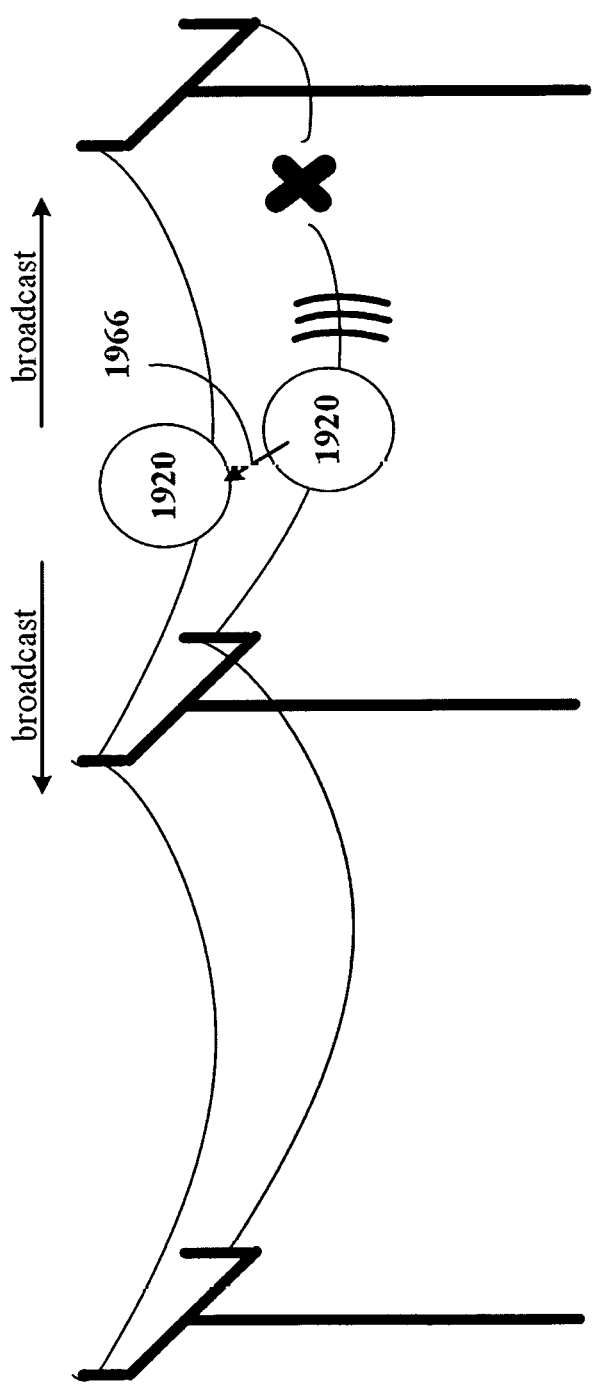
FIG. 19L illustrates an example non-limiting embodiment of a communication system in accordance with various aspects described herein.

FIG. 19L illustrates an embodiment of communication system 1900. In various embodiments, such as embodiments where the power outage affects the transmission medium, such as a severed power line, the supervised processing system can instead send the power outage notification via the network to a supervisory processing system. In various embodiments, the supervised processing system can instead send the power outage notification to another supervised processing system for transmission back to the supervisory processing system and/or for immediate broadcast via guided wave communications. This strategy may be preferred in embodiments where supervisory processing systems are in close proximity, for example, sharing the same utility pole on opposite sides of the same phase as in FIG. 19C-FIG. 19H, or on different phases on the same side of the utility pole as shown in FIG. 19L, where a short range wireless connection or short wired connection can be utilized. In various embodiments, where multiple phases of a power line are utilizing guided wave communications, a first supervised system on a first phase can communicate with a second supervised system on a second phase via a wired and/or wireless connection such as communication link 1966 described previously or another short range wireless connection such as an access line of sight radio link connection, Bluetooth connection, and/or ZigBee connection, for example by utilizing their respective additional transceivers 1928. Consider an example where the first phase of the power line is severed, and thus both power and the ability to transmit a guided wave on this power line is lost. This first supervised processing system can send a communication to the second supervised processing system for guided wave transmission via the second power line phase. In various embodiments where multiple phases of a power line are utilizing guided wave communications, the broadcast will be transmitted along some or all the phases preemptively for resiliency, allowing the broadcast to reach its final destination even if one or more of the phases fail due to the power outage.

In various embodiments, a supervisory processing system and/or supervised processing system can generate a broadcast communication in response to an upcoming emergency and/or outage, such as an upcoming power outage. In various embodiments, the upcoming power outage can be planned, such as planned maintenance, or predicted. For example, an upcoming emergency and/or power outage can be predicted based on data gathered from sensors and/or via the network to include equipment status data, user input, weather data, news data, social media data, etc. The broadcast can include times that a planned or predicted outage is projected to take place, preemptive instructions, such as instructing supervised entities to switch to a backup battery or instructing users to find a safe place to wait, whether or not an emergency warning has passed, etc. In various embodiments, the supervisory processing system can generate a likelihood value for an outage based on the collected data based on a likelihood algorithm, and generate a broadcast in response to the likelihood value comparing unfavorably to a likelihood threshold to indicate that the likelihood of an outage is higher than a threshold value. In various embodiments, a second broadcast will be transmitted when the likelihood value once again compares favorably to the likelihood threshold to indicate that the warning period has passed.

Figure 19M:
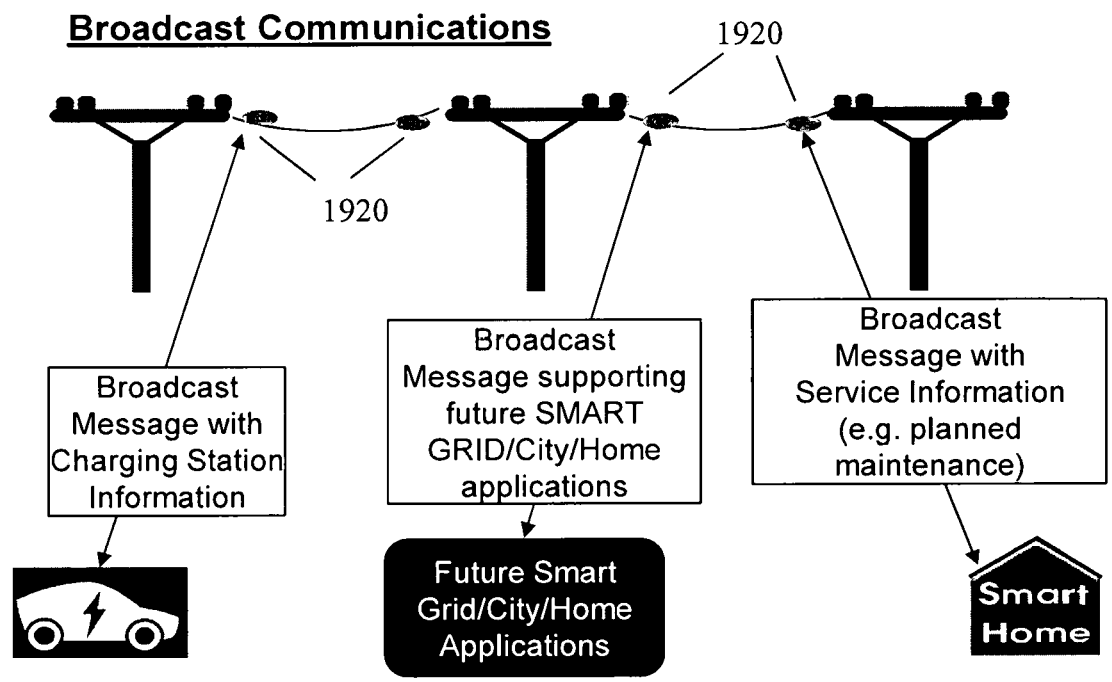
FIG. 19M is an illustration of an example non-limiting embodiment of a communication system implemented in conjunction with broadcast communication in accordance with various aspects described herein.
Figure 19M:
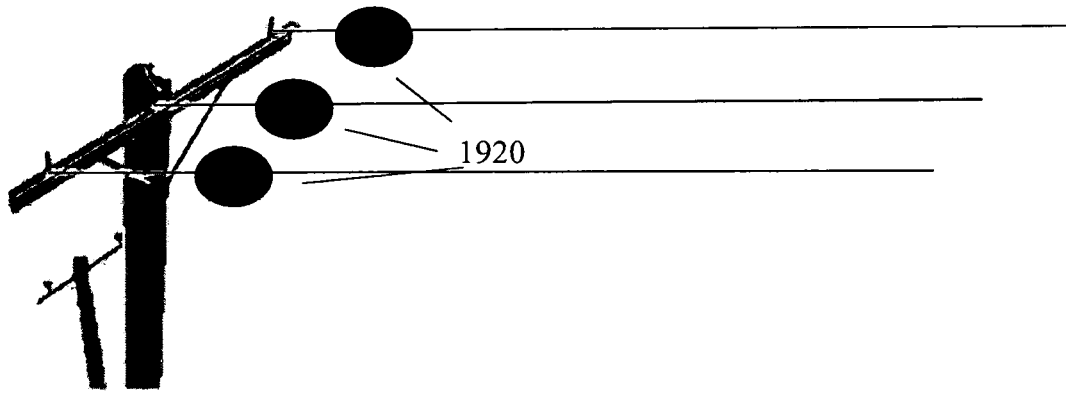

FIG. 19M illustrates an example embodiment of communication system 1900 operating in conjunction with broadcast communications along power lines via guided wave communications. Broadcast messaging can include charging station information, can support future smart grid/city/home application, and/or can include service information such as planned maintenance. As discussed, broadcasting along multiple power line phases can increase resiliency, and supervised processing systems 1920 can be placed along multiple phases accordingly, ensuring that broadcast communication is enabled unless all power line phases fail.

Figure 19N:
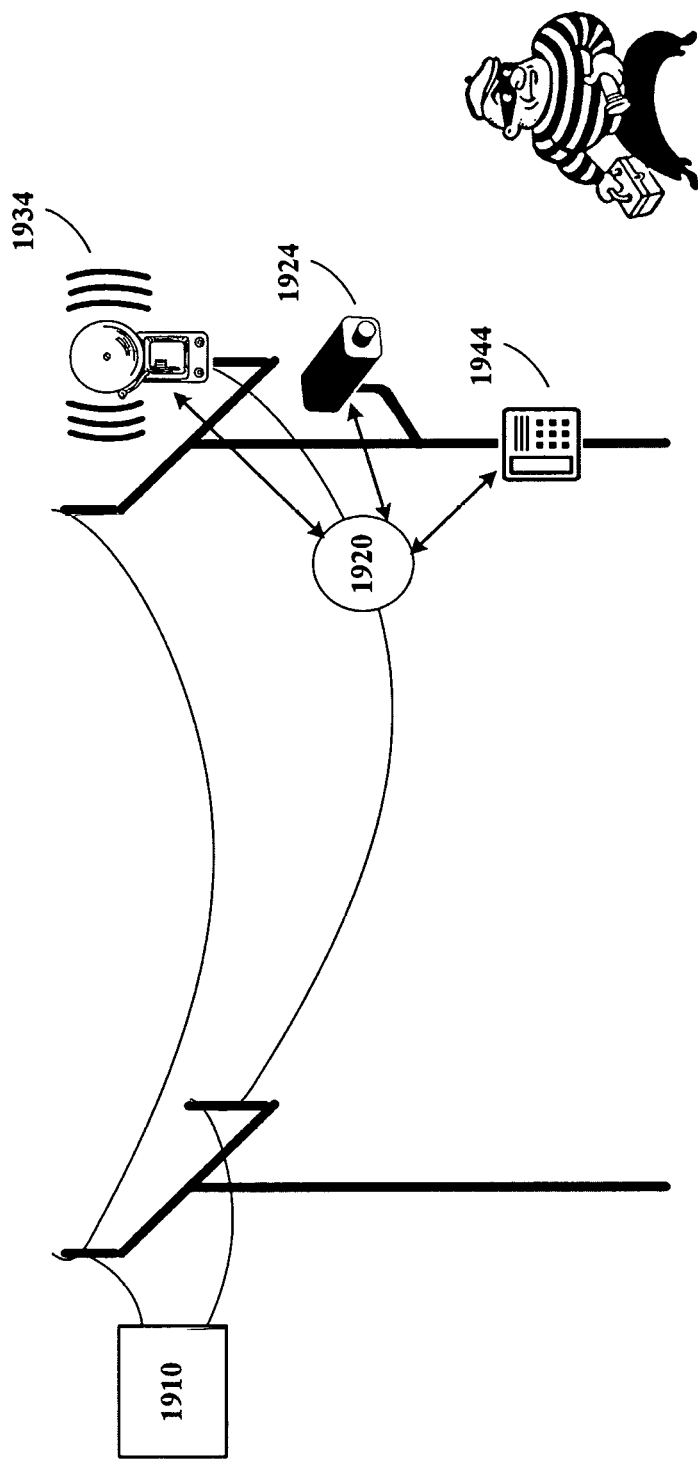
FIG. 19N is an illustration of an example non-limiting embodiment of a communication system implemented in conjunction with surveillance in accordance with various aspects described herein.

FIG. 19N illustrates another embodiment of the communication system 1900 where the supervised processing system 1920 is utilized in conjunction with a surveillance system monitoring the supervised entity 1922, sending surveillance data collected by the sensor devices 1924 to the supervisory processing system, where the supervisory entity 1912 associated with the supervisory processing system is, for example, an administrator of a surveillance system provider and/or an administrator of the supervised entity. In various embodiments, the surveillance system can be directed towards monitoring the transmission medium itself, utilizing one or more of the embodiments described in conjunction with FIG. 19C-FIG. 19H. This system can utilize many of the features described in FIG. 16, but in particular can be directed towards detecting intentional and malicious action such as vandalism to the transmission medium and/or detecting one or more people in proximity to the area that could perform a malicious action. The sensors can include, for example, image sensors such as image sensor 1604g or any one or more cameras that capture still photos and/or video, and/or motion sensors such as passive infrared sensors, microwave sensors, area reflective sensors, ultrasonic sensors, vibration sensors, or another type of sensor that detects motion. Motion data can also be captured using the image sensor, utilizing image processing techniques to recognize and/or track the motion of an object.

Figure 19O:
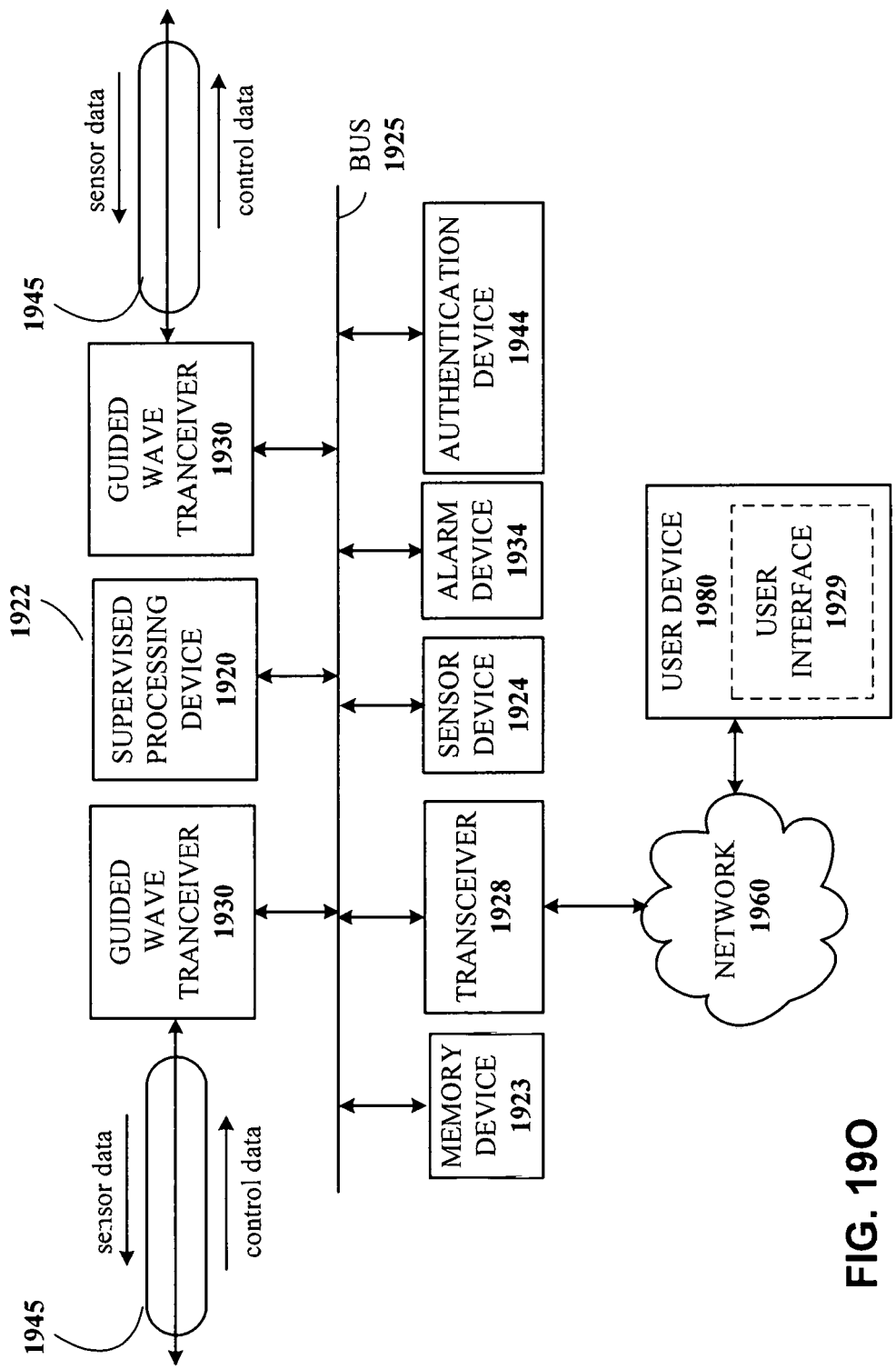
FIG. 19O is a block diagram of an example non-limiting embodiment of a supervised processing system implemented in conjunction with surveillance in accordance with various aspects described herein.

FIG. 19O is a block diagram illustration of a supervised processing system 1920 operating in conjunction with a surveillance system. In various embodiments, supervised processing system 1920 is coupled to at least one guided wave transceiver device 1930 and at least one memory device 1923 that includes a memory, connected via bus 1925, at least one additional transceiver 1928, at least one sensor device 1924, and/or at least one control device 1926, which can connect to additional devices such as user device 1980 and/or connect to a wired and/or wireless network 1960, as previously described. In addition to these previously described features, supervised processing system 1920 can be coupled to, or communicate bidirectionally with via the at least one additional transceiver 1928, an alarm device 1934 and/or an authentication device 1944. In various embodiments, the control device 1926 can be used to control alarm device 1934 and/or an authentication device 1944.

In various embodiments where the supervised processing system 1920 operates in conjunction with a surveillance system, the supervised processing system 1920 can send raw surveillance data collected by sensor devices 1924 to the supervising entity 1912. This can include transmitting raw data from sensors 1604, transmitting one or more video signals, transmitting a notification that a motion sensor has been triggered, etc. This data can be transmitted in real-time, can be transmitted in fixed intervals, and/or can be transmitted in response to a request from the supervising entity 1912. For example, the supervised processing system 1920 can transmit a real-time video feed to the supervisory processing system for analysis by a user such as an administrator, for example, via user interface 1919. In various embodiments, analysis of the raw data received by the can also be achieved automatically by a the supervisory processing system 1910 by utilizing an algorithm to detect suspicious activity, for example, by utilizing facial detection and/or motion detection methods on a video stream to detect an intruder, and/or by utilizing one or more sensors 1604 to determine that there is a problem with the transmission medium such as a severed power line that was perhaps caused by suspicious activity. In various embodiments, this analysis of the raw data can be achieved instead via the supervised processing system 1920, and a transmission can be sent to the supervisory processing system in response to detecting suspicious activity, for example, to alert the administrator and/or law enforcement authorities. In various embodiments, the automated analysis by the supervisory system and/or supervised system will notify and/or allow an administrative user to evaluate detected suspicious activity, for example via user interface 1919, allowing the administrative user to confirm whether or not the activity is indeed malicious action. For example, instead of requiring an administrator to constantly view a video feed, an administrator will only be notified when a suspicious person and/or action is detected by the system, and the administrator can view past or current video footage to determine if the activity was indeed malicious and if further steps need to be taken.

In various embodiments, this automatic suspicious activity detection by the supervised processing system and/or supervisory processing system can include utilizing scheduled maintenance data, for example, logged by an administrator of the system, to determine that activity by a detected person is scheduled maintenance and not vandalism by, for example, comparing a current time to a time that corresponds to scheduled maintenance. In various embodiments, the automatic intrusion detection can include utilizing a database of images of authorized personnel that includes, for example, maintenance workers, etc., and detected faces can be compared to faces in the database to determine whether or not a detected person is a recognized and/or authorized person. In various embodiments, a database of images of unauthorized personnel, such as known vandals and/or criminals, can be utilized in a similar fashion to determine that a detected person is a known criminal and thus that malicious activity is likely occurring.

In various embodiments, authorized personnel such as maintenance workers can be identified via an authentication device 1944. For example, a maintenance worker can identify themselves via user input to the authentication device, which can include text, keypad, voice input, tactile input, biometric input such as a fingerprint or eye scan, image input, for example, to utilize facial recognition, etc. In various embodiments, the authentication device can include a user device 1970 or 1980, for example, a mobile phone of a maintenance worker, and the user input can be sent directly to the supervised processing system and/or supervisor processing system wirelessly. For example, a maintenance worker can login to a maintenance worker account and/or enter a passcode on a keypad located on a utility pole, or on their own mobile device. In various embodiments, the authentication device can include an optical scanner or magnetic stripe reader to scan an ID card of the maintenance worker. In various embodiments, the authentication device can include a receiver that receives a wireless signal emitted by a device associated with the authorized personnel such as a beacon and/or mobile device, where the authorized personnel is identified by a unique identifier included in wireless signal. In various embodiments, such a receiver is implemented by utilizing the at least one additional transceiver 1928.

In various embodiments, the supervised processing system of a surveillance system can be coupled to one or more alarm devices 1934, such as a speaker that sounds an alarm tone and/or lighting devices such as a strobe light or directed spotlight. In various embodiments, the alarm devices can be activated automatically by the surveillance system and/or in response to control data received from the supervisory processing system. In various embodiments, the control data will enable the spotlight to automatically track the detected intruder based the image data, motion data, and/or other sensor data. In various embodiments, the surveillance system and/or supervisory processing system will send a transmission via the guided wave transceiver, a wired connection and/or a wireless connection to law enforcement authority such as the police automatically in response to detecting the intrusion.

In various embodiments, the sensors and/or alarm devices of the surveillance can be controlled based on control data generated automatically by the supervised processing system 1920 in response to detecting the suspicious activity. In various embodiments, the control data can instead by received from supervisory processing system 1910 via the guided wave transceiver 1930. In various embodiments, the control data can be utilized by the control device 1926 to control the sensors and/or alarm devices, or can be controlled directly by the supervised processing system. Executing the control data to control sensors can include, for example, turning sensors on or off, changing the position and/or orientation of a sensor such as a camera, zooming a camera in or out, starting or stopping a camera from recording, etc. Executing the control data to control alarm devices can include, setting off the alarm tone via the audio device of the surveillance system, turning on and/or controlling the position/orientation of a strobe light and/or spotlight of the surveillance system, directing the surveillance system to alert law enforcement authorities, etc. For example, an administrator viewing a video feed can directly control a camera to zoom in on and follow a suspicious person and/or allow the administrator to set off an alarm of the surveillance system to scare the intruder away. In various embodiments, some of the sensors of the surveillance system will be activated and/or turned on/off in response to an instruction in the control data. For example, a camera may turn on automatically only in response to possibly suspicious behavior determined by analysis of motion detector data and/or data collected by sensors 1604, and may turn off in response to a lack of suspicious behavior for a fixed time interval, or turn off in response to a determination that the suspicious behavior is not indeed malicious. In various embodiments, this control data can be generated automatically by the supervisory processing system, or in response to automatically detecting the suspicious activity.

Figure 20:
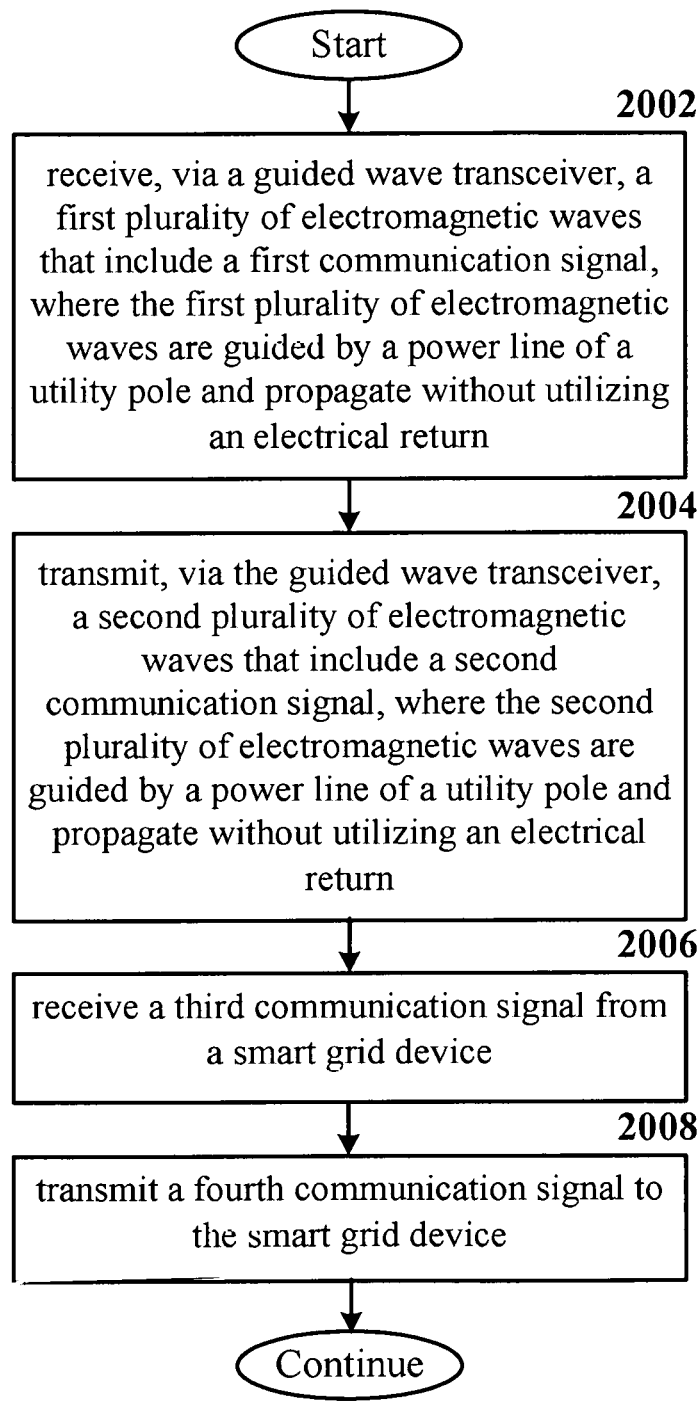
FIG. 20 illustrates a flow diagram of an example, non-limiting embodiment of a method in accordance with various aspects described herein.

FIG. 20 is a flowchart illustrating a method for use by a guided wave repeater system that includes a processor and a guided wave transceiver. Step 2002 includes receiving via the guided wave transceiver a first plurality of electromagnetic waves that include a first communication signal, where the first plurality of electromagnetic waves are guided by a power line of a utility pole and propagate without utilizing an electrical return. Step 2004 includes transmitting via the guided wave transceiver a second plurality of electromagnetic waves that include a second communication signal, where the second plurality of electromagnetic waves are guided by a power line of a utility pole and propagate without utilizing an electrical return. Step 2006 includes receiving a third communication signal from a smart grid device. Step 2008 includes transmitting a fourth communication signal to the smart grid device.

In various embodiments, the smart grid device is physically attached to the utility pole. In various embodiments, the smart grid device is powered by the power line. In various embodiments, the guided wave repeater system further includes a wireless transceiver. The third communication signal is a wireless communication signal received by the wireless transceiver, and the fourth communication signal is a wireless communication signal transmitted by the wireless transceiver. In various embodiments, the third communication signal and the fourth communication signal are received and transmitted, respectively, via an access line of sight radio link protocol. In various embodiments, the guided wave repeater system further includes a wired interface. The third communication signal is received from the smart grid device via the wired interface, and the fourth communication signal is transmitted to the smart grid device via the wired interface.

In various embodiments of the guided wave repeater system, the third communication signal is received as a third plurality of electromagnetic waves via the guided wave transceiver, and the fourth communication signal is received as a fourth plurality of electromagnetic waves via the guided wave transceiver. In various embodiments, the third communication signal is received as a third plurality of electromagnetic waves via a second guided wave transceiver, and where the fourth communication signal is received as a fourth plurality of electromagnetic waves via the second guided wave transceiver.

In various embodiments of the guided wave repeater system, the third communication signal includes supervisory control and data acquisition (SCADA) data. The third communication signal is transformed to generate the second plurality of electromagnetic waves for transmission, where the second communication signal includes the SCADA data. In various embodiments, the first communication signal includes supervisory control and data acquisition (SCADA) data. The first plurality of electromagnetic waves are transformed to generate the fourth communication signal for transmission to the smart grid device, where the fourth communication signal includes the SCADA data.

In various embodiments, the guided wave repeater system includes a wired interface and the first plurality of electromagnetic waves are transformed to generate a fifth communication signal that includes data of the first communication signal. The fifth communication signal is transmitted to a second guided wave repeater system via the wired interface. A sixth communication signal is received from the second guided wave repeater system via the wired interface. The sixth communication signal is transformed to generate the second plurality of electromagnetic waves, where the second plurality of electromagnetic waves include data of the sixth communication signal. In various embodiments where the guided wave repeater system is physically attached to the power line, the power line corresponds to a first phase on a first side of the utility pole. The second guided wave repeater system is physically attached to the first phase on an opposite side of the utility pole.

Figure 21:
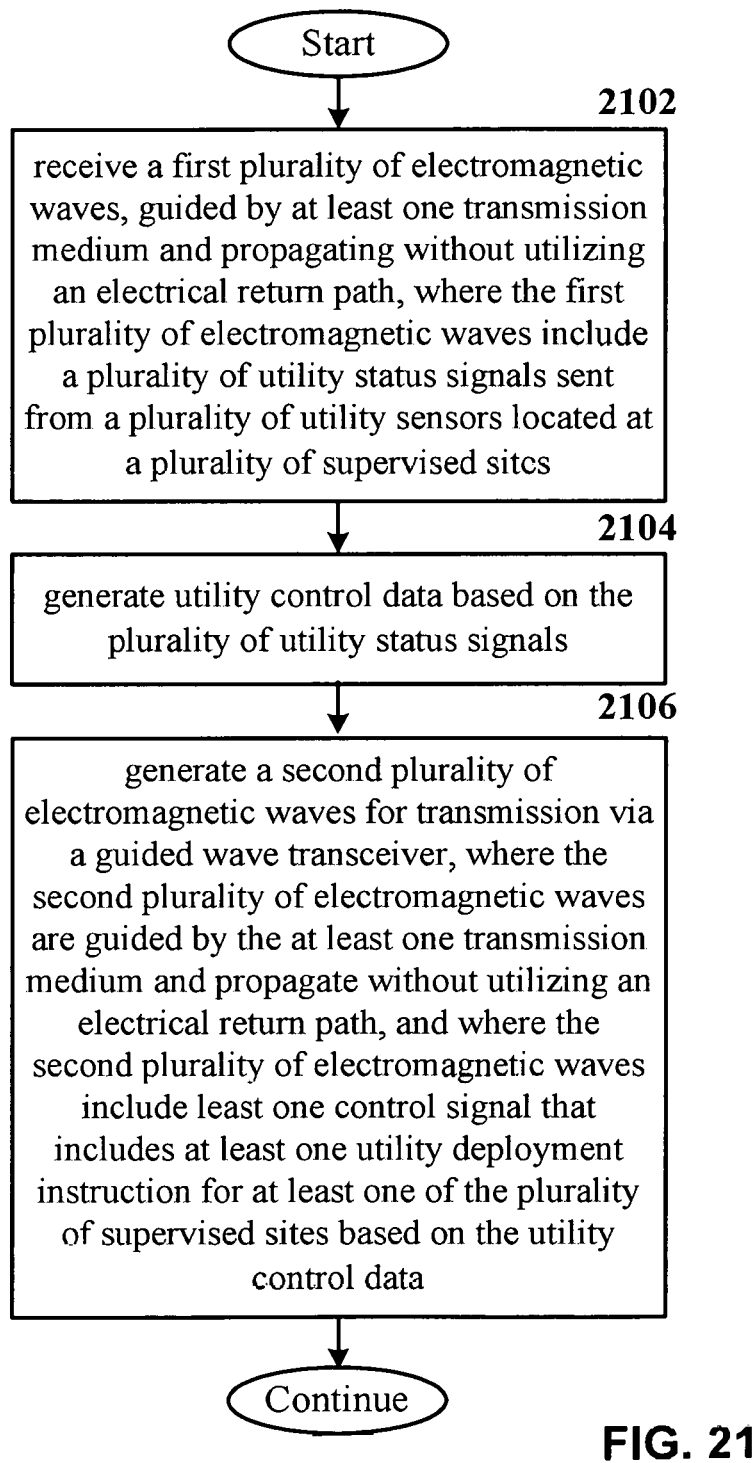
FIG. 21 illustrates a flow diagram of an example, non-limiting embodiment of a method in accordance with various aspects described herein.

FIG. 21 is a flowchart illustrating a method for use by a utilities management system that includes a processor and a guided wave transceiver. Step 2102 includes receiving a first plurality of electromagnetic waves, guided by at least one transmission medium and propagating without utilizing an electrical return path, where the first plurality of electromagnetic waves include a plurality of utility status signals sent from a plurality of utility sensors located at a plurality of supervised sites. Step 2104 includes generating utility control data based on the plurality of utility status signals. Step 2106 includes generating a second plurality of electromagnetic waves for transmission via the guided wave transceiver, where the second plurality of electromagnetic waves are guided by the at least one transmission medium and propagate without utilizing an electrical return path, and where the second plurality of electromagnetic waves include least one control signal that includes at least one utility deployment instruction for at least one of the plurality of supervised sites based on the utility control data.

In various embodiments, the utilities management system is implemented in conjunction with a supervisory control and data acquisition (SCADA) system. In various embodiments, at least one of the plurality of supervised sites is a home, at least one of the plurality of utility sensors located in the home is coupled with a home automation controller, and the at least one utility deployment instruction is executed by the home automation controller. In various embodiments, the at least one control signal is sent to the home and includes an instruction to turn off appliances of the home.

In various embodiments, the utility control data is generated by utilizing a supervisory control algorithm based on the plurality of utility status signals to optimize utility consumption across the plurality of supervised sites. In various embodiments of the utilities management system, an emergency notification signal is received via the guided wave transceiver, and generating the utility control data is further based on the emergency notification signal. In various embodiments, the at least one control signal includes an instruction for the supervised site to switch from a primary power source to a secondary power source. In various embodiments, the secondary power source includes a battery and/or a solar panel. In various embodiments, a primary power consumption level is determined based on the plurality of utility status signals. The primary power consumption level is compared to a primary power load threshold, and the instruction to switch from the primary power source to the secondary power source is based on the primary power consumption level comparing unfavorably to the primary power load threshold.

In various embodiments, a subset of the plurality of utility sensors monitor a power line, and the transmission medium that guides the electromagnetic waves includes the power line. In various embodiments, one of the subset of the plurality of utility sensors is coupled to an intermediate guided wave transceiver. The intermediate guided wave transceiver transmits at least one of the plurality of utility status signals corresponding to the one of the subset of the plurality of utility sensors to the utility management system as a first plurality of electromagnetic waves that are guided by the power line and that propagate without utilizing an electrical return path. The at least one control signal is received by the intermediate guided wave transceiver as a second plurality of electromagnetic waves that are guided by the power line and that propagate without utilizing an electrical return path, and the intermediate guided wave transceiver is a waypoint of a transmission path of the at least one control signal to the at least one of the plurality of supervised sites. The intermediate guided wave transceiver repeats second plurality of electromagnetic waves for transmission along the power line to a next guided wave transceiver of a remainder of the transmission path.

Figure 22:
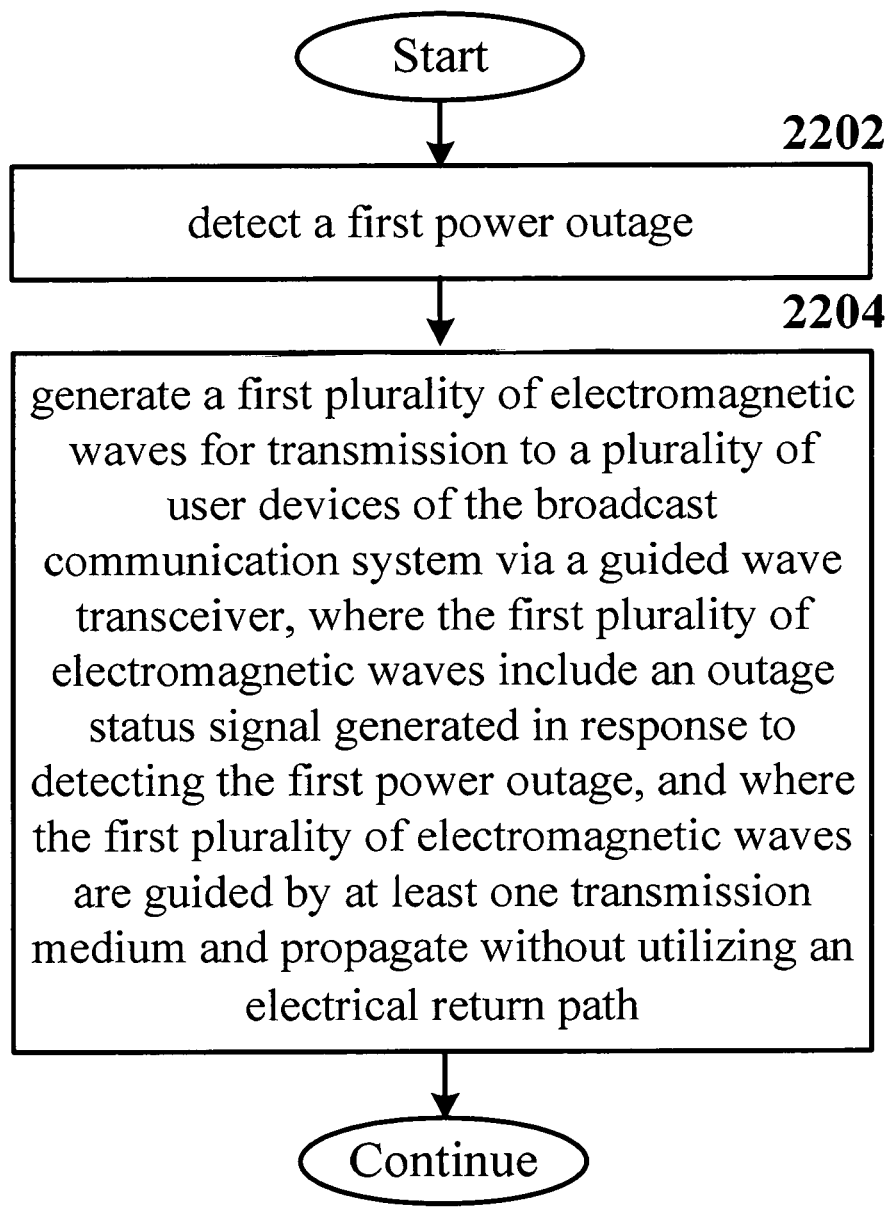
FIG. 22 illustrates a flow diagram of an example, non-limiting embodiment of a method in accordance with various aspects described herein.

FIG. 22 is a flowchart illustrating a method for use by a broadcast communication system that includes a processor and a guided wave transceiver. Step 2202 includes detecting a first power outage. Step 2204 includes generating a first plurality of electromagnetic waves for transmission to a plurality of user devices of the broadcast communication system via the guided wave transceiver, where the first plurality of electromagnetic waves include an outage status signal generated in response to detecting the first power outage, and where the first plurality of electromagnetic waves are guided by at least one transmission medium and propagate without utilizing an electrical return path.

In various embodiments, the broadcast communication system is physically attached to a first one of a plurality of power line phases of a power pole, and the first power outage corresponds to a failure of a second one of the plurality of power line phases of the power pole. In various embodiments, the broadcast communication system further includes a wireless transmitter, as well as a disturbance detection sensor, a loss of energy sensor, and/or a vibration sensor. A second power outage corresponding to a failure of the first one of the plurality of power line phases is detected based on sensor input to the disturbance detection sensor, the loss of energy sensor, and/or the vibration sensor, and a notification of the second power outage is generated for transmission via the wireless transmitter. In various embodiments, the broadcast communication system further includes a wireless transceiver and a power outage notification is received via the wireless transceiver. The first power outage is detected in response to receiving the power outage notification.

In various embodiments, the broadcast communication system further includes a wireless receiver, at least one wireless transmission that includes utility status data from at least one utility provider is received via the wireless receiver, and the outage status signal is generated based on the utility status data. In various embodiments the broadcast communication system further comprises a wireless transmitter. At least one status request is generated for transmission via the wireless transmitter to the at least one utility provider in response to detecting the first power outage, and the at least one wireless transmission is received in response to the at least one status request.

In various embodiments, a second plurality of electromagnetic waves are received via the guided wave transceiver that includes a power outage notification signal. The first power outage is detected in response to receiving the power outage notification signal. In various embodiments, at least one second plurality of electromagnetic waves are received from at least one utility provider via the guided wave transceiver. The second plurality of electromagnetic waves include utility status data, and the outage status signal is generated based on the utility status data. In various embodiments, at least one third plurality of electromagnetic waves that include a status request signal are generated for transmission via the guided wave transceiver to the at least one utility provider in response to detecting the first power outage, and the at least one second plurality of electromagnetic waves is received in response to the status request signal.

In various embodiments, the outage status signal includes message data for display by a subset of the plurality of user devices. In various embodiments, the message data corresponds to a message from a utility provider. A second plurality of electromagnetic waves are received via the guided wave transceiver that include a message response signal from one of the subset of the plurality of user devices corresponding to user input to the one of the subset of the plurality of user devices. The second plurality of electromagnetic waves are transmitted via the guided wave transceiver to the utility provider. In various embodiments, at least one of the plurality of user devices includes a home automation controller, and the outage status signal includes at least one instruction for execution by the home automation controller. In various embodiments, the broadcast the outage status signal includes at least one electric vehicle charging station location.

In various embodiments, a second plurality of electromagnetic waves are received from a utility provider via the guided wave transceiver that includes planned maintenance data. A third plurality of electromagnetic waves are generated for transmission to the plurality of user devices of the broadcast communication system via the guided wave transceiver, where the third plurality of electromagnetic waves includes the planned maintenance data.

In various embodiments, a first power outage likelihood value is determined. The first power outage likelihood value is compared to a power outage likelihood threshold. A second plurality of electromagnetic waves for transmission to the plurality of user devices of the broadcast communication system via the guided wave transceiver, the second plurality of electromagnetic waves includes power outage warning data, and the second plurality of electromagnetic waves is generated in response to the first power outage likelihood value comparing unfavorably to the power outage likelihood threshold. In various embodiments, the broadcast communication system includes an environmental sensor, and the first power outage likelihood value is based on sensor input to the environmental sensor. In various embodiments, the first power outage likelihood value is determined at a first time, and a second power outage likelihood value is determined at a second time that is later than the first time. The second power outage likelihood value is compared to the power outage likelihood threshold, and a third plurality of electromagnetic waves are generated for transmission to the plurality of user devices of the broadcast communication system via the guided wave transceiver. The third plurality of electromagnetic waves indicate that the power outage warning has passed, and the third plurality of electromagnetic waves is generated in response to the second power outage likelihood value comparing favorably to the power outage likelihood threshold.

Figure 23:
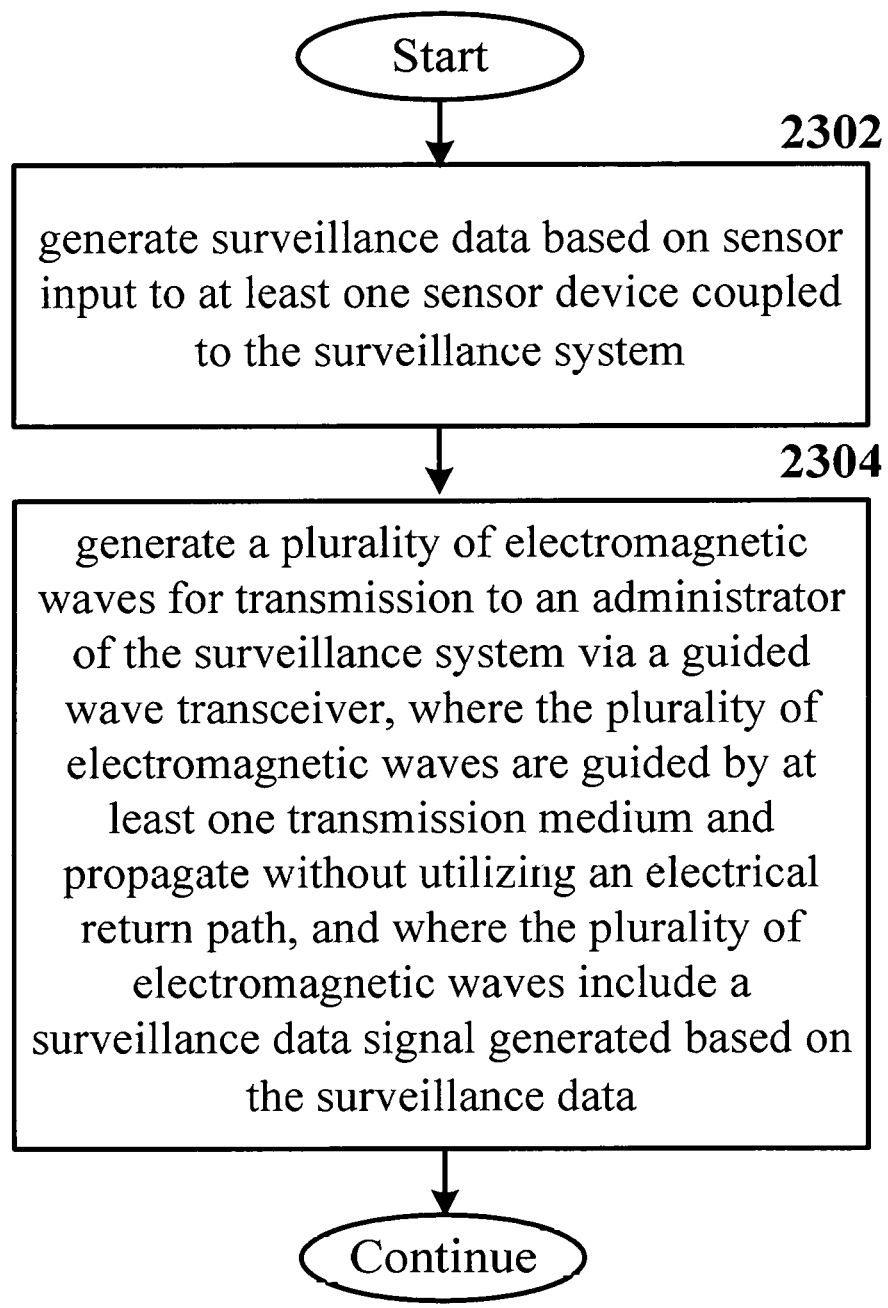
FIG. 23 illustrates a flow diagram of an example, non-limiting embodiment of a method in accordance with various aspects described herein.

FIG. 23 is a flowchart illustrating a method for use by a surveillance system that includes a processor and a guided wave transceiver. Step 2302 includes generating surveillance data based on sensor input to at least one sensor device coupled to the surveillance system. Step 2304 includes generating a plurality of electromagnetic waves for transmission to an administrator of the surveillance system via the guided wave transceiver, where the plurality of electromagnetic waves are guided by at least one transmission medium and propagate without utilizing an electrical return path, and where the plurality of electromagnetic waves include a surveillance data signal generated based on the surveillance data.

In various embodiments, the surveillance system is physically attached to a power line, and the at least one sensor device monitors a region in proximity to the power line. In various embodiments, the at least one sensor device includes a camera, and where the surveillance data includes image data. In various embodiments, the transmitted surveillance data signal includes video data collected by the camera for viewing by the administrator. In various embodiments, a second plurality of electromagnetic waves are received that include camera control data. The camera is controlled based on the camera control data, and controlling the camera includes orienting the camera, positioning the camera, panning the camera, zooming a lens of the camera, starting a recording by the camera, and/or stopping a recording by the camera.

In various embodiments where the surveillance data signal is transmitted to an administrator system, a processor of the administrator system performs analysis of surveillance data of the surveillance data signal to detect suspicious activity. In various embodiments, generating the surveillance data includes detecting suspicious activity, and where the surveillance data signal includes a notification of the suspicious activity.

In various embodiments the surveillance system further includes a speaker. The speaker is controlled to sound an alarm in response to detecting the suspicious activity. In various embodiments where the at least one sensor device includes a camera, the camera is activated to begin capturing image data in response to detecting the suspicious activity. In various embodiments where the surveillance data includes image data, the suspicious activity is detected based on image analysis of the image data. In various embodiments, the image analysis includes at least one of: motion detection or facial detection. In various embodiments, the surveillance system further includes a lighting device. The lighting device is activated in response to detecting the suspicious activity. An orientation of the lighting device is controlled to track the detected motion and/or the detected face. In various embodiments, the camera is controlled based on the motion detection and/or the facial detection to track motion and/or a face. Controlling the camera includes orienting the camera towards the motion, orienting the camera towards the face, zooming in on the motion, and/or zooming in on the face.

In various embodiments, a notification of the suspicious activity is transmitted to a law enforcement entity in response to detecting the suspicious activity. The notification of the suspicious activity is transmitted as electromagnetic waves that are guided by the transmission medium that and propagate without utilizing an electrical return path. In various embodiments, the at least one sensor device includes a disturbance detection sensor, a loss of energy sensor, and/or a vibration sensor, and the suspicious activity is detected based on surveillance data generated based on sensor input to the disturbance detection sensor, the loss of energy sensor, and/or the vibration sensor.

Figure 24A:
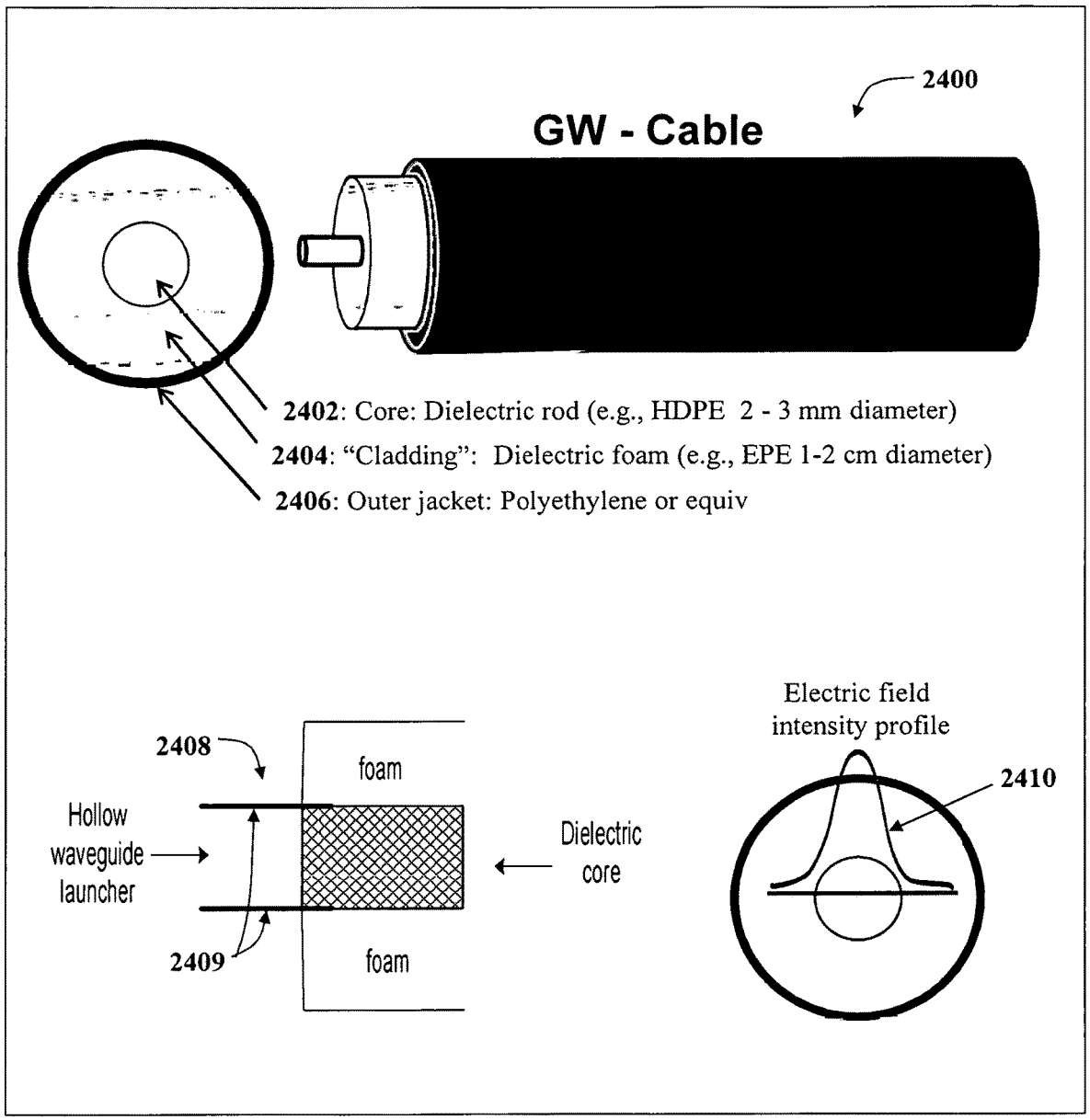
FIGS. 24A, 24B, and 24C are block diagrams illustrating example, non-limiting embodiment of a transmission medium for propagating guided electromagnetic waves.

Turning now to FIG. 24A, a block diagram illustrating an example, non-limiting embodiment of a transmission medium 2400 for propagating guided electromagnetic waves is shown. In particular, a further example of transmission medium 125 presented in conjunction with FIG. 1 is presented. In an embodiment, the transmission medium 2400 can comprise a first dielectric material 2402 and a second dielectric material 2404 disposed thereon. In an embodiment, the first dielectric material 2402 can comprise a dielectric core (referred to herein as dielectric core 2402) and the second dielectric material 2404 can comprise a cladding or shell such as a dielectric foam that surrounds in whole or in part the dielectric core (referred to herein as dielectric foam 2404). In an embodiment, the dielectric core 2402 and dielectric foam 2404 can be coaxially aligned to each other (although not necessary). In an embodiment, the combination of the dielectric core 2402 and the dielectric foam 2404 can be flexed or bent at least by 45 degrees without damaging the materials of the dielectric core 2402 and the dielectric foam 2404. In an embodiment, an outer surface of the dielectric foam 2404 can be further surrounded in whole or in part by a third dielectric material 2406, which can serve as an outer jacket (referred to herein as jacket 2406). The jacket 2406 can prevent exposure of the dielectric core 2402 and the dielectric foam 2404 to an environment that can adversely affect the propagation of electromagnetic waves (e.g., water, soil, etc.).

The dielectric core 2402 can comprise, for example, a high density polyethylene material, a high density polyurethane material, or other suitable dielectric material(s). The dielectric foam 2404 can comprise, for example, a cellular plastic material such an expanded polyethylene material, or other suitable dielectric material(s). The jacket 2406 can comprise, for example, a polyethylene material or equivalent. In an embodiment, the dielectric constant of the dielectric foam 2404 can be (or substantially) lower than the dielectric constant of the dielectric core 2402. For example, the dielectric constant of the dielectric core 2402 can be approximately 2.3 while the dielectric constant of the dielectric foam 2404 can be approximately 1.15 (slightly higher than the dielectric constant of air).

The dielectric core 2402 can be used for receiving signals in the form of electromagnetic waves from a launcher or other coupling device described herein which can be configured to launch guided electromagnetic waves on the transmission medium 2400. In one embodiment, the transmission 2400 can be coupled to a hollow waveguide 2408 structured as, for example, a circular waveguide 2409, which can receive electromagnetic waves from a radiating device such as a stub antenna (not shown). The hollow waveguide 2408 can in turn induce guided electromagnetic waves in the dielectric core 2402. In this configuration, the guided electromagnetic waves are guided by or bound to the dielectric core 2402 and propagate longitudinally along the dielectric core 2402. By adjusting electronics of the launcher, an operating frequency of the electromagnetic waves can be chosen such that a field intensity profile 2410 of the guided electromagnetic waves extends nominally (or not at all) outside of the jacket 2406.

By maintaining most (if not all) of the field strength of the guided electromagnetic waves within portions of the dielectric core 2402, the dielectric foam 2404 and/or the jacket 2406, the transmission medium 2400 can be used in hostile environments without adversely affecting the propagation of the electromagnetic waves propagating therein. For example, the transmission medium 2400 can be buried in soil with no (or nearly no) adverse effect to the guided electromagnetic waves propagating in the transmission medium 2400. Similarly, the transmission medium 2400 can be exposed to water (e.g., rain or placed underwater) with no (or nearly no) adverse effect to the guided electromagnetic waves propagating in the transmission medium 2400. In an embodiment, the propagation loss of guided electromagnetic waves in the foregoing embodiments can be 1 to 2 dB per meter or better at an operating frequency of 60 GHz. Depending on the operating frequency of the guided electromagnetic waves and/or the materials used for the transmission medium 2400 other propagation losses may be possible. Additionally, depending on the materials used to construct the transmission medium 2400, the transmission medium 2400 can in some embodiments be flexed laterally with no (or nearly no) adverse effect to the guided electromagnetic waves propagating through the dielectric core 2402 and the dielectric foam 2404.

Figure 24B:
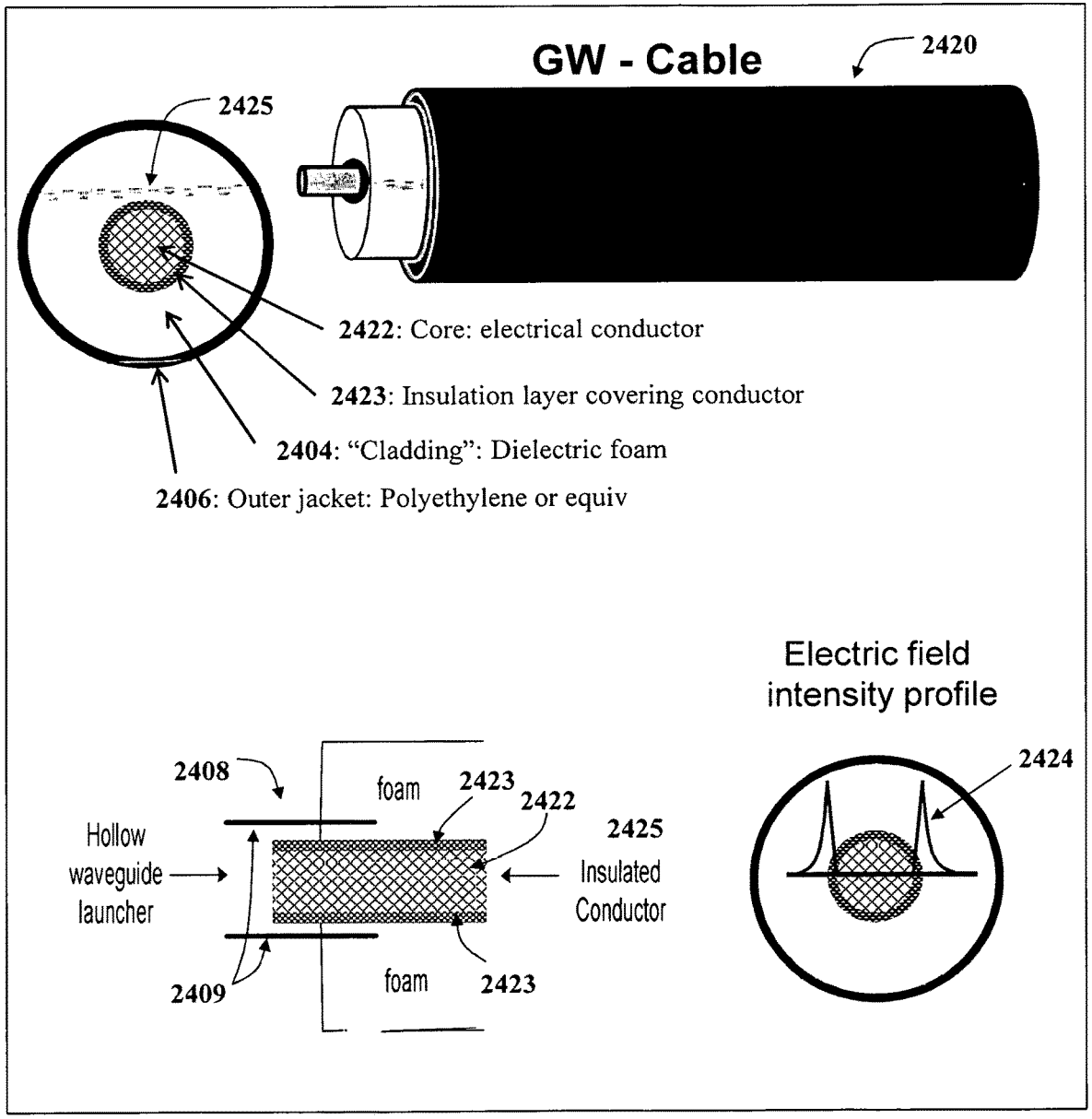

FIG. 24B depicts a transmission medium 2420 that differs from the transmission medium 2400 of FIG. 24A, yet provides a further example of the transmission medium 125 presented in conjunction with FIG. 1. The transmission medium 2420 shows similar reference numerals for similar elements of the transmission medium 2400 of FIG. 24A. In contrast to the transmission medium 2400, the transmission medium 2420 comprises a conductive core 2422 having an insulation layer 2423 surrounding the conductive core 2422 in whole or in part. The combination of the insulation layer 2423 and the conductive core 2422 will be referred to herein as an insulated conductor 2425. In the illustration of FIG. 24B, the insulation layer 2423 is covered in whole or in part by a dielectric foam 2404 and jacket 2406, which can be constructed from the materials previously described. In an embodiment, the insulation layer 2423 can comprise a dielectric material, such as polyethylene, having a higher dielectric constant than the dielectric foam 2404 (e.g., 2.3 and 1.15, respectively). In an embodiment, the components of the transmission medium 2420 can be coaxially aligned (although not necessary). In an embodiment, a hollow waveguide 2408 having metal plates 2409, which can be separated from the insulation layer 2423 (although not necessary) can be used to launch guided electromagnetic waves that substantially propagate on an outer surface of the insulation layer 2423, however other coupling devices as described herein can likewise be employed. In an embodiment, the guided electromagnetic waves can be sufficiently guided by or bound by the insulation layer 2423 to guide the electromagnetic waves longitudinally along the insulation layer 2423. By adjusting operational parameters of the launcher, an operating frequency of the guided electromagnetic waves launched by the hollow waveguide 2408 can generate an electric field intensity profile 2424 that results in the guided electromagnetic waves being substantially confined within the dielectric foam 2404 thereby preventing the guided electromagnetic waves from being exposed to an environment (e.g., water, soil, etc.) that adversely affects propagation of the guided electromagnetic waves via the transmission medium 2420.

Figure 24C:
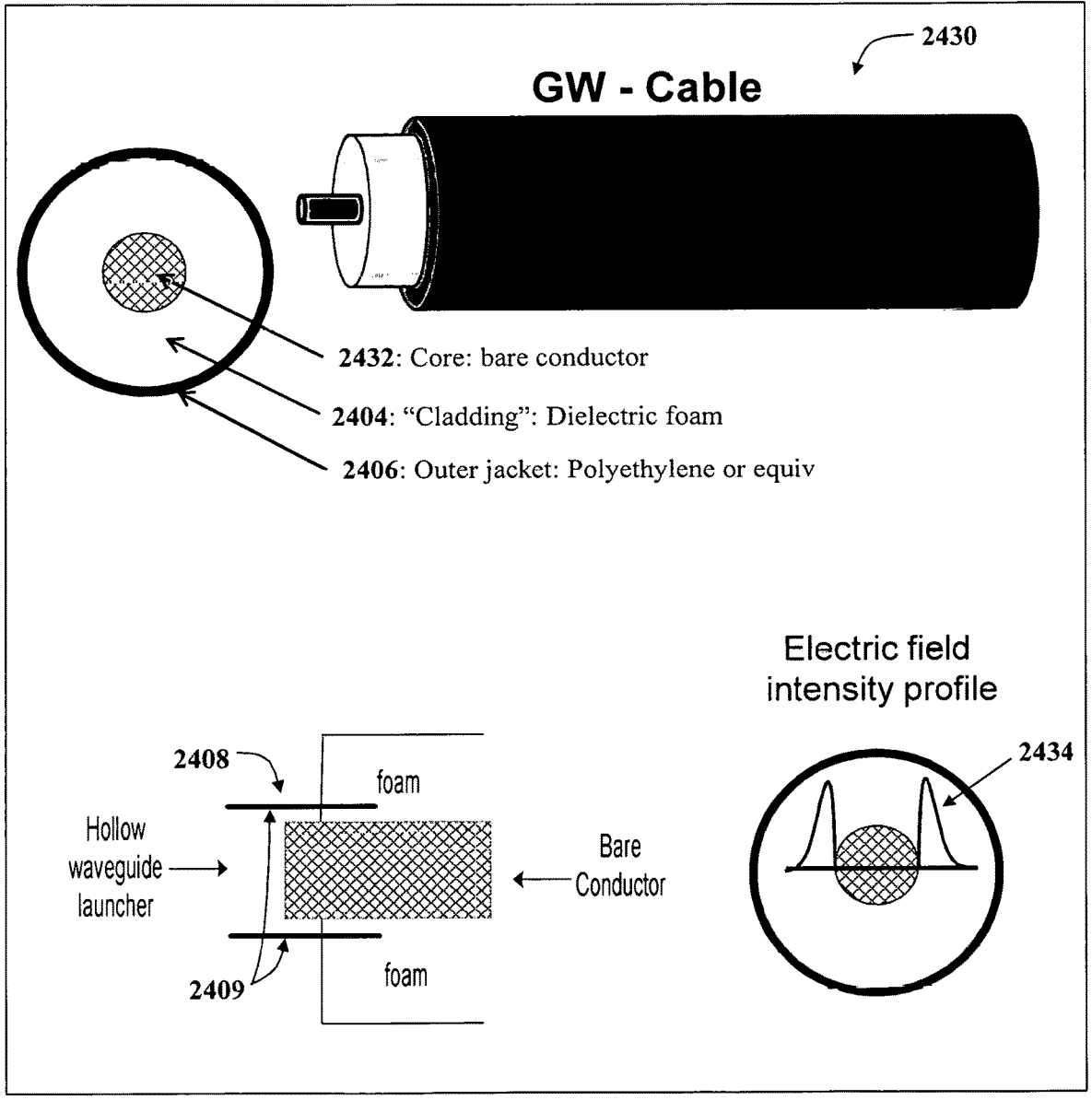

FIG. 24C depicts a transmission medium 2430 that differs from the transmission mediums 2400 and 2420 of FIGS. 24A and 24B, yet provides a further example of the transmission medium 125 presented in conjunction with FIG. 1. The transmission medium 2430 shows similar reference numerals for similar elements of the transmission mediums 2400 and 2420 of FIGS. 24A and 24B, respectively. In contrast to the transmission mediums 2400 and 2420, the transmission medium 2430 comprises a bare (or uninsulated) conductor 2432 surrounded in whole or in part by the dielectric foam 2404 and the jacket 2406, which can be constructed from the materials previously described. In an embodiment, the components of the transmission medium 2430 can be coaxially aligned (although not necessary). In an embodiment, a hollow waveguide 2408 having metal plates 2409 coupled to the bare conductor 2432 can be used to launch guided electromagnetic waves that substantially propagate on an outer surface of the bare conductor 2432, however other coupling devices described herein can likewise be employed. In an embodiment, the guided electromagnetic waves can be sufficiently guided by or bound by the bare conductor 2432 to guide the guided electromagnetic waves longitudinally along the bare conductor 2432. By adjusting operational parameters of the launcher, an operating frequency of the guided electromagnetic waves launched by the hollow waveguide 2408 can generate an electric field intensity profile 2434 that results in the guided electromagnetic waves being substantially confined within the dielectric foam 2404 thereby preventing the guided electromagnetic waves from being exposed to an environment (e.g., water, soil, etc.) that adversely affects propagation of the electromagnetic waves via the transmission medium 2430.

It should be noted that the hollow launcher 2408 used with the transmission mediums 2400, 2420 and 2430 of FIGS. 24A, 24B and 24C, respectively, can be replaced with other launchers or coupling devices. Additionally, the propagation mode(s) of the electromagnetic waves for any of the foregoing embodiments can be fundamental mode(s), a non-fundamental (or asymmetric) mode(s), or combinations thereof.

Figure 25:
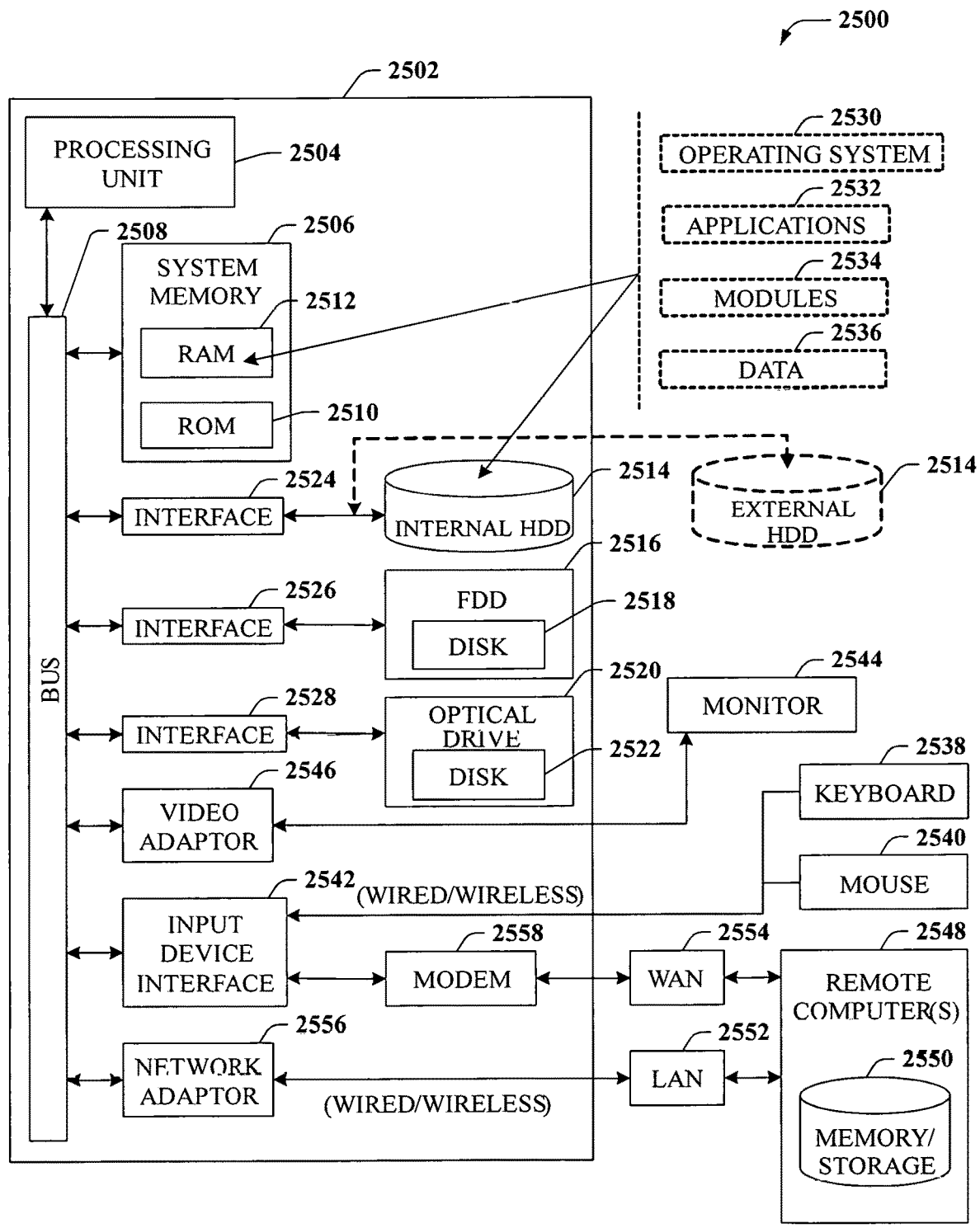
FIG. 25 is a block diagram of an example, non-limiting embodiment of a computing environment in accordance with various aspects described herein.

Referring now to FIG. 25, there is illustrated a block diagram of a computing environment in accordance with various aspects described herein. In order to provide additional context for various embodiments of the embodiments described herein, FIG. 25 and the following discussion are intended to provide a brief, general description of a suitable computing environment 2500 in which the various embodiments of the subject disclosure can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, handheld computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 25, the example environment 2500 for transmitting and receiving signals via or forming at least part of a base station (e.g., base station devices 1504, macrocell site 1502, or base stations 1614) or central office (e.g., central office 1501 or 1611). At least a portion of the example environment 2500 can also be used for transmission devices 101 or 102. The example environment can comprise a computer 2502, the computer 2502 comprising a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multiprocessor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 comprises ROM 2510 and RAM 2512. A basic input/output system (BIOS) can be stored in a non-volatile memory such as ROM, erasable programmable read only memory (EPROM), EEPROM, which BIOS contains the basic routines that help to transfer information between elements within the computer 2502, such as during startup. The RAM 2512 can also comprise a high-speed RAM such as static RAM for caching data.

The computer 2502 further comprises an internal hard disk drive (HDD) 2514 (e.g., EIDE, SATA), which internal hard disk drive 2514 can also be configured for external use in a suitable chassis (not shown), a magnetic floppy disk drive (FDD) 2516, (e.g., to read from or write to a removable diskette 2518) and an optical disk drive 2520, (e.g., reading a CD-ROM disk 2522 or, to read from or write to other high capacity optical media such as the DVD). The hard disk drive 2514, magnetic disk drive 2516 and optical disk drive 2520 can be connected to the system bus 2508 by a hard disk drive interface 2524, a magnetic disk drive interface 2526 and an optical drive interface 2528, respectively. The interface 2524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2512, comprising an operating system 2530, one or more application programs 2532, other program modules 2534 and program data 2536. All or portions of the operating system, applications, modules, and/or data can also be cached in the RAM 2512. The systems and methods described herein can be implemented utilizing various commercially available operating systems or combinations of operating systems. Examples of application programs 2532 that can be implemented and otherwise executed by processing unit 2504 include the diversity selection determining performed by transmission device 101 or 102.

A user can enter commands and information into the computer 2502 through one or more wired/wireless input devices, e.g., a keyboard 2538 and a pointing device, such as a mouse 2540. Other input devices (not shown) can comprise a microphone, an infrared (IR) remote control, a joystick, a game pad, a stylus pen, touch screen or the like. These and other input devices are often connected to the processing unit 2504 through an input device interface 2542 that can be coupled to the system bus 2508, but can be connected by other interfaces, such as a parallel port, an IEEE 1394 serial port, a game port, a universal serial bus (USB) port, an IR interface, etc.

A monitor 2544 or other type of display device can be also connected to the system bus 2508 via an interface, such as a video adapter 2546. It will also be appreciated that in alternative embodiments, a monitor 2544 can also be any display device (e.g., another computer having a display, a smart phone, a tablet computer, etc.) for receiving display information associated with computer 2502 via any communication means, including via the Internet and cloud-based networks. In addition to the monitor 2544, a computer typically comprises other peripheral output devices (not shown), such as speakers, printers, etc.

The computer 2502 can operate in a networked environment using logical connections via wired and/or wireless communications to one or more remote computers, such as a remote computer(s) 2548. The remote computer(s) 2548 can be a workstation, a server computer, a router, a personal computer, portable computer, microprocessor-based entertainment appliance, a peer device or other common network node, and typically comprises many or all of the elements described relative to the computer 2502, although, for purposes of brevity, only a memory/storage device 2550 is illustrated. The logical connections depicted comprise wired/wireless connectivity to a local area network (LAN) 2552 and/or larger networks, e.g., a wide area network (WAN) 2554. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2552 through a wired and/or wireless communication network interface or adapter 2556. The adapter 2556 can facilitate wired or wireless communication to the LAN 2552, which can also comprise a wireless AP disposed thereon for communicating with the wireless adapter 2556.

When used in a WAN networking environment, the computer 2502 can comprise a modem 2558 or can be connected to a communications server on the WAN 2554 or has other means for establishing communications over the WAN 2554, such as by way of the Internet. The modem 2558, which can be internal or external and a wired or wireless device, can be connected to the system bus 2508 via the input device interface 2542. In a networked environment, program modules depicted relative to the computer 2502 or portions thereof, can be stored in the remote memory/storage device 2550. It will be appreciated that the network connections shown are example and other means of establishing a communications link between the computers can be used.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 26:
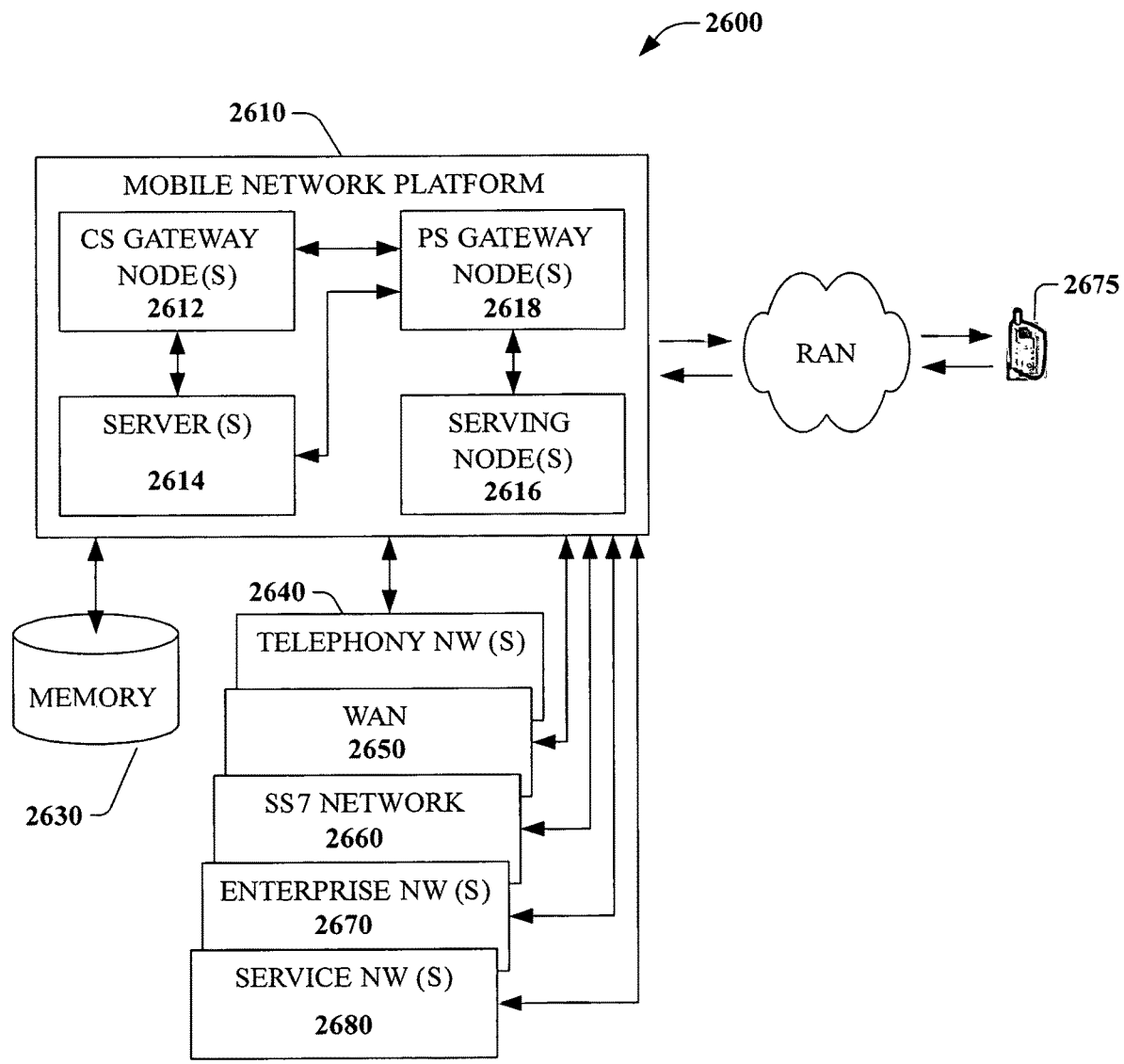
FIG. 26 is a block diagram of an example, non-limiting embodiment of a mobile network platform in accordance with various aspects described herein.

FIG. 26 presents an example embodiment 2600 of a mobile network platform 2610 that can implement and exploit one or more aspects of the disclosed subject matter described herein. In one or more embodiments, the mobile network platform 2610 can generate and receive signals transmitted and received by base stations (e.g., base station devices 1264, macrocell site 1262, or base stations 1614), central office (e.g., central office 1261 or 1611), or transmission device 101 or 102 associated with the disclosed subject matter. Generally, wireless network platform 2610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 2610 can be included in telecommunications carrier networks, and can be considered carrier-side components as discussed elsewhere herein. Mobile network platform 2610 comprises CS gateway node(s) 2612 which can interface CS traffic received from legacy networks like telephony network(s) 2640 (e.g., public switched telephone network (PSTN), or public land mobile network (PLMN)) or a signaling system #7 (SS7) network 2670. Circuit switched gateway node(s) 2612 can authorize and authenticate traffic (e.g., voice) arising from such networks. Additionally, CS gateway node(s) 2612 can access mobility, or roaming, data generated through SS7 network 2670; for instance, mobility data stored in a visited location register (VLR), which can reside in memory 2630. Moreover, CS gateway node(s) 2612 interfaces CS-based traffic and signaling and PS gateway node(s) 2618. As an example, in a 3GPP UMTS network, CS gateway node(s) 2612 can be realized at least in part in gateway GPRS support node(s) (GGSN). It should be appreciated that functionality and specific operation of CS gateway node(s) 2612, PS gateway node(s) 2618, and serving node(s) 2616, is provided and dictated by radio technology(ies) utilized by mobile network platform 2610 for telecommunication.

In addition to receiving and processing CS-switched traffic and signaling, PS gateway node(s) 2618 can authorize and authenticate PS-based data sessions with served mobile devices. Data sessions can comprise traffic, or content(s), exchanged with networks external to the wireless network platform 2610, like wide area network(s) (WANs) 2650, enterprise network(s) 2670, and service network(s) 2680, which can be embodied in local area network(s) (LANs), can also be interfaced with mobile network platform 2610 through PS gateway node(s) 2618. It is to be noted that WANs 2650 and enterprise network(s) 2660 can embody, at least in part, a service network(s) like IP multimedia subsystem (IMS). Based on radio technology layer(s) available in technology resource(s) 2617, packet-switched gateway node(s) 2618 can generate packet data protocol contexts when a data session is established; other data structures that facilitate routing of packetized data also can be generated. To that end, in an aspect, PS gateway node(s) 2618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 2600, wireless network platform 2610 also comprises serving node(s) 2616 that, based upon available radio technology layer(s) within technology resource(s) 2617, convey the various packetized flows of data streams received through PS gateway node(s) 2618. It is to be noted that for technology resource(s) 2617 that rely primarily on CS communication, server node(s) can deliver traffic without reliance on PS gateway node(s) 2618; for example, server node(s) can embody at least in part a mobile switching center. As an example, in a 3GPP UMTS network, serving node(s) 2616 can be embodied in serving GPRS support node(s) (SGSN).

For radio technologies that exploit packetized communication, server(s) 2614 in wireless network platform 2610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 2610. Data streams (e.g., content(s) that are part of a voice call or data session) can be conveyed to PS gateway node(s) 2618 for authorization/authentication and initiation of a data session, and to serving node(s) 2616 for communication thereafter. In addition to application server, server(s) 2614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 2610 to ensure network's operation and data integrity in addition to authorization and authentication procedures that CS gateway node(s) 2612 and PS gateway node(s) 2618 can enact. Moreover, provisioning server(s) can provision services from external network(s) like networks operated by a disparate service provider; for instance, WAN 2650 or Global Positioning System (GPS) network(s) (not shown). Provisioning server(s) can also provision coverage through networks associated to wireless network platform 2610 (e.g., deployed and operated by the same service provider), such as the distributed antennas networks shown in FIG. 1(s) that enhance wireless service coverage by providing more network coverage. Repeater devices such as those shown in FIGS. 7, 8, and 9 also improve network coverage in order to enhance subscriber service experience by way of UE 2675.

It is to be noted that server(s) 2614 can comprise one or more processors configured to confer at least in part the functionality of macro network platform 2610. To that end, the one or more processor can execute code instructions stored in memory 2630, for example. It is should be appreciated that server(s) 2614 can comprise a content manager 2615, which operates in substantially the same manner as described hereinbefore.

In example embodiment 2600, memory 2630 can store information related to operation of wireless network platform 2610. Other operational information can comprise provisioning information of mobile devices served through wireless platform network 2610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 2630 can also store information from at least one of telephony network(s) 2640, WAN 2650, enterprise network(s) 2670, or SS7 network 2660. In an aspect, memory 2630 can be, for example, accessed as part of a data store component or as a remotely connected memory store.

In order to provide a context for the various aspects of the disclosed subject matter, FIG. 26, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 27:
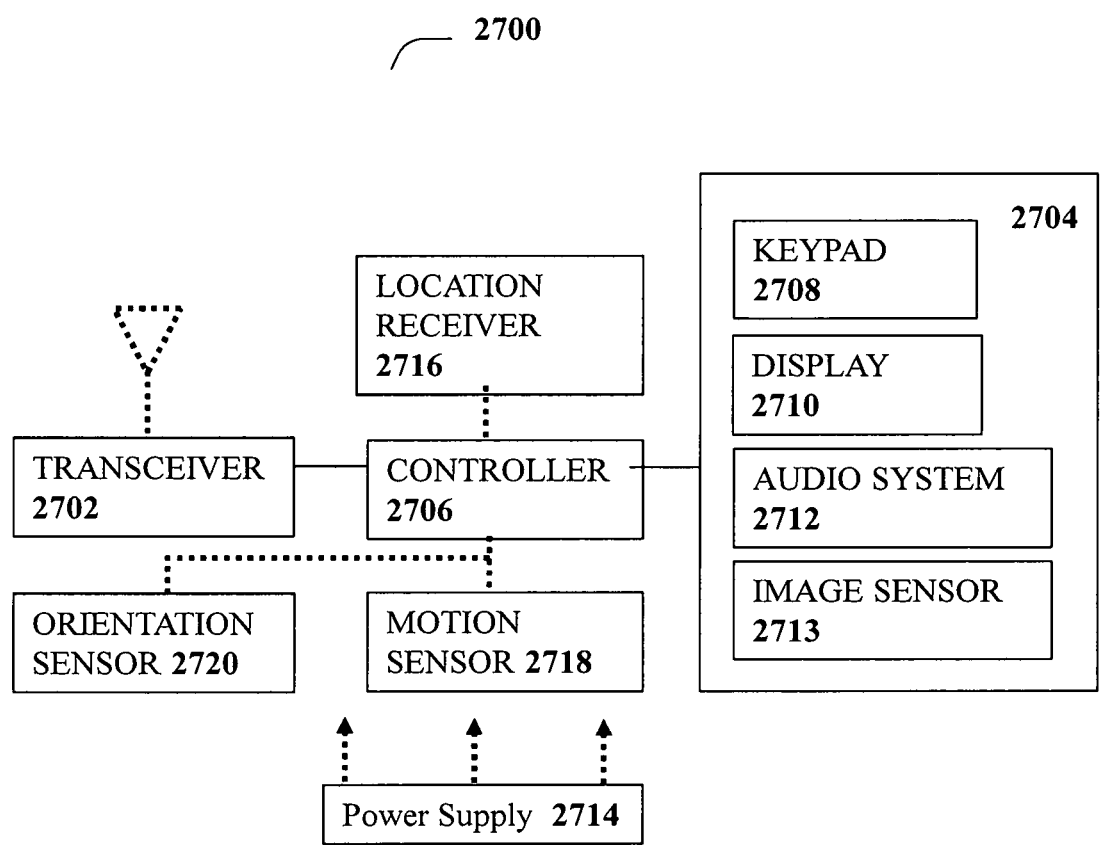
FIG. 27 is a block diagram of an example, non-limiting embodiment of a communication device in accordance with various aspects described herein.

FIG. 27 depicts an illustrative embodiment of a communication device 2700. The communication device 2700 can serve as an illustrative embodiment of devices such as mobile devices and in-building devices referred to by the subject disclosure (e.g., in FIGS. 15, 16A and 16B).

The communication device 2700 can comprise a wireline and/or wireless transceiver 2702 (herein transceiver 2702), a user interface (UI) 2704, a power supply 2714, a location receiver 2716, a motion sensor 2718, an orientation sensor 2720, and a controller 2706 for managing operations thereof. The transceiver 2702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 2702 can also be adapted to support circuit-switched wireline access technologies (such as PSTN), packet-switched wireline access technologies (such as TCP/IP, VoIP, etc.), and combinations thereof.

The UI 2704 can include a depressible or touch-sensitive keypad 2708 with a navigation mechanism such as a roller ball, a joystick, a mouse, or a navigation disk for manipulating operations of the communication device 2700. The keypad 2708 can be an integral part of a housing assembly of the communication device 2700 or an independent device operably coupled thereto by a tethered wireline interface (such as a USB cable) or a wireless interface supporting for example Bluetooth®. The keypad 2708 can represent a numeric keypad commonly used by phones, and/or a QWERTY keypad with alphanumeric keys. The UI 2704 can further include a display 2710 such as monochrome or color LCD (Liquid Crystal Display), OLED (Organic Light Emitting Diode) or other suitable display technology for conveying images to an end user of the communication device 2700. In an embodiment where the display 2710 is touch-sensitive, a portion or all of the keypad 2708 can be presented by way of the display 2710 with navigation features.

The display 2710 can use touch screen technology to also serve as a user interface for detecting user input. As a touch screen display, the communication device 2700 can be adapted to present a user interface having graphical user interface (GUI) elements that can be selected by a user with a touch of a finger. The touch screen display 2710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 2710 can be an integral part of the housing assembly of the communication device 2700 or an independent device communicatively coupled thereto by a tethered wireline interface (such as a cable) or a wireless interface.

The UI 2704 can also include an audio system 2712 that utilizes audio technology for conveying low volume audio (such as audio heard in proximity of a human ear) and high volume audio (such as speakerphone for hands free operation). The audio system 2712 can further include a microphone for receiving audible signals of an end user. The audio system 2712 can also be used for voice recognition applications. The UI 2704 can further include an image sensor 2713 such as a charged coupled device (CCD) camera for capturing still or moving images.

The power supply 2714 can utilize common power management technologies such as replaceable and rechargeable batteries, supply regulation technologies, and/or charging system technologies for supplying energy to the components of the communication device 2700 to facilitate long-range or short-range portable communications. Alternatively, or in combination, the charging system can utilize external power sources such as DC power supplied over a physical interface such as a USB port or other suitable tethering technologies.

The location receiver 2716 can utilize location technology such as a global positioning system (GPS) receiver capable of assisted GPS for identifying a location of the communication device 2700 based on signals generated by a constellation of GPS satellites, which can be used for facilitating location services such as navigation. The motion sensor 2718 can utilize motion sensing technology such as an accelerometer, a gyroscope, or other suitable motion sensing technology to detect motion of the communication device 2700 in three-dimensional space. The orientation sensor 2720 can utilize orientation sensing technology such as a magnetometer to detect the orientation of the communication device 2700 (north, south, west, and east, as well as combined orientations in degrees, minutes, or other suitable orientation metrics).

The communication device 2700 can use the transceiver 2702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 2706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 2700.

Other components not shown in FIG. 27 can be used in one or more embodiments of the subject disclosure. For instance, the communication device 2700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, handheld computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in optional training controller 230 evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A broadcast communication system, comprising:
   a wireless transceiver;
   a processing system that includes a processor;
   a guided wave transceiver that transmits and receives communications by electromagnetic waves at a physical interface of a transmission medium, wherein the electromagnetic waves are guided by the transmission medium and propagate without utilizing an electrical return path; and
   a memory that stores executable instructions that, when executed by the processing system, facilitate performance of operations, the operations comprising:
   receiving a power outage notification via the wireless transceiver from equipment of at least one utility provider;
   detecting a first power outage in response to receiving the power outage notification, wherein the broadcast communication system is physically attached to a first one of a plurality of power line phases of a power pole, and wherein the first power outage corresponds to a failure of a second one of the plurality of power line phases of the power pole;
   generating a first plurality of the electromagnetic waves for transmission to a plurality of user devices of the broadcast communication system via the guided wave transceiver, wherein the first plurality of the electromagnetic waves includes an outage status signal generated in response to the detecting the first power outage;
   predicting a second power outage by:
      determining a first power outage likelihood value; and
      comparing the first power outage likelihood value to a power outage likelihood threshold; and
   generating a second plurality of the electromagnetic waves for transmission to the plurality of user devices of the broadcast communication system via the guided wave transceiver, wherein the second plurality of the electromagnetic waves includes power outage warning data, and wherein the second plurality of the electromagnetic waves is generated in response to the first power outage likelihood value comparing unfavorably to the power outage likelihood threshold.

2. The broadcast communication system of claim 1, wherein the second power outage is further predicted based on a sensor input to a disturbance detection sensor.

3. The broadcast communication system of claim 1, wherein the second power outage is further predicted based on a sensor input to a loss of energy sensor.

4. The broadcast communication system of claim 1, wherein the second power outage is further predicted based on a sensor input to a vibration sensor.

5. The broadcast communication system of claim 1, wherein the power outage notification includes utility status data;
   wherein the outage status signal is generated based on the utility status data.

6. The broadcast communication system of claim 1, wherein the operations further comprise:
   generating at least one status request for transmission via the wireless transceiver to the equipment of the at least one utility provider in response to the predicting the second power outage.

7. The broadcast communication system of claim 1, wherein the operations further comprise:
   receiving via the guided wave transceiver a third plurality of the electromagnetic waves that includes a power outage notification signal.

8. The broadcast communication system of claim 1, wherein the operations further comprise:
   receiving a third plurality of the electromagnetic waves from the equipment of the at least one utility provider via the guided wave transceiver, wherein the third plurality of the electromagnetic waves includes utility status data, and wherein the outage status signal is generated based on the utility status data.

9. The broadcast communication system of claim 8, wherein the operations further comprise:
   generating a fourth plurality of the electromagnetic waves that includes a status request signal for transmission via the guided wave transceiver to the equipment of the at least one utility provider in response to detecting the first power outage.

10. The broadcast communication system of claim 8, wherein the outage status signal includes message data for display by a subset of the plurality of user devices.

11. The broadcast communication system of claim 10, wherein the message data corresponds to a message from the equipment of the at least one utility provider, wherein the operations further comprise:
    receiving a fourth plurality of the electromagnetic waves via the guided wave transceiver that includes a message response signal from one of the subset of the plurality of user devices corresponding to a user input to the one of the subset of the plurality of user devices; and
    transmitting the fourth plurality of the electromagnetic waves via the guided wave transceiver to the equipment of the at least one utility provider.

12. The broadcast communication system of claim 8, wherein at least one of the plurality of user devices includes a home automation controller, and wherein the outage status signal includes at least one instruction for execution by the home automation controller.

13. The broadcast communication system of claim 8, wherein the outage status signal includes information of at least one electric vehicle charging station location.

14. The broadcast communication system of claim 1, wherein the operations further comprise:
    receiving a third plurality of the electromagnetic waves from the equipment of the utility provider via the guided wave transceiver that includes planned maintenance data; and generating a fourth plurality of the electromagnetic waves for transmission to the plurality of user devices of the broadcast communication system via the guided wave transceiver, wherein the third plurality of the electromagnetic waves includes the planned maintenance data.

15. The broadcast communication system of claim 1, wherein the broadcast communication system includes an environmental sensor, and wherein the first power outage likelihood value is based on a sensor input to the environmental sensor.

16. The broadcast communication system of claim 1, wherein the first power outage likelihood value is determined at a first time; and wherein the operations further comprise:
    determining a second power outage likelihood value at a second time that is later than the first time;
    comparing the second power outage likelihood value to the power outage likelihood threshold; and
    generating a third plurality of the electromagnetic waves for transmission to the plurality of user devices of the broadcast communication system via the guided wave transceiver, wherein the third plurality of the electromagnetic waves indicates that a power outage warning has passed, and wherein the third plurality of the electromagnetic waves is generated in response to the second power outage likelihood value comparing favorably to the power outage likelihood threshold.

17. A method for use by a broadcast communication system that includes a processor, a wireless transceiver, and a guided wave transceiver, the method comprising:
    receiving a power outage notification via the wireless transceiver from equipment of at least one utility provider;
    detecting a first power outage in response to receiving the power outage notification, wherein the broadcast communication system is physically attached to a first one of a plurality of power line phases of a power pole, and wherein the first power outage corresponds to a failure of a second one of the plurality of power line phases of the power pole;
    generating a first plurality of electromagnetic waves for transmission to a plurality of user devices of the broadcast communication system via the guided wave transceiver, wherein the first plurality of electromagnetic waves includes an outage status signal generated in response to the detecting the first power outage;
    predicting a second power outage by:
        determining a first power outage likelihood value; and
        comparing the first power outage likelihood value to a power outage likelihood threshold; and
    generating a second plurality of electromagnetic waves for transmission to the plurality of user devices of the broadcast communication system via the guided wave transceiver, wherein the second plurality of electromagnetic waves includes power outage warning data, and wherein the second plurality of electromagnetic waves is generated in response to the first power outage likelihood value comparing unfavorably to the power outage likelihood threshold.

18. The method of claim 17, wherein the broadcast communication system further comprises at least one of: a disturbance detection sensor, a loss of energy sensor, or a vibration sensor, wherein the second power outage is further predicted based on a sensor input to the at least one of: the disturbance detection sensor, the loss of energy sensor, or the vibration sensor.

19. The method of claim 17, wherein the broadcast communication system includes an environmental sensor, and wherein the first power outage likelihood value is based on a sensor input to the environmental sensor.

20. A broadcast communication system, comprising:
    means for receiving wireless communications including a power outage notification from equipment of at least one utility provider;
    means for detecting a first power outage according to the power outage notification that corresponds to a failure of one of a plurality of power line phases of a power pole, wherein the broadcast communication system is physically attached to another one of the plurality of power line phases of the power pole;
    means for generating a first plurality of electromagnetic waves for transmission to a plurality of user devices of the broadcast communication system, wherein the first plurality of electromagnetic waves includes an outage status signal generated in response to the detecting the first power outage, and wherein the first plurality of electromagnetic waves is guided by at least one transmission medium and propagates without utilizing an electrical return path;
    means for predicting a second power outage by:
        receiving the power outage notification;
        determining a first power outage likelihood value; and
        comparing the first power outage likelihood value to a power outage likelihood threshold; and
    means for generating a second plurality of electromagnetic waves for transmission to the plurality of user devices of the broadcast communication system, wherein the second plurality of electromagnetic waves includes power outage warning data, and wherein the second plurality of electromagnetic waves is generated in response to the first power outage likelihood value comparing unfavorably to the power outage likelihood threshold.

* * * * *